US009489106B2

(12) United States Patent
Chaudhri

(10) Patent No.: US 9,489,106 B2
(45) Date of Patent: Nov. 8, 2016

(54) PORTABLE ELECTRONIC DEVICE CONFIGURED TO PRESENT CONTACT IMAGES

(75) Inventor: Imran Chaudhri, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 508 days.

(21) Appl. No.: 12/395,537

(22) Filed: Feb. 27, 2009

(65) Prior Publication Data

US 2009/0198359 A1 Aug. 6, 2009

Related U.S. Application Data

(63) Continuation of application No. 11/767,409, filed on Jun. 22, 2007, now Pat. No. 8,564,543.

(60) Provisional application No. 60/843,832, filed on Sep. 11, 2006, provisional application No. 60/878,746, filed on Jan. 5, 2007.

(51) Int. Cl.
*G06F 3/041* (2006.01)
*G06F 3/0482* (2013.01)
*G06F 3/0483* (2013.01)
*G06F 3/0488* (2013.01)
*G06F 17/30* (2006.01)
*G11B 27/10* (2006.01)
*G11B 27/34* (2006.01)
*G06F 1/16* (2006.01)

(52) U.S. Cl.
CPC ........... *G06F 3/0482* (2013.01); *G06F 1/1694* (2013.01); *G06F 3/0483* (2013.01); *G06F 3/0488* (2013.01); *G06F 3/04883* (2013.01); *G06F 17/30061* (2013.01); *G06F 17/30994* (2013.01); *G11B 27/105* (2013.01); *G11B 27/34* (2013.01); *G06F 2203/0381* (2013.01)

(58) Field of Classification Search
CPC ........... G06F 3/0482; G06F 17/30061; G06F 17/30994; G06F 3/0483; G06F 3/0488; G06F 3/04883; G06F 1/1694; G06F 2203/0381; G11B 27/105; G11B 27/34
USPC .......... 345/173; 715/201–700; 455/41.2-557
See application file for complete search history.

(56) References Cited

U.S. PATENT DOCUMENTS 4,313,108 A 1/1982 Yoshida
5,303,388 A 4/1994 Kreitman et al.
(Continued)

FOREIGN PATENT DOCUMENTS

EP 1 148 412 A2 10/2001
EP 1677497 A1 7/2006
(Continued)

OTHER PUBLICATIONS

"CoverFlow", www.steelskies.com/coverflow/, downloaded Jun. 15, 2006, pp. 1-2.
(Continued)

*Primary Examiner* — Kumar Patel
*Assistant Examiner* — Vinh Lam
(74) *Attorney, Agent, or Firm* — Morrison & Foerster, LLP

(57) ABSTRACT

Methods and systems are disclosed for navigating or browsing through images, such as contact images, on electronic devices, such as portable electronic device having a touch screen display. In one embodiment, users of electronic devices are able to browse through contact images to locate a particular contact within a plurality of contacts available (e.g., stored) on the electronic devices.

21 Claims, 32 Drawing Sheets

(56) References Cited

U.S. PATENT DOCUMENTS

| | | |
|---|---|---|
| 5,345,543 A | 9/1994 | Capps et al. |
| 5,396,590 A | 3/1995 | Kreegar |
| 5,446,882 A | 8/1995 | Capps et al. |
| 5,452,414 A | 9/1995 | Rosendahl et al. |
| 5,463,725 A | 10/1995 | Henckel et al. |
| 5,541,697 A | 7/1996 | McIntyre |
| 5,570,109 A | 10/1996 | Jenson |
| 5,659,805 A | 8/1997 | Furlani et al. |
| 5,661,632 A | 8/1997 | Register |
| 5,838,326 A | 11/1998 | Card et al. |
| 5,864,868 A | 1/1999 | Contois |
| 5,880,733 A | 3/1999 | Horvitz et al. |
| 5,896,133 A | 4/1999 | Lynch et al. |
| 5,900,909 A | 5/1999 | Parulski et al. |
| 6,006,227 A | 12/1999 | Freeman et al. |
| 6,011,585 A | 1/2000 | Anderson |
| 6,023,275 A * | 2/2000 | Horvitz ............... G06F 3/04815 715/700 |
| 6,310,613 B1 | 10/2001 | Tanaka et al. |
| 6,346,951 B1 | 2/2002 | Mastronardi |
| 6,388,877 B1 | 5/2002 | Canova, Jr. et al. |
| 6,466,237 B1 | 10/2002 | Miyao |
| 6,486,895 B1 | 11/2002 | Robertson et al. |
| 6,489,951 B1 * | 12/2002 | Wong ................. G06F 3/04886 345/173 |
| 6,577,330 B1 * | 6/2003 | Tsuda ................. G06F 3/04815 715/781 |
| 6,638,313 B1 | 10/2003 | Freeman et al. |
| 6,667,751 B1 | 12/2003 | Wynn et al. |
| 6,725,427 B2 * | 4/2004 | Freeman ............ G06F 17/30011 707/E17.008 |
| 6,768,999 B2 | 7/2004 | Prager et al. |
| 6,919,879 B2 | 7/2005 | Griffin et al. |
| 6,956,564 B1 | 10/2005 | Williams |
| 6,975,306 B2 * | 12/2005 | Hinckley ............ G06F 3/03547 178/18.03 |
| 7,030,861 B1 | 4/2006 | Westerman et al. |
| 7,085,590 B2 | 8/2006 | Kennedy et al. |
| 7,085,693 B2 | 8/2006 | Zimmerman |
| 7,386,325 B2 | 6/2008 | Charlier et al. |
| 7,479,949 B2 * | 1/2009 | Jobs ....................... G06F 3/0488 345/169 |
| 7,492,350 B2 * | 2/2009 | Fabre .................... G06F 3/0481 345/156 |
| 7,581,186 B2 * | 8/2009 | Dowdy ............. G06F 17/30775 715/727 |
| 7,656,393 B2 * | 2/2010 | King ..................... G06F 1/1626 345/156 |
| 7,679,604 B2 | 3/2010 | Uhlik et al. |
| 7,710,393 B2 * | 5/2010 | Tsuk ..................... G06F 1/1626 345/156 |
| 7,750,893 B2 * | 7/2010 | Hashimoto et al. .......... 345/173 |
| 7,844,301 B2 | 11/2010 | Lee et al. |
| 7,996,792 B2 | 8/2011 | Anzures et al. |
| 8,217,906 B2 | 7/2012 | Sinclair |
| 8,264,465 B2 | 9/2012 | Grant et al. |
| 9,001,047 B2 | 4/2015 | Forstall et al. |
| 2001/0015719 A1 | 8/2001 | Van Ee et al. |
| 2001/0050687 A1 * | 12/2001 | Iida ...................... G06T 11/206 345/581 |
| 2002/0021278 A1 | 2/2002 | Hinckley et al. |
| 2002/0030699 A1 | 3/2002 | Van Ee |
| 2002/0113824 A1 | 8/2002 | Myers |
| 2002/0198909 A1 * | 12/2002 | Huynh ................. G06Q 30/02 715/201 |
| 2003/0030673 A1 * | 2/2003 | Ho ............................. 345/779 |
| 2003/0064751 A1 | 4/2003 | Charlier et al. |
| 2003/0122787 A1 * | 7/2003 | Zimmerman ....... G06F 3/04883 345/173 |
| 2004/0013416 A1 | 1/2004 | Mok |
| 2004/0027396 A1 | 2/2004 | Lection |
| 2004/0055446 A1 | 3/2004 | Robbin et al. |
| 2004/0056837 A1 * | 3/2004 | Koga ..................... G06F 1/16 345/156 |
| 2004/0100479 A1 | 5/2004 | Nakano et al. |
| 2004/0104896 A1 | 6/2004 | Suraqui |
| 2004/0122683 A1 * | 6/2004 | Grossman ............ G06Q 10/10 715/864 |
| 2004/0125088 A1 | 7/2004 | Zimmerman et al. |
| 2004/0139398 A1 * | 7/2004 | Testa et al. .................... 715/517 |
| 2004/0140956 A1 | 7/2004 | Kushler et al. |
| 2004/0168118 A1 * | 8/2004 | Wong et al. ................ 715/500.1 |
| 2004/0199582 A1 | 10/2004 | Kucharewski et al. |
| 2004/0215534 A1 | 10/2004 | Gautier et al. |
| 2004/0235520 A1 * | 11/2004 | Cadiz .................. H04M 1/2473 455/557 |
| 2004/0250217 A1 | 12/2004 | Tojo et al. |
| 2005/0012723 A1 * | 1/2005 | Pallakoff .............. G06F 1/1616 345/173 |
| 2005/0020325 A1 | 1/2005 | Enger et al. |
| 2005/0021418 A1 | 1/2005 | Marcus et al. |
| 2005/0024341 A1 * | 2/2005 | Gillespie .............. G06F 1/1616 345/173 |
| 2005/0091596 A1 | 4/2005 | Anthony et al. |
| 2005/0110768 A1 | 5/2005 | Marriott |
| 2005/0143124 A1 | 6/2005 | Kennedy et al. |
| 2005/0162402 A1 * | 7/2005 | Watanachote ................. 345/173 |
| 2005/0177445 A1 | 8/2005 | Church |
| 2005/0181774 A1 * | 8/2005 | Miyata ......................... 455/414.1 |
| 2005/0229112 A1 * | 10/2005 | Clay .................... G06F 3/0482 715/817 |
| 2005/0240494 A1 | 10/2005 | Cue et al. |
| 2005/0240756 A1 | 10/2005 | Mayer |
| 2005/0243069 A1 | 11/2005 | Yorio et al. |
| 2005/0257161 A1 | 11/2005 | Martin |
| 2005/0270276 A1 | 12/2005 | Sugimoto et al. |
| 2005/0275628 A1 | 12/2005 | Balakrishnan et al. |
| 2005/0283729 A1 | 12/2005 | Morris et al. |
| 2006/0001645 A1 | 1/2006 | Drucker et al. |
| 2006/0017692 A1 | 1/2006 | Wehrenberg et al. |
| 2006/0020904 A1 | 1/2006 | Aaltonen et al. |
| 2006/0026521 A1 | 2/2006 | Hotelling et al. |
| 2006/0026535 A1 | 2/2006 | Hotelling et al. |
| 2006/0050054 A1 | 3/2006 | Liang et al. |
| 2006/0125799 A1 | 6/2006 | Hillis et al. |
| 2006/0132460 A1 | 6/2006 | Kolmykov-Zotov et al. |
| 2006/0132469 A1 * | 6/2006 | Lai ......................... B60K 35/00 345/184 |
| 2006/0146074 A1 | 7/2006 | Harrison |
| 2006/0148455 A1 * | 7/2006 | Kim ............................. 455/414.1 |
| 2006/0176278 A1 | 8/2006 | Matthews et al. |
| 2006/0178110 A1 * | 8/2006 | Nurminen et al. .......... 455/41.2 |
| 2006/0195789 A1 | 8/2006 | Rogers et al. |
| 2006/0195790 A1 | 8/2006 | Beaupre et al. |
| 2006/0197753 A1 | 9/2006 | Hotelling |
| 2006/0227106 A1 | 10/2006 | Hashimoto et al. |
| 2006/0246874 A1 * | 11/2006 | Sullivan ....................... 455/412.1 |
| 2006/0246955 A1 | 11/2006 | Nirhamo et al. |
| 2006/0256090 A1 * | 11/2006 | Huppi ..................... A63F 13/02 345/173 |
| 2006/0281449 A1 * | 12/2006 | Kun et al. ..................... 455/418 |
| 2006/0286971 A1 * | 12/2006 | Maly et al. ................... 455/415 |
| 2007/0004451 A1 | 1/2007 | Anderson |
| 2007/0013671 A1 | 1/2007 | Zadesky et al. |
| 2007/0033295 A1 * | 2/2007 | Marriott ....................... G06F 8/65 709/248 |
| 2007/0044036 A1 | 2/2007 | Ishimura et al. |
| 2007/0053268 A1 * | 3/2007 | Crandall ............... G11B 27/105 369/53.31 |
| 2007/0070066 A1 * | 3/2007 | Bakhash ............. G06F 3/04815 345/419 |
| 2007/0085841 A1 * | 4/2007 | Tsuk .................... G06F 3/03547 345/173 |
| 2007/0097090 A1 * | 5/2007 | Battles ......................... 345/173 |
| 2007/0097093 A1 | 5/2007 | Ohshita et al. |
| 2007/0124680 A1 * | 5/2007 | Robbin ................. G10H 1/0008 715/727 |
| 2007/0126715 A1 * | 6/2007 | Funamoto ............. G06F 3/0488 345/173 |
| 2007/0168413 A1 | 7/2007 | Barletta et al. |
| 2007/0260994 A1 | 11/2007 | Sciammarella et al. |
| 2008/0036743 A1 | 2/2008 | Westerman et al. |
| 2008/0059888 A1 | 3/2008 | Dunko |
| 2008/0062137 A1 | 3/2008 | Brodersen et al. |

(56) References Cited

U.S. PATENT DOCUMENTS

| | | | |
|---|---|---|---|
| 2008/0062141 | A1 | 3/2008 | Chaudhri |
| 2008/0066016 | A1* | 3/2008 | Dowdy ............. G06F 17/30775 715/854 |
| 2008/0066135 | A1 | 3/2008 | Brodersen et al. |
| 2008/0082939 | A1* | 4/2008 | Nash .................. G06F 3/04883 715/784 |
| 2008/0094367 | A1* | 4/2008 | Van De Ven et al. ........ 345/173 |
| 2008/0122796 | A1* | 5/2008 | Jobs ...................... G06F 3/0488 345/173 |
| 2008/0165152 | A1 | 7/2008 | Forstall et al. |
| 2008/0167081 | A1 | 7/2008 | Eng |
| 2008/0168403 | A1 | 7/2008 | Westerman et al. |
| 2008/0225013 | A1 | 9/2008 | Muylkens et al. |
| 2008/0301575 | A1 | 12/2008 | Fermon |
| 2009/0002335 | A1 | 1/2009 | Chaudhri |
| 2009/0002396 | A1 | 1/2009 | Andrews et al. |
| 2009/0128500 | A1 | 5/2009 | Sinclair |
| 2009/0140991 | A1 | 6/2009 | Takasaki et al. |
| 2009/0172532 | A1 | 7/2009 | Chaudhri |
| 2009/0204920 | A1* | 8/2009 | Beverley ............... G06T 3/4038 715/768 |
| 2009/0289958 | A1 | 11/2009 | Kim et al. |
| 2010/0005421 | A1* | 1/2010 | Yoshioka ............ G06F 3/04817 715/835 |
| 2010/0207897 | A1 | 8/2010 | Ono |
| 2011/0061028 | A1 | 3/2011 | Bachman |
| 2013/0120276 | A1 | 5/2013 | Kim et al. |
| 2015/0145893 | A1 | 5/2015 | Forstall et al. |

FOREIGN PATENT DOCUMENTS

| | | | |
|---|---|---|---|
| GB | 2 347 593 A | | 9/2000 |
| JP | 9-97154 A | | 4/1997 |
| JP | 10-232757 A | | 9/1998 |
| JP | 2000-101879 A | | 4/2000 |
| JP | 2000-105772 | | 4/2000 |
| JP | 2000-284879 A | | 10/2000 |
| JP | 2001-306375 A | | 11/2001 |
| JP | 2002-82745 A | | 3/2002 |
| JP | 2002-288690 A | | 10/2002 |
| JP | 2003-43978 A | | 2/2003 |
| JP | 2003-330586 | | 11/2003 |
| JP | 2005-507112 A | | 3/2005 |
| JP | 2006166248 A | | 6/2006 |
| KR | 10-2003-0030384 | * | 5/2003 ................... 345/173 |
| KR | 2003-0088374 A | | 11/2003 |
| WO | WO 01/23985 A1 | | 4/2001 |
| WO | WO 01/79980 A1 | | 10/2001 |
| WO | 03/062976 A1 | | 7/2003 |
| WO | WO 2005/019987 | | 3/2005 |
| WO | 2006/020304 A2 | | 2/2006 |
| WO | WO 2006/013485 A2 | | 2/2006 |
| WO | WO 2006/020305 | | 2/2006 |
| WO | WO 2006/088499 | | 8/2006 |
| WO | WO 2006/094308 | | 9/2006 |
| WO | 2006/126047 A1 | | 11/2006 |
| WO | WO 2008/030779 | | 3/2008 |
| WO | WO 2008/030779 A2 | | 3/2008 |
| WO | WO 2008/030976 | | 3/2008 |

OTHER PUBLICATIONS

"CoverFlow—Features", www.steelskies.com/coverflow/features.php, downloaded Jun. 15, 2006, p. 1.
"CoverFlow—FAQ & Tips", www.steelskies.com/coverflow/faq.php, downloaded Jun. 15, 2006, pp. 1-3.
Website printout, www.steelskies.com, downloaded Jun. 15, 2006, pp. 1-4.
"CoverFlow—Download", www.steelskies.com/coverflow/downloaded.php, downloaded Jun. 15, 2006, pp. 1-4.
Enright, "Dissatisfaction Sows Innovation", The Treehouse + The Cave, Dec. 29, 2004, 1-4 pgs.
Enright, "Meet CoverFlow", The Treehouse + The Cave, Aug. 13, 2005, 1-2 pgs.
Sawyer, "Get with the CoverFlow", The Olive Press, Dec. 8, 2005, 1 pg.
Enright, "Visual Browsing on a iBook DS", The Treehouse + The Cave, Dec. 29, 2004, 1 pg.
Rose, M., "Music in the Home: Interfaces for Music Applications", Personal Technologies, v., 4, No. 1, 2000, pp. 45-53.
Hinze, Cody., "Cover Flow—A Beautiful Way to Browse your MP3s", Noise Magazine Blog, Feb. 5, 2006, pp. 1-2.
Enright A C., "Dissatisfaction Sows Innovation—Visual Browsing in iTunes", Internet Blog of Andrew Coulter Enright, Dec. 29, 2004, pp. 1-6.
International Search Report and Written Opinion for PCT/US2007/078180, mailed Mar. 3, 2008.
U.S. Appl. No. 12/215,651, entitled "Electronic Device with Image Based Browers", filed Jun. 26, 2008.
International Search Report and Written Opinion dated Feb. 12, 2008, from International Application No. PCT/US2007/078052.
Examiner's Report for Australian Innovation Patent Application No. 2008101162, mailed Mar. 27, 2009.
Office Action for German Patent Application No. 11 2007 002 143.8-53, dated Jun. 25, 2010.
Office Action for Canadian Patent Application No. 2661200, dated Jun. 9, 2010.
Office Action for Korean Patent Application No. 10-2009-7005010, dated Nov. 16, 2010.
Office Action for United Kingdom Patent Application No. 0905084.0, dated Sep. 24, 2010.
Examiner's First Report for Australian Patent Application No. 2007296558, dated Feb. 15, 2010.
Examiner's Report for Australian Innovation Patent Application No. 2008101164, mailed Mar. 24, 2009.
Examiner's Report for Australian Innovation Patent Application No. 2008101171, mailed Apr. 1, 2009.
Second Office Action for Chinese Patent Application No. 200780033722.5, dated Mar. 9, 2011.
Office Action for U.S. Appl. No. 12/395,541, mailed May 27, 2011.
Examiner's Report for Australian Patent Application No. 2007296558, mailed Mar. 3, 2011.
Office Action for Korean Patent Application No. 10-2009-7005010, dated May 13, 2011.
Office Action for Korean Patent Application No. 10-2011-7003607, dated May 13, 2011.
Office Action for Korean Patent Application No. 10-2011-7003609, dated May 13, 2011.
Restriction Requirement for U.S. Appl. No. 11/767,409, mailed Sep. 21, 2010.
Office Action for U.S. Appl. No. 11/767,409, mailed Nov. 23, 2010.
Final Office Action for U.S. Appl. No. 77/767,409, mailed Mar. 16, 2011.
"Mechanism for Visual Lists and Selections", IBM Technical Disclosure Bulletin, IBM, vol. 40, No. 5, May 1, 1997, 2 page.
Office Action for United Kingdom Patent Application No. 0905084.0, dated Aug. 23, 2011.
Search and Examination Report for UK Application No. 1114593.5, dated Sep. 23, 2011.
Search and Examination Report for UK Application No. 1114592.7, dated Sep. 15, 2011.
Office Action for United Kingdom Patent Application No. 0905084.0, dated Oct. 17, 2011.
Office Action for U.S. Appl. No. 11/767,409, mailed Aug. 29, 2011.
Office Action for U.S. Appl. No. 12/395,541, mailed Jul. 26, 2011.
Notification of Reason for Rejection for Japanese Patent Application No. 2009-527624, dated Nov. 8, 2011.
Notice of Preliminary Rejection for Korean patent Application No. 10-2011-7003609, dated Feb. 5, 2012.
Examiner's Report for Canadian Patent Application No. 2,661,200, dated Nov. 1, 2011.
Restriction Requirement for U.S. Appl. No. 12/215,651, dated Sep. 28, 2011.
Office Action for U.S. Appl. No. 12/215,651, dated Feb. 2, 2012.

(56) References Cited

OTHER PUBLICATIONS

Goehl, D., et al., "Motion Sensors Gaining Inertia with Popular Consumer Electronics," White Paper, InvensSense, Inc., (2007), 5 pages.
Hinckley et al., "Sensing Techniques for Mobile Interaction," UIST 2000 Symposium on User Interface Software and Technology, CHI Letters 2 (2), Nov. 2000, San Diego, CA, 10 pages.
IBM, "Mechanism for Visual Lists and Selections," IBM Technical Disclosure Bulletin, IBM, vol. 40, No. 5, May 1, 1997, 2 page.
Microwaves RF, "MS Motion Sensors Boost Handset Reliability," http://www.mwrf.com/Articles/Print.cfm?ArticleID=12740, Copyright © 2004, Penton Media, Inc., 4 pages.
Tidwell, J., "Animated Transition," from Designing Interfaces, O'Reilly Media, Inc., Nov. 2005, pp. 84-85.
International Search Report and Written Opinion dated Jun. 5, 2008, received in International Application No. PCT/US2008/050428, which corresponds to U.S. Appl. No. 11/969,800, 17 pages (Forstall).
Office Action dated Feb. 16, 2011, received in U.S. Appl. No. 11/969,800, 31 pages (Forstall).
Final Office Action dated Jun. 15, 2011, received in U.S. Appl. No. 11/969,800, 25 pages (Forstall).
Office Action dated Jan. 20, 2012, received in U.S. Appl. No. 11/969,800, 26 pages (Forstall).
Office Action dated May 22, 2012, received in U.S. Appl. No. 11/969,800, 53 pages (Forstall).
Final Office Action dated Nov. 5, 2012, received in U.S. Appl. No. 11/969,800, 61 pages (Forstall).
Office Action dated Sep. 18, 2013, received in U.S. Appl. No. 11/969,800, 83 pages (forstall).
Notice of Allowance dated Jun. 12, 2013 received in U.S. Appl. No. 11/767,409, 26 pages (Chaudhri).
Office Action dated Dec. 6, 2012, received in Australian Patent Appliction No. 2011250783, which corresponds to U.S. Appl. No. 11/767,409 3 pages (Chaudhri).
Notice of Acceptance dated May 16, 2013, received in Australian Patent Application No. 2011250783, which corresponds to U.S. Appl. No. 11/767,409, 2 pages (Chaudhri).
Office Action dated Jan. 3, 2013, received in Canadian Patent Application No. 2,661,200, which corresponds to U.S. Appl. No. 11/767,409, 5 pages (Chaudhri).
Grant Certificate dated Jan. 18, 2013, issued in Hong Kong Patent Application No. 12104856.1, which corresponds to U.S. Appl. No. 11/767,409, 3 pages (Chaudhri).
Grant Certificate dated Jan. 18, 2013, issued in Hong Kong Patent Application No. 12105182.3, which corresponds to U.S. Appl. No. 11/767,409, 3 pages (Chaudhri).
Office Action dated Oct. 9, 2012, received in Japanese Patent Application No. 2009-527624, which corresponds to U.S. Appl. No. 11/767,409, 3 pages (Chaudhri).
Office Action dated Nov. 8, 2012, received in Korean Patent Application No. 10 2012 7019029, which corresponds to U.S. Appl. No. 11/767,409, 2 pages (Chaudhri).
Notice of Allowance dated Jun. 26, 2013, received in Korean Patent Application No. 10 2012 7019029, which corresponds to U.S. Appl. No. 11/767,409, 2 pages (Chaudhri).
Office Action dated Aug. 15, 2013, received in U.S. Appl. No. 12/215,651, 30 pages (Chaudhri).
Office Action received for Canadian Patent Application No. 2,661,200, mailed on Nov. 14, 2013, 2 pages.
Notice of Allowance Received for Canadian Patent Application No. 2,661,200, mailed on Aug. 20, 2014, 1 page.
Office Action received for Chinese Patent Application No. 200780033722.5, mailed on Jun. 19, 2014, 4 pages of Official Copy. (see communication under 37 CFR § 1.98(a) (3)).
Office Action received for Chinese Patent Application No. 200780033703.2, mailed on Dec. 26, 2011, 23 pages (12 pages of English Translation and 11 pages of Official copy).
Office Action received for Chinese Patent Application No. 200780033703.2, mailed on Sep. 8, 2010, 26 pages.
Office Action received for Chinese Patent Application No. 200780033722.5, mailed on Jul. 8, 2010, 12 pages (7 pages of English Translation and 5 pages of Official copy).
Extended European Search Report (includes Supplementary European Search Report and Search Opinion) received for European Patent Application No. 13184872.3, mailed on Dec. 5, 2013, 9 pages.
Office Action received for European Patent Application No. 07842262.3, mailed on Sep. 8, 2011, 5 pages.
Office Action received for Great Britain Patent Application No. 0905048.5, mailed on May 11, 2011, 5 pages.
Office Action received for Japanese Patent Application No. 2009-527624, mailed on Oct. 1, 2013, 9 pages (5 pages of English Translation and 4 pages of Official copy).
Non-Final Office Action received for U.S. Appl. No. 11/519,460, mailed on Aug. 6, 2008, 8 pages.
Notice of Allowance received for U.S. Appl. No. 11/519,460, mailed on May 7, 2009, 4 pages.
Final Office Action received for U.S. Appl. No. 11/767,409, mailed on Jul. 17, 2012, 25 pages.
Non-Final Office Action received for U.S. Appl. No. 11/767,409, mailed on Feb. 9, 2012, 20 pages.
Final Office Action received for U.S. Appl. No. 12/215,651, mailed on Jul. 6, 2012, 27 pages.
Notice of Allowance received for U.S. Appl. No. 12/215,651, mailed on Feb. 6, 2014, 5 pages.
Final Office Action received for U.S. Appl. No. 12/395,541, mailed on Dec. 28, 2011, 16 pages.
Non-Final Office Action received for U.S. Appl. No. 12/395,541, mailed on Mar. 14, 2013, 23 pages.
Notice of Allowance received for U.S. Appl. No. 12/395,541, mailed on Aug. 22, 2013, 8 pages.
Notice of Allowance received for U.S. Appl. No. 12/395,541, mailed on Sep. 12, 2013, 2 pages.
Notice of Allowance received for U.S. Appl. No. 12/492,064, mailed on Mar. 7, 2012, 7 pages.
International Preliminary Report on Patentability received for PCT Patent Application No. PCT/US2007/078180, issued on Mar. 17, 2009, 6 pages.
ARS Technica, "Coverflow: My Visual Album Browser Needs Your Help", available at <http://arstechnica.com/civis/viewtopic.php?f=19&t=313706>, retrieved on Dec. 19, 2011, 37 pages.
Del Strother, Jonathan, "Coverflow", available at <http://www.steelskies.com/coverflow>, retrieved on Jun. 15, 2006, 14 pages.
International Preliminary Report on Patentability received for PCT Patent Application No. PCT/US2008/050428, mailed on Jul. 7, 2009, 9 pages.
Office Action received for Japanese Patent Application No. 2014-17726, mailed on Feb. 9, 2015, 4 pages (Official Copy only)(See Communication under 37 CFR § 1.98(a) (3)).
Final Office Action received for U.S. Appl. No. 11/969,800, mailed on Jul. 24, 2014, 27 pages.
Non-Final Office Action received for U.S. Appl. No. 11/969,800, mailed on Apr. 21, 2014, 35 pages.
Notice of Allowance received for U.S. Appl. No. 11/969,800, mailed on Nov. 5, 2014, 15 pages.
Notice of Allowance received for U.S. Appl. No. 13/464,454, mailed on May 1, 2013, 6 pages.
Palmone, "Your Mobile Manager", Chapter 2, LifeDrive User's Guide, available at "http://www.palm.com/us/support/handbooks/lifedrive/en/lifedrive_handbook.pdf", 2005, 23 pages.
Tidwell, Jenifer, "Animated Transition", from Designing Interfaces, O'Reilly Media, Inc., Nov. 2005, 2 pages.
Office Action received for Canadian Patent Application No. 2,882,403, mailed on Apr. 2, 2015, 5 pages.
Non Final Office Action received for U.S. Appl. No. 14/614,136, mailed on Mar. 18, 2016, 25 pages.
Decision to Grant received for Japanese Patent Application No. 2014-017726, mailed on Dec. 7, 2015, 6 pages (3 pages of English Translation and 3 pages of official copy).

\* cited by examiner

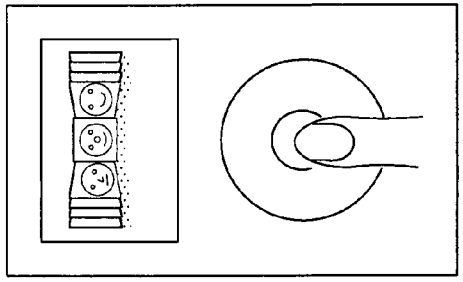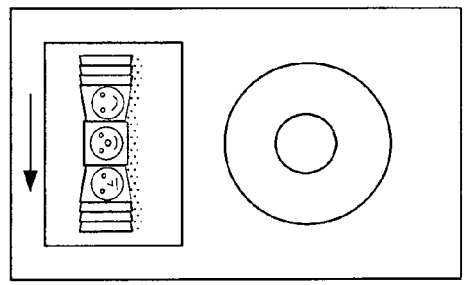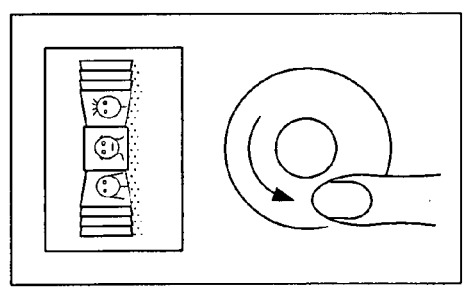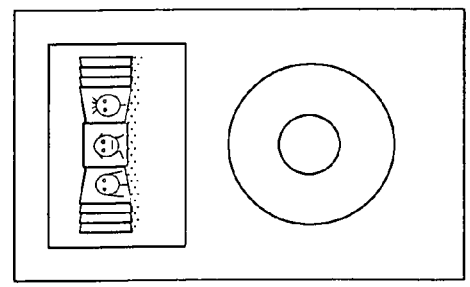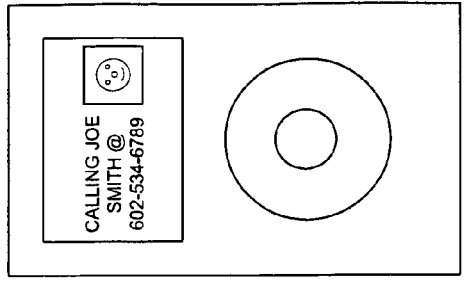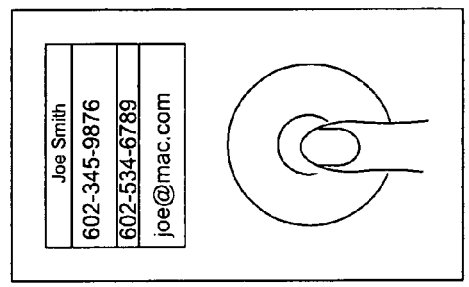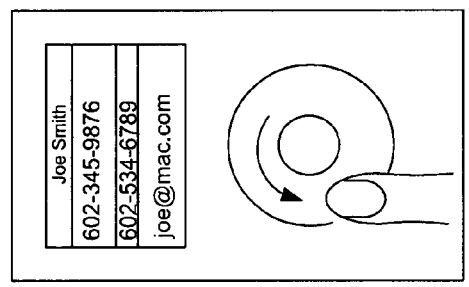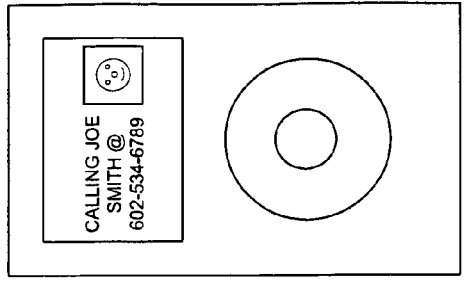

PORTABLE ELECTRONIC DEVICE CONFIGURED TO PRESENT CONTACT IMAGES

CROSS-REFERENCE TO OTHER APPLICATIONS

This application is a continuation of U.S. patent application Ser. No. 11/767,409, filed Jun. 22, 2007, entitled "MEDIA PLAYER WITH IMAGED BASED BROWSING", which is herein incorporated by reference, and which in turn claims priority to: (i) U.S. Provisional Patent Application No. 60/843,832, filed Sep. 11, 2006, entitled "TECHNIQUES AND SYSTEMS FOR BROWSING MEDIA CONTENT", which is herein incorporated by reference; and (ii) U.S. Provisional Patent Application No. 60/878,746, filed Jan. 5, 2007, entitled "ELECTRONIC DEVICE WITH IMAGE BASED BROWSERS", which is herein incorporated by reference.

This application also references U.S. patent application Ser. No. 11/519,460, filed Sep. 11, 2006, entitled "MEDIA MANAGER WITH INTEGRATED BROWSERS", which is herein incorporated by reference.

BACKGROUND OF THE INVENTION

Description of the Related Art

Today, media playback devices, such as media players or music players, have storage capacity to store large collections of media, such as music. With such large media collections, in order for a user to select a particular song to be played by the media player, the user typically navigates through a long list of songs. As an example, the user could interact with the media player to display a list of artists that have songs that are stored within the media collection on the media player. The user then scrolls through the list and selects an appropriate song to be played. Unfortunately, however, as the storage capacity of media players increases, the number of songs stored in a media collection on a media player increases. Consequently, the list through which users must navigate in order to select a song can be extensive.

Therefore, improved methods for browsing through content are desired.

SUMMARY OF THE INVENTION

One aspect of the invention relates to imaged based browsing that allows a user to navigate through and/or select images. In one embodiment, the invention pertains to methods and systems for navigating or browsing through images, such as contact images, on electronic devices, such as a portable electronic device having a touch screen display. Advantageously, in one embodiment, users of electronic devices are able to browse through contact images to locate a particular contact within a plurality of contacts available (e.g., stored) on the electronic devices.

The invention relates, in one embodiment, to a portable electronic device having an imaged based browser window for navigating through and selecting images that are related to data. Selecting an image causes an action to be initiated at the portable electronic device. The action may for example correspond to playing a media item associated with the image or launching a menu that lists media items associated with the image. Navigating through the images may be initiated with an input arrangement of the portable electronic device. In one example, navigating through the images horizontally is provided by rotational user inputs. In another example, navigating through the images horizontally is provided by linear user inputs. The user inputs may for example be accomplished through various input devices. In one embodiment, the input device is an object sensing device such as a touch sensing device. In one example, the input device is selected from touch pads, touch screens and touch sensitive housings.

The invention relates, in another embodiment, to a method for browsing images stored on a portable electronic device having a display and a user input device. The method includes presenting an image browser window that displays a plurality of images from a group of images. The images may be associated with media items. The method also includes performing an action associated with an image when the image is selected. The method further includes transitioning through the group of images in accordance with a user input. By way of example, the user input may be a rotational or linear user input. Furthermore, the input device may for example be a touch sensing device.

The invention relates, in another embodiment, to a portable electronic device. The portable electronic device includes a display device. The portable electronic device also includes a user input device. The user input device may for example be a touch sensing device such as a touch pad, touch screen or touch sensitive housing. The portable electronic device further includes at least one memory device capable of storing a plurality of images associated with one or more data items and computer program code for displaying, navigating and selecting the plurality of images. The portable electronic device additionally includes a processing device operatively connected to the display device, the user input device and the at least one memory device. The processing device is capable of executing the computer program code for displaying, navigating, and selecting the plurality of images. The plurality of images from a group of images are displayed, and transitioned through in accordance with a user input at the user input device. The user input may for example be a linear user input or a rotational user input. Furthermore, the images may be configured to move horizontally across the display device during transitioning.

The invention relates, in another embodiment, to a method of operating a portable electronic device. The method includes displaying an image based browser window. The method also includes detecting an object over a sensing surface. The sensing surface may for example be a touch sensing surface. The method further includes transitioning through images of image based browser in accordance with a navigation input associated with a moving object. The object may for example be a finger swirling, swiping or sliding relative to the sensing surface. The method additionally includes presenting selectable data items associated with a selected image in accordance with a first selection input. Moreover, the method includes initiating an action associated with a selected data item in accordance with a second selection input.

The invention relates, in another embodiment, to a handheld electronic device having a touch screen display. The touch screen display presents a plurality of images in at least two groups. A first group is presented in a first format. A second group is presented in a second format. The plurality of images is sequentially advanced from the first group to the second group in response to a user sliding their finger along a surface of the touch screen display. The advancing may be substantially proportional the speed of the finger as it is slid along the surface of the touch screen display.

The invention relates, in another embodiment, to a handheld electronic device having a display and a touch pad. The display presents a plurality of images in at least two groups. A first group is presented in a first format. A second group is presented in a second format. The plurality of images sequentially advancing from the first group to the second group in response to a user sliding their finger along a surface of the touch pad. The advancing may be substantially proportional the speed of the finger as it is slid along the surface of the touch pad.

The invention relates, in another embodiment, to an electronic device. The electronic device includes a storage device for storing a plurality of media items and a touch screen display. The electronic device also includes an image browser module operable to present images associated with the media items on the touch screen display and to permit a user to browse through the images to locate a particular media item within the media items. The electronic device further includes a playback module operable to play back the particular media item.

The invention relates, in another embodiment, to a computer readable medium including tangible computer program code executable by a computer for browsing images stored on an electronic device. The electronic device may have a display and a user input device. The computer readable medium may include at least: computer program code for presenting an image browser window that displays a plurality of images from a group of images; computer program code for transitioning through the group of images in accordance with at least one user input; computer program code for selecting one of the images from the group of images following the transitioning; and computer program code for subsequently performing an action associated with the selected image.

The invention relates, in another embodiment, to a portable electronic device, including at least: a display device; a user input device; at least one memory device capable of storing a plurality of images associated with contacts; and a processing device capable of operating to display, navigate, and select the plurality of images. Further, a plurality of the images associated with the contacts can be concurrently displayed on the display device. The images being displayed can be transitioned through in accordance with at least one user input at the user input device.

The invention relates, in another embodiment, to an electronic device, including at least: a storage device for storing an address book including a contact image and contact data for each of a plurality of contacts; a touch screen display; and an image browser module operable to present the contact images associated with the contacts on the touch screen display and to permit a user to browse through the contact images to locate a particular contact within the plurality of contacts.

BRIEF DESCRIPTION OF THE DRAWINGS

The invention may best be understood by reference to the following description taken in conjunction with the accompanying drawings in which:

FIGS. 24A-24H illustrate an exemplary browsing sequence using the methods described in FIG. 22, in accordance with one embodiment of the present invention.

DETAILED DESCRIPTION OF THE INVENTION

One aspect of the invention relates to imaged based browsing that allows a user to navigate through and/or select images. In one embodiment, the invention pertains to methods and systems for navigating or browsing through images, such as contact images, on electronic devices, such as a portable electronic device having a touch screen display. Advantageously, in one embodiment, users of electronic devices are able to browse through contact images to locate a particular contact within a plurality of contacts available (e.g., stored) on the electronic devices.

In accordance with one embodiment, an electronic device can perform or provide an image based browser function to perform image based browsing. The image based browser function provides a graphical user interface that allows a user to navigate through and/or select images rather than textual menu items contained in a conventional menu list (e.g., vertical menu). Image based browsing can provide efficient, graphical browsing (e.g., scrolling) through a group of digital items that can are or can be represented in a visual manner.

The images being browsed may be related or linked to data. For example, the images may be associated with media files, address files, date book files, document files, applications, modes, etc. In one embodiment, image browsing may be implemented to mimic turning pages or flipping through rolodex or calendar, or flipping through LP records or CD's in a bin.

These and other embodiments of the invention are discussed below with reference to FIGS. 1-38. However, those skilled in the art will readily appreciate that the detailed description given herein with respect to these figures is for explanatory purposes as the invention extends beyond these limited embodiments.

Figure 1:
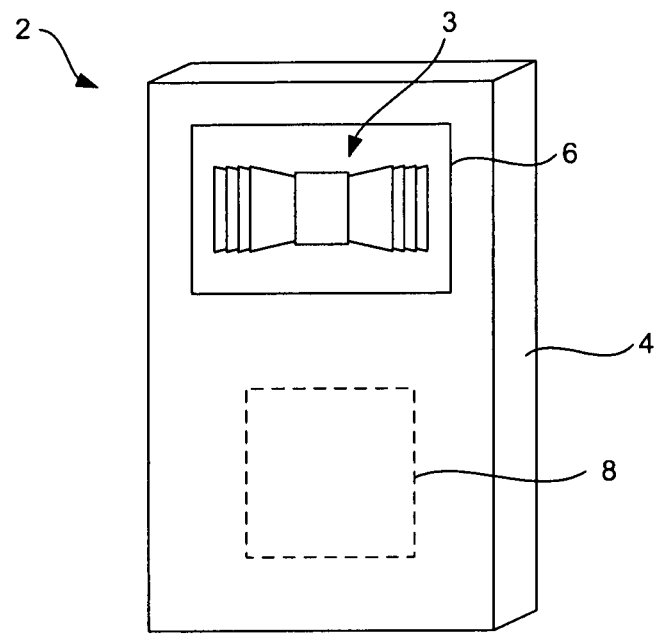
FIG. 1 is a diagram of an electronic device, in accordance with one embodiment of the invention.

FIG. 1 is a diagram of an electronic device 2, in accordance with one embodiment of the invention. The electronic device 2 may for example be a portable electronic device that is easily transported or conveyed.

The electronic device can for example correspond to a computer (e.g., personal computer), mobile phone (e.g., cellular phone), personal digital assistant (PDA), media player (e.g., music, videos, games, images), media storage device, camera, remote control, and/or the like. The electronic device may also be a multi-functional device that combine two or more of these device functionalities into a single device. Examples of multi-functional devices can be found in U.S. Provisional Patent Application No. 60/658,777 filed Mar. 4, 2005 and entitled "MULTI-FUNCTIONAL HAND-HELD DEVICE", which is herein incorporated by reference.

The electronic device may further be a hand-held electronic device. The term hand-held generally means that the electronic device has a form factor that is small enough to be comfortably held in one hand. A hand-held electronic device may be directed at one-handed operation or two-handed operation. In one-handed operation, a single hand is used to both support the device as well as to perform operations with the user interface during use. In two-handed operation, one hand is used to support the device while the other hand performs operations with a user interface during use or alternatively both hands support the device as well as perform operations during use. In some cases, the hand-held electronic device is sized for placement into a pocket of the user. By being pocket-sized, the user does not have to directly carry the device and therefore the device can be taken almost anywhere the user travels (e.g., the user is not limited by carrying a large, bulky and often heavy device).

In accordance with one embodiment, the electronic device 2 is capable of performing an image based browser function. The image based browser function provides a graphical user interface that allows a user to navigate through and/or select images rather than textual menu items contained in a conventional menu list (e.g., vertical menu). It should be noted however that the electronic device 2 is not limited to image based browsers and often includes both menu driven lists and image based browsers. In fact, the electronic device 2 may be configured to operate in either configuration depending on the needs of the device, software platform and/or user. In some cases, the electronic device 2 may even operate both menu driven lists and image based browsers at the same time.

Generally speaking, the image based browser provides a scrolling type action that permits a user to flip through images in an efficient and user friendly manner. The images generally describe graphically some aspect of a file stored on the electronic device 2. In many cases, the browser includes at least a viewing area which provides a location where images from a group of images are taken in and out of view. The viewing area typically only displays a small portion of the total number of images that are available in the group of images. The images may for example move from one position to the next position along a path that is contained or spread across the viewing area. The path can be an open ended line fixed along an axis such as horizontal or vertical axis. Alternatively, the path may not be fixed along an axis. For example, the path may be associated with a waveform (e.g., sinusoidal). In other cases, the path may be closed ended thereby forming a shape. For example, the path may follow a shape such as circular, oval, triangular, square, rectangular, and/or the like.

The images contained in the browser may be widely varied. The images may for example be album art, which represents one or more songs stored on the portable electronic device. The images may also be thumbnail pictures of photos stored on the portable electronic device. The images may also be icons that represent applications stored on the portable electronic device. The images may also represent months or days of a date book which is stored on the portable electronic device. The images may also be pictures of people whose information is stored in an address book of the portable electronic device. The images may also be icons that represent various modes of the portable electronic device. The images may also be symbols or characters for inputting information into the portable electronic device. The images may also be images of documents such as PDF, word processing or spreadsheet documents (e.g., pdf, doc, xls).

Additional details on image based browsers and menu lists for electronic devices are provided in: (1) U.S. patent application Ser. No. 10/282,861, filed Oct. 28, 2002 and entitled "GRAPHICAL USER INTERFACE AND METHODS OF USE THEREOF IN A MULTIMEDIA PLAYER", (2) U.S. patent application Ser. No. 11/519,460, filed Sep. 11, 2006 and entitled "MEDIA MANAGER WITH INTEGRATED BROWSERS", both of which are herein incorporated by reference.

Further details regarding image based browsers and menu lists will be described in greater detail below.

In the illustrated embodiment, the electronic device 2 is a portable electronic device that includes a housing 4, at least one display device 6 and one or more user input devices 8, all of which can be located on a front, side, and/or back surface of the housing 4. The display device 6 may for example be used to display an image based browser 3 that is associated with the image based browser function and the user input devices 8 may be used to navigate through and/or select images, which are stored on the portable electronic device 2. Of course, the display device 6 and input devices 8 can also be used for other functionalities of the portable electronic device 2 including for example menu driven lists.

The display device 6 can, for example, include a liquid crystal display (LCD), display, an organic light emitting diode (OLED) display, a display based on electronic inks, and/or the like. The display device 6 may have a variety of different configurations depending on the overall footprint of the portable electronic device 2. By way of example, and not by way of limitation, the display device 6 may have a traditional aspect ratio of about 4:3 or it may have an aspect ratio that is more panoramic such as 16:9.

In one embodiment, the electronic device 2 includes a small display at a portion of the front surface of the electronic device 2. In another embodiment, the display device 2 is configured to cover at least a majority of the front surface of the electronic device 2. For example, the area of the display device may consume greater than 50% of the area of the front surface, and further greater than 75% of the area of the front surface. The electronic device 2 may be configured with a full screen display or a near full screen display that consumes, or at least dominates, a surface (e.g., front surface) of an electronic device 2. In one implementation, a full screen display consumes substantially the entire front surface of the electronic device 2 (in both directions). The full screen display may extend edge to edge or it may fit within a small bezel of the housing at the edge of the device.

In addition, the user input devices 8 can, for example, include one or more mechanically and/or electrically driven input devices. Mechanically driven input devices include such mechanisms as buttons, keys, switches, dials, navigation pads, joysticks, jog balls, and/or the like. Electrically driven input devices may include for example object sensing devices such as proximity sensing devices that detect objects located above a surface (e.g., front surface) and/or touch sensing devices that detect objects touching a surface (e.g., front surface). Examples of touch sensing devices include touch pads, touch screens and touch sensitive housings, and/or the like.

The number and combination of input devices used in the electronic device generally depends on the desired needs of the electronic device. In most cases, the electronic device 2 includes at least input devices for navigating and selecting content stored on the electronic device 2.

In one embodiment, navigation commands for traversing through images of the image based browser are generated by rotational and/or linear user inputs. Of course, the navigation commands may also be used for traversing through menu lists. Devices for linear user inputs include for example touch devices, proximity devices, mechanical sliders, vertical or horizontal scroll wheels, soft scroll bars and/or the like. Devices for rotational user inputs include for example touch devices, proximity devices, mechanical dials, soft dials and/or the like. Selection commands for selecting images and menu items may be implemented through the same input devices used for navigation, or alternatively through separate input devices. For example, a touch pad may be used for navigation while selections may be made with a button, or alternatively a touch screen may be used for both navigation and selections.

The layout of the I/O device can be widely varied. In some embodiment, all of the necessary I/O devices for displaying and navigating through menus/browsers and making selections thereof are located on the front surface of the portable electronic device 2. The user is therefore capable of easily manipulating the input devices 8 while viewing the display device 6.

In one embodiment, the front surface of the portable electronic device 2 is divided into a display region and an input region. For example, the display region may be located at a top portion of the front surface and the input region may be located at a bottom portion of the front surface. As one example, this may be implemented with a small landscape display device in the upper half of the front surface and a touch pad or tiltable navigation pad along with one or more buttons in the lower half of the front surface. In another embodiment, the display and input regions are configured to substantially cover the same area of the front surface (whether a portion or substantially the entire front surface). This may be implemented with a touch screen that overlays a display. In either embodiment, the device may additionally include other controls and ports on the top, bottom and side surfaces.

Additionally, internal to the housing 4 of the portable electronic device 2 are various software or electrical components in support of the browser function and other functions of the portable electronic device 2.

Figure 2:
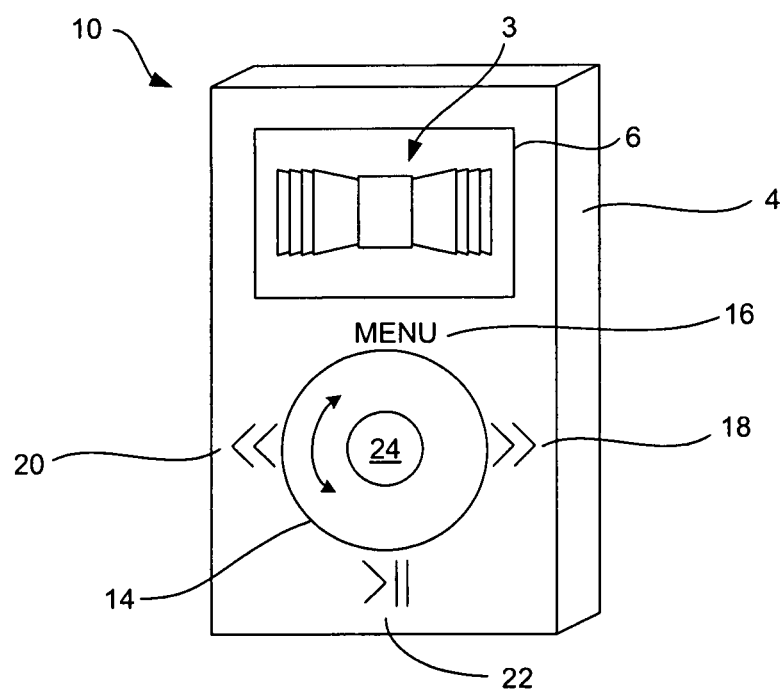
FIG. 2 is a diagram of a portable electronic device, in accordance with one embodiment of the invention.

FIG. 2 is a diagram of a portable electronic device 10, in accordance with one embodiment of the invention. The portable electronic device 10 can, for example, represent one implementation of the electronic device 2 shown in FIG. 1.

In this embodiment, the portable electronic device 10 includes a rotational user input device 14 that is provided on a front surface of the housing 4 along with the display device 6. The rotational user input device 14 receives at least rotational user inputs from a user of the portable media player 10 to interact with menus, lists, browsers, etc. being displayed on the display device 6. The rotational user input device 14 can for example correspond to a dial or a touch pad. In the case of a dial, a circular platform is rotated about an axis in order to generate rotational user inputs. In the case of a touch pad, an object such as a finger is swirled around a touch sensing platform in order to generate rotation user inputs (e.g., arcuate or circular motions). The touch sensing platform may have a circular shape to help facilitate a circular motion.

The rotational user input may enable navigation through a group of images associated with an image based browser. For example, as shown, the rotational user input may be used to scroll through images that move along a predetermined path from one position to the next (e.g., horizontally in and out of screen). Aspects of the traversal may be based on one or more characteristics of the circular motion including but not limited to direction, speed, acceleration, and/or the like.

The portable electronic device 10 can also support various button-actions via one or more button-action regions 16-22. The button-action regions 16-22 can be separate from or integrated with the rotational user input device 14. In one embodiment, the button action regions can be integrated within the surface or platform of the rotation user input device 14. However, in other embodiments, the button action regions can be provided at other locations on the housing 4 of the portable electronic device 10. For example, they may surround the rotational user input device or they may be spatially separated from the rotational user input device 14.

The user of the portable electronic device 10 can press on or proximate to the button-action regions 16-22 to signal the portable electronic device 10 as to a particular user input. The button-action regions 16-22 can provide button-like functions. As an example, the button-action regions 16-22 can respectively correspond to common media player inputs of Menu, Next, Back, and Play/Pause. Alternatively, the button-action regions can correspond to common phone inputs as for example 1, 2, 3, 4, 5, 6, 7, 8, 9, 0, *, and #.

The portable electronic device 10 can also include a select button region 24. The select button region 24 can be separate from or integrated with the rotational user input device 14. In the illustrated embodiment, the select button region 24 is provided at the center of the rotational user input device 14. However, in other embodiments, the select button region 24 can be provided at other locations on the housing of the portable electronic device 10.

The select button region 24 generally provides a select or enter type of function. The user of the portable media player 10 can press on or proximate to the select button region 24 to signal the portable electronic device 10 that a selection should be made. For example, the select button region 24 can be used to select an image of the image browser.

Additional details on rotational user input devices for electronic devices are provided in: (1), U.S. patent application Ser. No. 10/722,948, filed Nov. 25, 2003 and entitled "TOUCH PAD FOR HANDHELD DEVICE", (2) U.S. patent application Ser. No. 10/188,182, filed Jul. 1, 2002 and entitled "TOUCH PAD FOR HANDHELD DEVICE", (3) U.S. patent application Ser. No. 10/643,256, filed Aug. 18, 2003 and entitled "MOVABLE TOUCH PAD WITH ADDED FUNCTIONALITY", (4) U.S. patent application Ser. No. 10/256,716, filed Sep. 26, 2002 and entitled "METHOD AND APPARATUS FOR ACCELERATED SCROLLING", (5) U.S. patent application Ser. No. 10/259,159, filed Sep. 26, 2002 and entitled "METHOD AND APPARATUS FOR USE OF ROTATIONAL USER INPUT", (6) U.S. patent application Ser. No. 11/483,008, filed Jul. 6, 2006 and entitled "CAPACITANCE SENSING ELECTRODE WITH INTEGRATED I/O MECHANISM", (7) U.S. patent application Ser. No. 11/482,286, filed Jul. 6, 2006 and entitled "MUTUAL CAPACITANCE TOUCH SENSING DEVICE", (8) U.S. Patent Publication No. 2003/0076301, (9) U.S. Patent Publication No. 2003/0095096, (10) U.S. Patent Publication No. 2003/0055446, (11) U.S. Pat. No. 7,046,230 and (12) U.S. Pat. No. 7,084,856 B2 all of which are herein incorporated by reference.

It should be appreciated that linear user input devices may alternatively be used in place of or in addition to the rotational user input device. The linear user input device for example receives at least linear user inputs from a user of the portable electronic device 10 to interact with menus, lists, browsers, etc. being displayed on the display device 12. The linear user input device can for example correspond to a mouse scroll wheel, slider mechanism or a touch pad. In the case of a mouse scroll wheel, a wheel is rotated about an axis in order to generate linear user inputs. In the case of a slider mechanism, a knob is physically translated up or down or side to side in order to generate linear user inputs. In the case of a touch pad, an object such as a finger is swiped or slid up or down or side to side about a touch sensing platform in order to generate linear user inputs. The linear user input may be used to navigate through a group of images associated with an image based browser.

Figure 3:
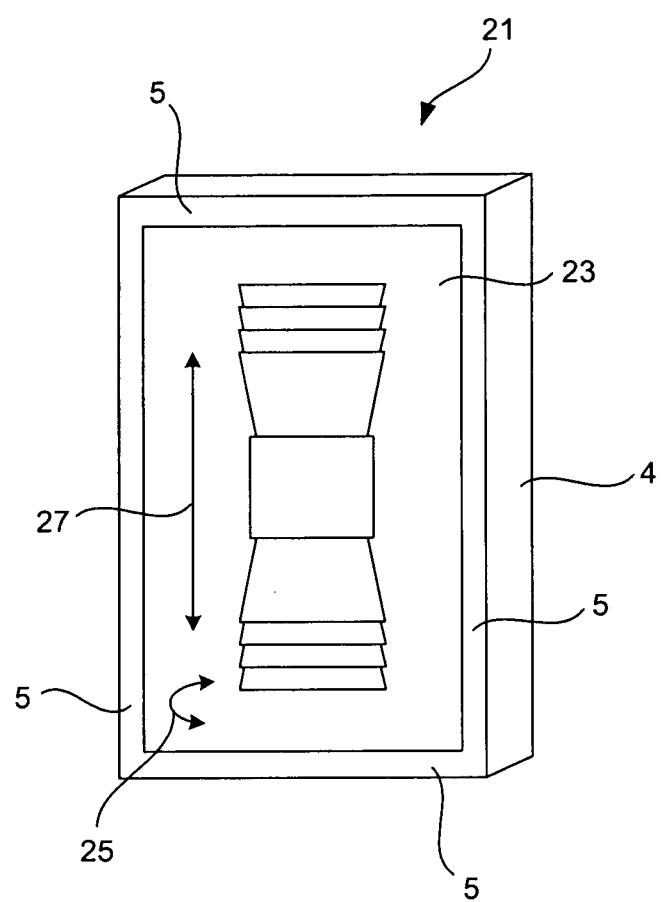
FIG. 3 is a diagram of a portable electronic device, in accordance with one embodiment of the invention.

FIG. 3 is a diagram of a portable electronic device 21, in accordance with one embodiment of the invention. The portable electronic device 30 can, for example, represent one implementation of the portable electronic device 2 shown in FIG. 1.

In this embodiment, the portable electronic device 21 includes a touch screen display 23 that senses objects sliding across its surface. The objects may for example be one or more fingers. The touch screen display 23 is capable of detecting various actions including rotational motions associated with rotation user inputs 25 and/or swipes or slides associated with linear user inputs 27 to interact with menus, lists, browsers, etc. being displayed on the touch screen display 23. The touch screen display 23 is also capable of detecting pressing, tapping or holding actions, which can be associated with selection user inputs. Of course, the touch screen display is capable of detecting other types of actions as well. The actions are sometimes referred to as gestures.

The touch screen display 23 may consume a large area of the front surface of the portable electronic device 21. By way of example, the touch screen display may be a full or near full screen display.

Furthermore, the touch screen display 23 may be capable of sensing multiple touches at the same time (e.g., multipoint sensing).

Touch screen displays have several advantages over other input technologies. For example, the touch screen sensing is positioned in front of the display and therefore the user can manipulate the GUI directly. In addition, the touch screen allows the display area to be enlarged as other input means are typically not necessary.

Additional details on touch screen displays and gestures for electronic devices are provided in: (1) U.S. patent application Ser. No. 10/840,862, filed May 6, 2004 and entitled "MULTIPOINT TOUCHSCREEN", (2) U.S. patent application Ser. No. 10/903,964, filed Jul. 30, 2004 and entitled "GESTURES FOR TOUCH SENSITIVE INPUT DEVICES", (3) U.S. patent application Ser. No. 11/038,590, filed Jan. 18, 2005 and entitled "MODE-BASED GRAPHICAL USER INTERFACES FOR TOUCH SENSITIVE INPUT DEVICES", (4) U.S. Provisional Patent Application No. 60/763,605, filed Jan. 30, 2006 and entitled "GESTURING WITH A MULTIPOINT SENSING DEVICE", (5) U.S. patent application Ser. No. 11/057,050, filed Feb. 11, 2005 and entitled "DISPLAY ACTUATOR", all of which are herein incorporated by reference.

Additionally or alternatively, the electronic device may include a proximity sensing device that senses objects hovering over rather than touching the front surface of the electronic device. Examples of proximity sensing devices can be found in U.S. patent application Ser. No. 11/241,839, filed Sep. 30, 2005 and entitled "PROXIMITY DETECTOR IN HANDHELD DEVICE", and U.S. patent application Ser. No. 11/240,788, filed Sep. 30, 2005 and entitled "PROXIMITY DETECTOR IN HANDHELD DEVICE", which are herein incorporated by reference.

Additionally or alternatively, the electronic device may include a touch sensing housing that senses objects on portions of the housing that surround the display. In one example, the bezel that surrounds the edge of the display may include an embedded touch sensing device capable of receiving linear motions associated with linear user inputs. Examples of touch sensing devices utilized in housings can be found in U.S. patent application Ser. No. 11/115,539, filed Apr. 26, 2005 and entitled "HAND HELD ELECTRONIC DEVICE WITH MULTIPLE TOUCH SENSING DEVICES", which is herein incorporated by reference.

Figure 4:
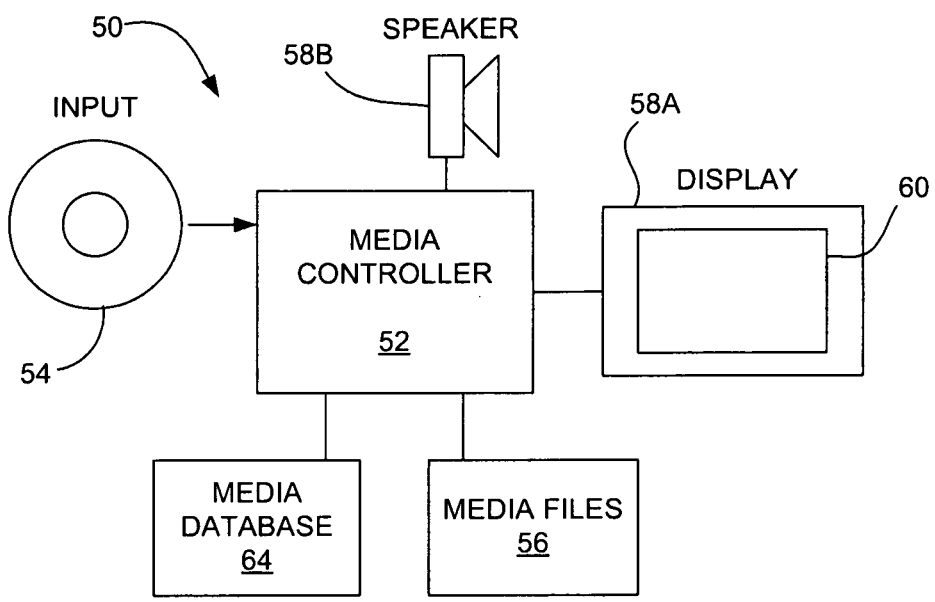
FIG. 4 is a simplified block diagram of a portable electronic device capable of storing, cataloging, selecting and outputting data, in accordance with one embodiment of the present invention.

FIG. 4 is a simplified block diagram of a portable electronic device 50 capable of storing, cataloging, selecting and outputting data, in accordance with one embodiment of the present invention. The electronic device 50 may for example correspond to any of those electronic devices mentioned previously with regards to FIGS. 1-3.

The electronic device 50 includes a controller 52 configured to manage operations performed at the electronic device 50. The controller 52 may receive inputs from various input devices 54. The input devices may for example be selected from buttons, keys, mechanical pads, touch pads, touch screens, and the like.

The controller 52 may also be configured to control outputs through various output devices 58. The output devices 58 may for example include a display 58A and one or more speakers or speaker jacks 58B. By way of example, image based data such as video and images may be outputted via the display 58A and audio based data such as music or voice may be outputted via one or more speaker or speaker jacks 58B.

The controller 52 may additionally be configured to generate graphical user interfaces 60 on the display 58A. The graphical user interface 60 provides an easy to use interface for controlling operations performed at the electronic device. The graphical user interface 60 may be created using data stored locally in a database 64. The database 64 generally includes information that describes various aspects of files stored at a file system 66. The information may for example include metadata, descriptors and images associated with particular files. By way of example, in the case of songs, the information may include song name, album name, artist name, time, genre, album art, and the like.

Generally speaking, the GUI 60 represents applications, files and operational controls with graphical images. The graphical images may include windows, fields, dialog boxes, menus, icons, buttons, cursors, scroll bars, folders, lists, text, etc. Such images may be arranged in predefined layouts, or may be created dynamically to serve the specific actions being taken by a user. During operation, the user can select and activate various graphical images in order to initiate functions and tasks associated therewith. By way of example, a user may select a button that opens, closes, minimizes, or maximizes a window, or an icon that launches a particular application or functionality. The GUI can additionally or alternatively display information, such as non interactive text and graphics.

In accordance with one embodiment, the controller 52 is configured to generate one or more graphical user interfaces 60 for scrolling or traversing through data files stored locally at the electronic device. In one embodiment, a first GUI is configured to present textual data associated with data files. The textual data may for example be presented in vertical rows as part of a menu list. In another embodiment, a second GUI is configured to present images associated with data files pulled from the database 44. The images may for example be presented in an image based browse window provided by an image based browser. The image based browse window allows a user to browse through images instead of rows of text based menu items. In both embodiments, the data for building the GUI can be stored in the database 64. That is, when the controller 52 is assigned the task of generating the GUI, the appropriate data associated with the files to be presented are acquired from the database. When rendering the images on a display device, the controller 52 can also produce transitions, animations, shadows, reflections or other visual effects.

With either GUI, a user of the portable electronic device is able to scroll through the menu or the images by making an input. In one embodiment, the input is a rotational user input created either by swirling his or her finger across a touch pad/touch screen/touch sensitive housing or by rotating a dial. In this embodiment, as the finger moves around the touch pad/touch screen/touch sensitive housing or as the dial is rotated, the displayed items from the list of media items or the images from the group of images are varied such that the user is able to effectively scroll through the list of media items and the group of images. In another embodiment, the input is a linear user input created either by swiping his or her finger across a touch pad/touch screen/ touch sensitive housing or by translating a mechanical slider or by rotating a scroll wheel. In this embodiment, as the finger slides along the touch pad/touch screen/touch sensitive housing or as the slider mechanism is translated or the scroll wheel is rotated, the displayed items from the list of media items or the images from the group of images are varied such that the user is able to effectively scroll through the list of media items and the group of images.

Although not shown, the device may additionally include one or more data capture devices such as microphones or cameras. Data capture devices are configured to capture data in the form of audio, images or video. The controller 52 is configured to catalog the data and store in the media database and/or in appropriate files.

Although not shown, the device may additionally include an I/O port which provides connectivity to other devices and/or systems. The I/O port may for example allow the portable electronic device to communicate with a host device, peripheral I/O devices or power supplies. This may for example be accomplished through wired or wireless connections.

Although not shown, the device may further include one or more devices that provide audio and/or haptic feedback to a user. The audio feedback can, for example, be a clicking or flipping sound. The haptic feedback can for example be pulsed vibrations.

In one embodiment, the feedback coincides with data traversal. As the rate of transitioning through data increases or speeds up, the frequency of the feedback increases. In addition, when the rate of transitioning through data decreases or slows, the rate of transitioning through the data decreases, the frequency of the feedback decreases. Hence, the feedback is provided to the user as to the rate in which the data is being traversed. The data may for example be items in a hierarchal menu list and/or images associated with an image based browser.

FIGS. 5-8 are various diagrams of a browse windows 80A-D capable of browsing through images, in accordance with several embodiments of the present invention. The browse windows 80A-D may for example be used in the graphical user interface of FIG. 4. In each of these embodiments, the browse windows 80A-D provides a scrolling type action that permits a user to scroll or flip through images 86 in an efficient and user friendly manner. The images 86 typically describe graphically some aspect of one or more data files. In the case of a song file, the image 86 may be album art. In the case of an audio book file, the image 86 may be a book cover. In the case of a movie file, the image 86 may be poster art. In the case of a game file, the image 86 may be the cover jacket of the game. In the case of a photo file, the image 86 may be thumbnail picture. In the case of an address book, the image 86 may be a picture of a person. In the case of a document (e.g., a pdf file), the image may be a rendering of the document. For example, the image may be a thumbnail image of the first page of the pdf document, and may include indication if it is a multiple page document (layered images).

Once a desired image 86 is found, the user can select the desired image 86 in order to initiate an action associated with the image 86. For example, an album art image may be selected to open a menu containing the songs on the album and/or to start playing a song on the album.

As shown in FIGS. 5-8, the browse windows 80A-80D each include a viewing area 82. The viewing area 82 provides a location where images 86 from a group of images are taken in and out of view. The viewing area 82 typically only displays a small portion of the total number of images 86 that are available in the group of images. In most cases, the images 86 move from one position to another along path or line that is spread across the viewing area 82. The path or line may be straight, angled, curved, stepped, waved, serpentine or the like. The number of positions along the line may be widely varied and is typically determined by the size of the viewing area 82, the desired size of the images 86, the length of the path or line and the desired number of images 86 to be viewed at any one time. In some cases, the images 86 may be moved through the viewing area 82 with a visual transition effect or animation. Sound effects such as clicks or flipping noises or vibrations may also be used.

In most cases, the images 86 are presented in a primary position 92 and one or more secondary positions 94 that are next to the primary position 92. The primary position 92 is the location where the images 86 move when they are to be selected. That is, in one implementation, the images 86 can be selected when they are in the primary position 92. In essence, placing the images 86 in the primary position 92 is analogous to highlighting the image 86 (selected but not activated). The secondary positions 94 are holding positions, and the images 86 located thereon are locked from activation. Although limited by their number, the images 86 at the secondary positions 94 allow a user to view what images 86 that are before and after the primary image thereby making browsing easier (the user can visually scan which images are of interest and which are not). In some cases, the user may click on an image at a secondary position 94 in order to move it from the secondary position 94 to the primary position 92. In one embodiment, selection of an image at a secondary position results in rapid traversal through the group of images until the selected image is finally moved into the primary position 92.

The layout and configurations of the images 86 may be widely varied. In one embodiment, the image 86 at the primary position 92 is made to stand out from the images 86 at the secondary positions 94. This may be accomplished by reformatting or configuring the secondary images differently from the primary image thereby alerting the user as to which image is primary and which images are secondary (e.g., by adjusting the size and/or shape of the images). For example, the secondary images may be minimized, obscured, distorted, partitioned, segmented or otherwise modified, altered or adjusted. Additionally or alternatively, this may be accomplished with a graphical highlight effect that shades, surrounds or underlines the image at the primary position. For example, the browser may include a highlight window that the image at the primary position 92 moves under when transitioning across the viewing area 82. Additionally or alternatively, this may also be accomplished by placing an identifier or descriptor underneath or over the image at the primary position 92. For example, the identifier may be the name or title associated with the media file the image represents. By way of example, in the case of a song file, the image may be album art and the identifier may include the artist and album name.

In accordance with one embodiment, when prompted by the user, the input arrangement is configured to generate navigation commands for traversing through the images. In one example, the user simply swirls their finger clockwise or counter clockwise around a touch sensing surface in order to traverse through the images 86. In another example, the user simply swipes their finger across a touch sensing surface in order to traverse through the images 86.

Figure 5:
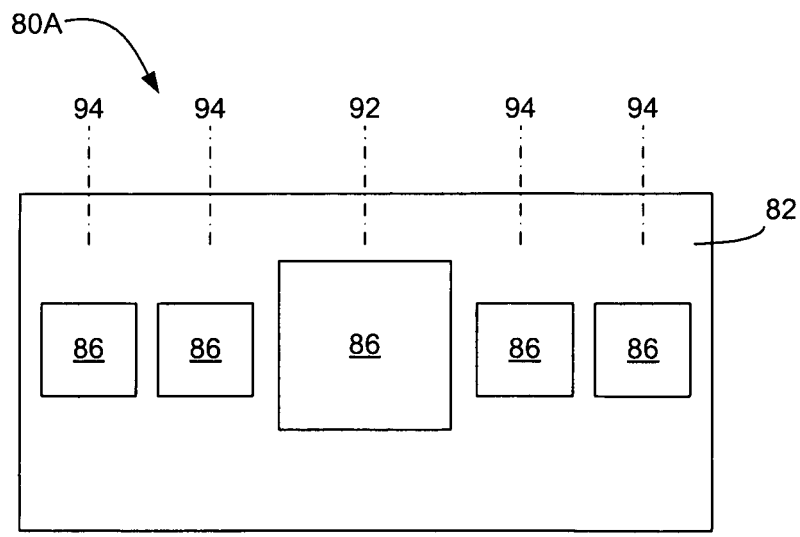
FIG. 5 is a diagram of a browse windows capable of browsing through images, in accordance with several embodiments of the present invention.

FIGS. 5-8 will now be described in detail. In FIG. 5, the path or line is a straight line that runs horizontally across the viewing area 82. During traversal, the images 86 move horizontally as a group across the viewing area 86 from one position to another. When a user initiates a left navigation command, a new image 86 appears at the left position of the viewing area 82 and all other images 86 move over one position. If the viewing area is full, the right most image 86 moves out of the viewing area 82. Similarly, when a user initiates a right navigation command, a new image 86 appears at the right position of the viewing area 82 and all other images 86 move over one position. If the viewing area is full, the left most image 86 moves out of the viewing area 82. This allows a user to view consecutive images currently held outside of the viewing area 82. Furthermore, the images 86 in the secondary positions 94 are typically made smaller than the image 86 in the primary position 92. During browsing, when the images 86 are moved from primary position 92 to secondary position 94, the images 86 can decrease in size and when the images 86 are moved from secondary position 94 to primary position 92, the images 86 can increase in size.

Figure 6:
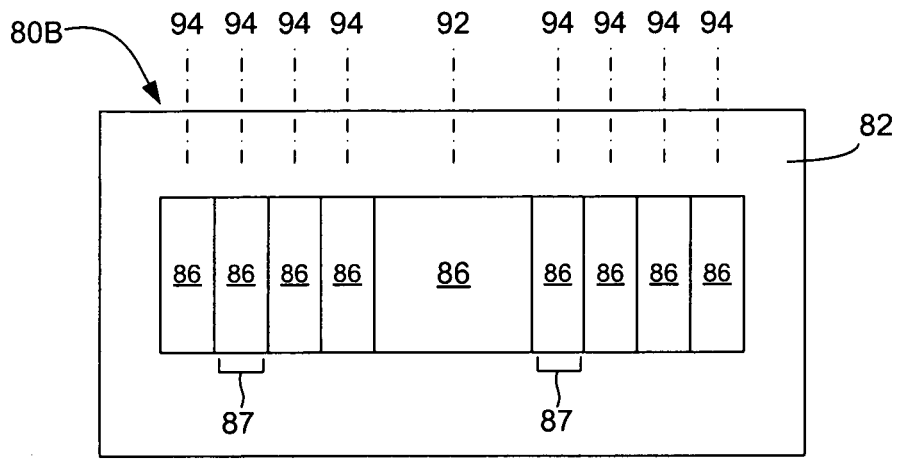
FIG. 6 is a diagram of a browse windows capable of browsing through images, in accordance with several embodiments of the present invention.

FIG. 6 is similar to FIG. 5 in that the images 86 move horizontally across the viewing area 82. However, unlike FIG. 5, the images 86 at the secondary positions 94 are made to appear as if they are layered rather than being spatially separated as in FIG. 5. This allows more images to be presented. In this implementation, each consecutive secondary image partially falls underneath the previous image thereby leaving an edge portion exposed 87. The exposed portion 87 may provide enough visual information for a user to identify the image. The exposed edge portion 87 may also include text based information. During browsing, when the images 86 are moved from the primary position 92 to subsequent secondary positions 94, the images 86 are reconfigured as a partially exposed edge portion 87 and when the images 86 are moved from secondary position 94 to the primary position 92, the images are reconfigured to be a full image view. The images may be reconfigured on the fly or they may be stored in a media database along with the full view images.

Figure 7:
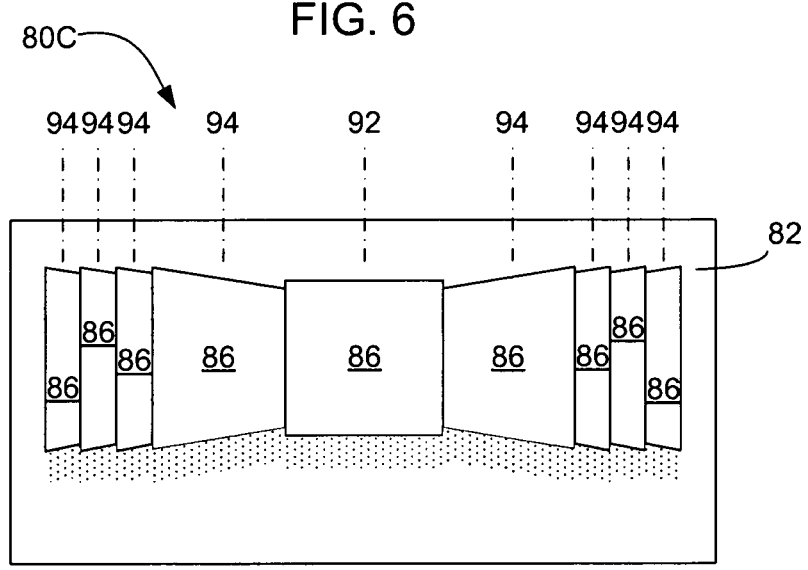
FIG. 7 is a diagram of a browse windows capable of browsing through images, in accordance with several embodiments of the present invention.

FIG. 7 is similar to FIG. 6 in that the images 86 move horizontally across the viewing area 82 and are layered so that more images 86 can be presented. However, unlike FIG. 7, the secondary images immediately next to the primary image are in full view (or substantially full view) with each consecutive secondary image falling underneath the previous image being a partial view.

Furthermore, the images at the secondary positions 94 may be skewed in order to make it look like they are extending from the foreground into the background (e.g., 3D effect). This effect may be created by lowering the top right corner and raising the bottom right corner of each image in a left secondary position and by lowering the top left corner and raising the bottom left corner of each image in a right secondary position. During browsing, when the images 86 are moved from primary position 92 to secondary position 94, the images 86 are skewed and when the images 86 are moved from secondary position 94 to primary position 92, the images 86 are normal.

Moreover, the images 86 may include a reflected portion 96 that extends downward from the base of the image 86. The reflected portion 96 may be created by making a copy of the image, cropping the copy of the image (e.g., shortening), vertically flipping the cropped image, altering the transparency of the flipped image from semi transparent at the top to fully transparent at the bottom (e.g., gradient), and attaching the top of the flipped image to the bottom of the image. Thereafter, the images and any corresponding reflected portion at the secondary positions 94 can be skewed individually or as a combination. The images 86 may be laid over a black background to further aid the reflection effect.

Figure 8:
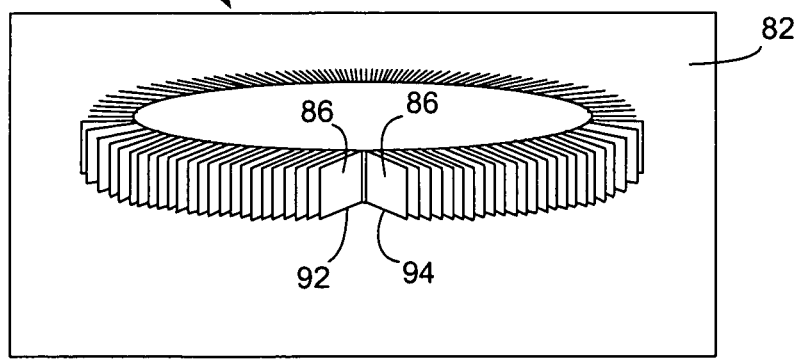
FIG. 8 is a diagram of a browse windows capable of browsing through images, in accordance with several embodiments of the present invention.

Similar to FIG. 7, FIG. 8 includes layered and skewed images. However, unlike the previous embodiments, FIG. 8 includes an oval path around which the images 86 are rotated. As such, all the images 86 can be found in the viewing area 82. This embodiment is somewhat analogous of a rolodex where pages flip around a pivot axis (e.g., virtual rolodex). Also in this embodiment there are two full size central images, one of which is the primary image and one that is a secondary image.

Furthermore, the images 86 are configured to appear as though they are on a visual plane with the two central images appearing in the foreground, and the remaining images at the secondary positions drifting into the background (looks like they are behind and transitioning to a vanishing point from the images in the front positions). This effect may be achieved by reducing the size of the images 86 when they are in the secondary positions and further making the images 86 become smaller and smaller the further the images are from the two front positions.

When following these rules, a worms eye view (the visual angle of the viewer being low) can be created when the primary position is at the highest point on the path, and a birds eye view (the visual angle of the viewer being raised) can be created when the primary position is at the lowest point on the path (as shown). The depth of view in either the worms eye view or birds eye view can be adjusted by altering the height of the oval path. A larger depth of view will be created with an oval path having a larger height, and a smaller depth of view will be created with an oval path having a short height.

During operation, the images 86 are configured to move along the line from one preset position to the next preset position. For example, when a navigation command is received, the images 86 are all moved over one position. That is, they move as a group along the line and stop when they all have shifted to the next preset position. If the navigation command is a left command, the images 86 typically rotate around the line in a counter clockwise motion. If the navigation command is a right command, the images 86 typically rotate around the line in a clockwise motion.

Additional details regarding moving images around a viewing area can be found in U.S. patent application Ser. No. 11/249,139, filed Oct. 11, 2005, titled "MULTIMEDIA CONTROL CENTER", which is herein incorporated by reference.

Figure 9:
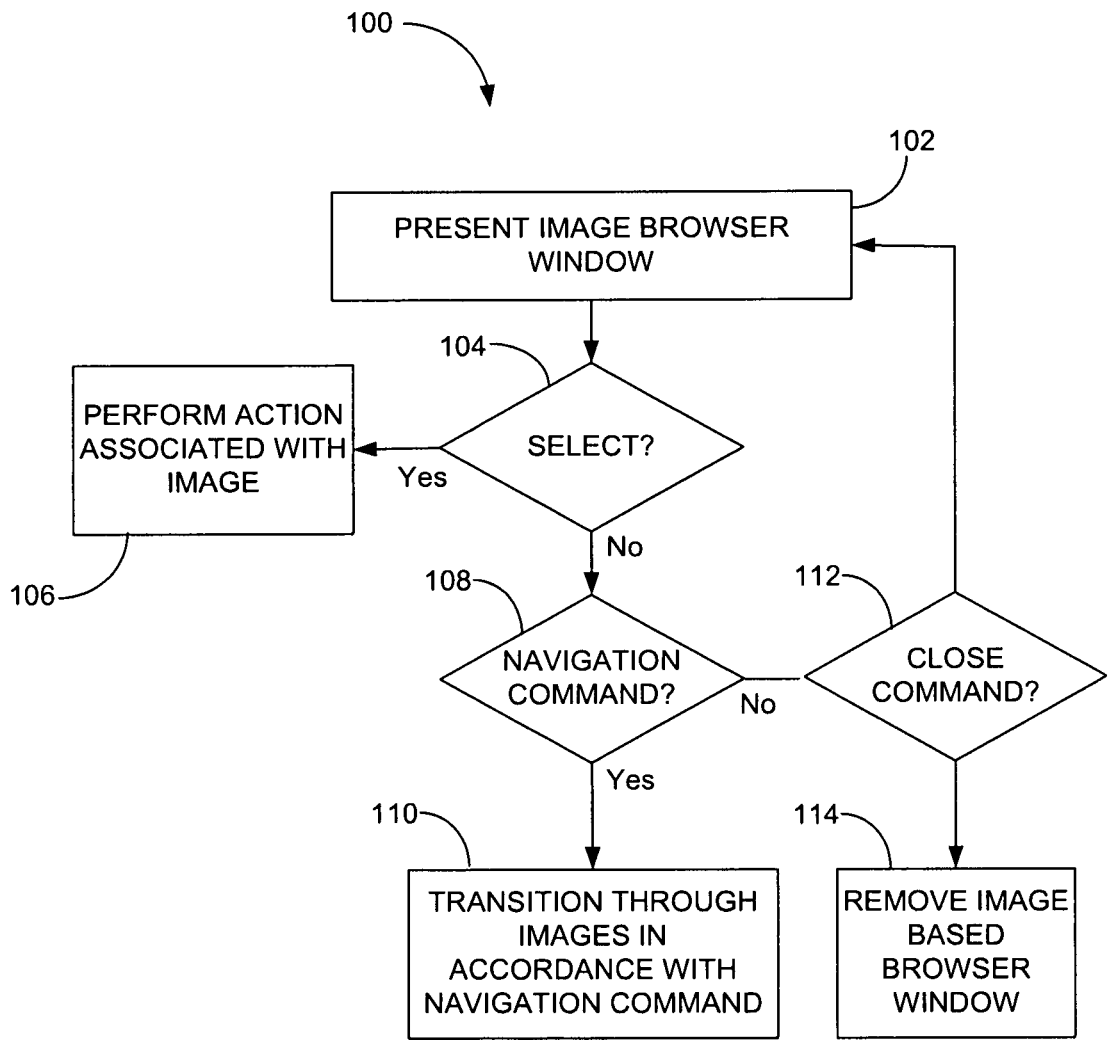
FIG. 9 is a method of operating a browser window, in accordance with one embodiment of the present invention.

FIG. 9 is a method 100 of operating an image based browser window at a portable electronic device, in accordance with one embodiment of the present invention. The method 100 begins at block 102 where an image based browser window is presented. For example, images are obtained from a database or data store and presented in a predetermined format. The image based browser window may present images using any of the image based browser windows described herein.

Following block 102, a determination is made at block 104 as to whether or not a selection has been made. The selection may for example be accomplished by using the select button of the circular input arrangement shown in FIG. 2 or by tapping on the image using the touch screen shown in FIG. 3. If the desired image has been selected, then the method 100 proceeds to block 106 where an action associated with the image is performed. This may for example include opening a menu, playing a media file, launching an application, initiating a mode, enlarging an image, initiating a phone call, opening another browser, and/or the like.

In one example, if the browse window is displaying album art, then selecting a particular album can cause display of a list (e.g., in a menu window) of the songs associated with the album. Alternatively or additionally, selecting an album may initiate a playing sequence starting at the first track of the album.

In another example, if the browse window is displaying movie art, then selecting a particular movie art initiates the playback of the video file associated with the image. Alternatively or additionally, selecting a movie image may open a menu window associated with the movie.

In another example, if the browse window is displaying mode based icons, then selecting a particular mode icon initiates a modal change of the portable electronic device, i.e., the portable electronic device changes to the selected mode. By way of example, the modes may include phone mode, music player mode, microphone recorder mode, camera mode, game player mode, video player mode, email mode, and the like.

In another example, if the browse window is displaying a picture based phone or address book, then selecting a particular picture may provide selectable contact information for the person pictured and/or may initiate a phone call to the person pictured.

In another example, if the browse window is displaying thumbnail picture from a picture library, then selecting a particular thumbnail picture can enlarge the picture for viewing.

In another example, if the browse window is displaying a date book, then selecting a month may open a new browse window associated with days of the month, and then selecting a particular day may open up a new browse window associated with the hours in the day, and selecting a particular hours opens up an entry window for entering events.

In yet another example, if the browse window is displaying a key pad, then selecting a particular character causes that character to be entered as for example in a text or numeric box. This example may be used to make phone calls or to enter text.

In yet another embodiment, if the browse window is displaying a group of applications in the form of icons, then selecting an icon can launch the application associated with the icon.

In yet another embodiment, if the browse window is displaying a document image, then selection of the document image may load a document associated with the document image in addition to an application associated with the document image.

In yet another embodiment, if the browse window is displaying a website image, then selection of the website image may display a webpage form the website associated with the website image.

The browse window can also display more than one items. For example, the browse window may be configured as a finder and thus any data contained within the finder area can be presented through use of images. For example, the browse window may include images of contacts, documents, pictures, movies, and the like.

If an image has not been selected, then the method proceeds to block 108 where a determination is made as to whether or not a navigation command has been made. The navigation command may be generated by a rotational user input or a linear user input. In the case of a rotational user input, the rotational input may be created when a dial is rotated or a finger is swirled around a touch surface such as a touch pad, touch screen or touch sensing housing. In the case of a linear user input, the linear input may be created when a finger is slid across a touch pad, touch screen or touch sensing housing or possibly by translating a mechanical slider or rotating a mouse scroll wheel.

If a navigation command has been generated, then the method 100 proceeds to block 110 where the images are transitioned through in accordance with the navigation command. In the context of a rotational input, the images may be moved left when a counter clockwise rotational input is made, and the images may be moved right when a clockwise rotational input is made (or vice versa). In the context of a linear input, the images may be moved left, when a right linear input is made, and the images may be moved right when a left linear input is made (or vice versa).

Since the group of images can be rather lengthy, the invention provides the ability for the user to rapidly traverse (or scroll) through the group of images by moving his or her finger at greater speeds (the faster the input, the faster the traversal through the images). Moreover, in one embodiment, a user can traverse the group of images in an accelerated manner, such as by accelerating through the group of images whereby some of the images are skipped and thus not displayed.

If a navigation command has not been generated, then the method proceeds to block 112 where a determination is made as to whether or not a close command has been received. If not, the method proceeds back to block 102. If so, the method proceeds to block 114 where the image based browser window is removed (closed). In some cases, the display reverts back to the previous window. In other cases, the display presents a new window associated with the closing command.

In one embodiment, there is a dedicated menu item that opens the image based browser window. That is, the selecting the menu item takes the electronic device directly to the image based browser.

Figure 10:
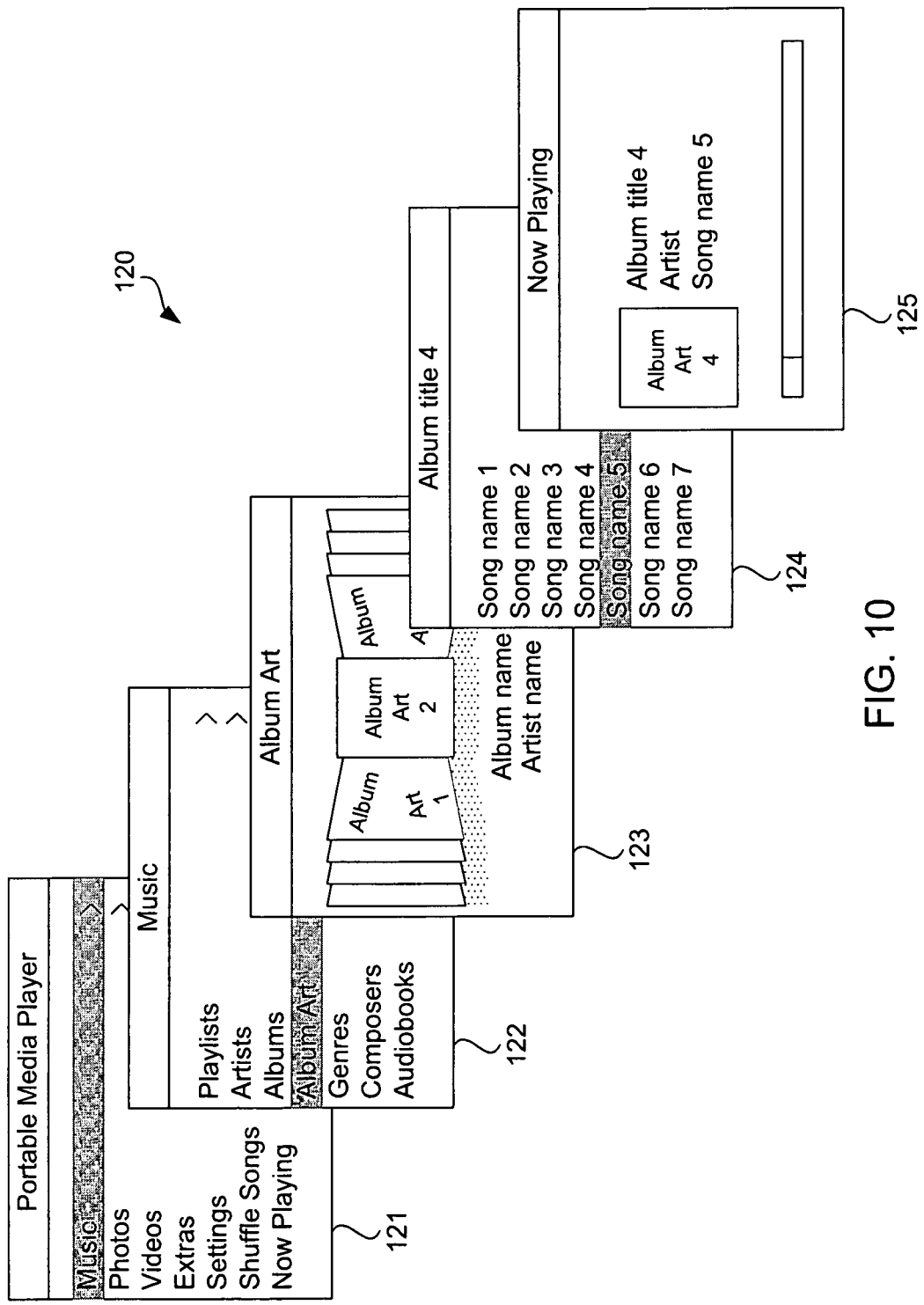
FIG. 10 is a menu hierarchy, in accordance with one embodiment of the present invention.

FIG. 10 is a diagrammatic illustration of a menu hierarchy 120, which uses a dedicated menu item to open an image based browser window. The illustration is associated with a media player, although the concept may be applied to other electronic devices. In this example, a Music item is selected in a main menu 121. Thereafter, an Album art item is selected in a sub menu 122, which launches an image based browser window 123. The images used in the image based browser window 123 are images related to album art. Once an Album image is selected in the image based browser 123, an album content menu 124 for the selected album is opened. For example, all the audio tracks associated with the album can be displayed in list format. Alternatively, the list of selectable audio tracks may be presented at the primary position of the image browser. In one implementation, they may transition into the primary position over the album art (e.g., fade in/out, slide in/out, etc.). In another implementation, the image may flip over in order to present the selectable audio tracks (make it appears as if audio tracks are on back side of album art). This may be analogous to flipping a physical album. Once an audio track is selected, a now playing window 125 is typically opened. Alternatively, once the album is selected, the method may proceed to the now playing window where the first track is played and thereafter the remaining tracks of the album are played (e.g., may skip menu 124).

In another embodiment, a browse mode is selected to adjust how menu items are displayed. In a first mode, they are displayed in a conventional list. In a second mode, they are displayed using an image based browser window. By way of example, a user may need to select a setting menu and choose the mode. In most cases, the second mode is only applied to appropriate menu items. Some menu items are best traversed using the conventional list rather than images. The image based browser may be used for media items such as album and movie titles.

Figure 11:
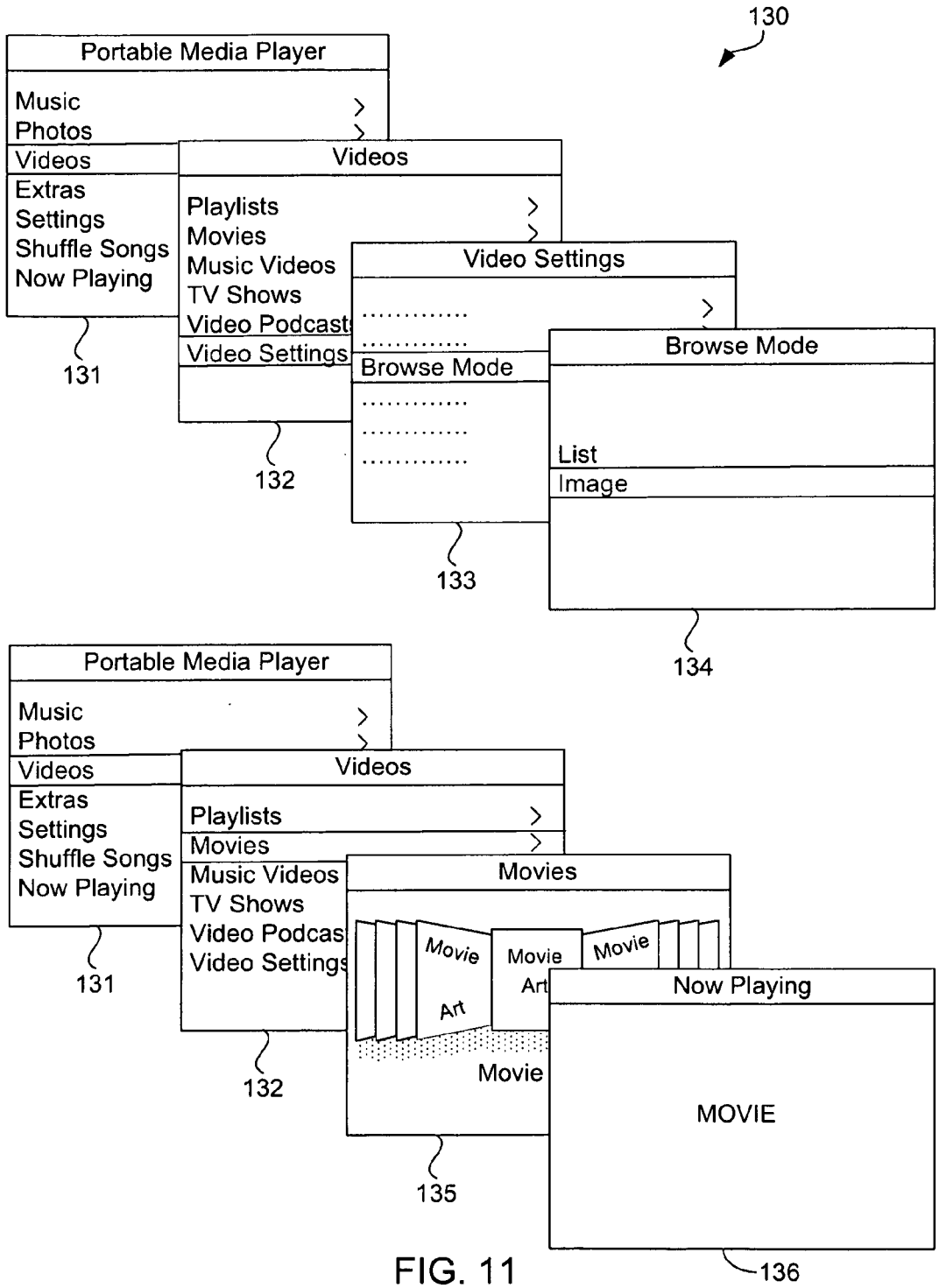
FIG. 11 is a menu hierarchy, in accordance with one embodiment of the present invention.

FIG. 11 is a diagrammatic illustration of a menu hierarchy 130, which uses a setting menu to set the display mode. The illustration is associated with a media player, although the concept may be applied to other electronic devices. In this example, a Videos item is selected in a main menu 131. Thereafter, the Video settings item is selected in a video menu 132, which opens a menu of video settings 133. At least one of the menu items in the video settings window 133 is a Browse mode that when selected provides browse choices as for example between list and/or image in a Browse mode window 134. If Image is selected, the image mode is applied to appropriate menu items. These may for example include any menu item even those dedicated to various sort criteria (e.g., artist, genre, etc.). In the illustrated example, the user thereafter can go back to the main menu 131 and selects Videos, and in the video menu 132 selects Movies. Once selected, an image based browser window 135 that displays the movies using poster art is presented. Once an image is selected, the movie associated with the image begins playing (as shown) or alternatively a movie or now playing menu 136 is opened.

Although FIGS. 10 and 11 have been directed at media player modes, it should be appreciated that this is not a limitation and that the image based browser may be applied to other features of the electronic device. Various embodiments are shown by way of example below.

Figure 12A:
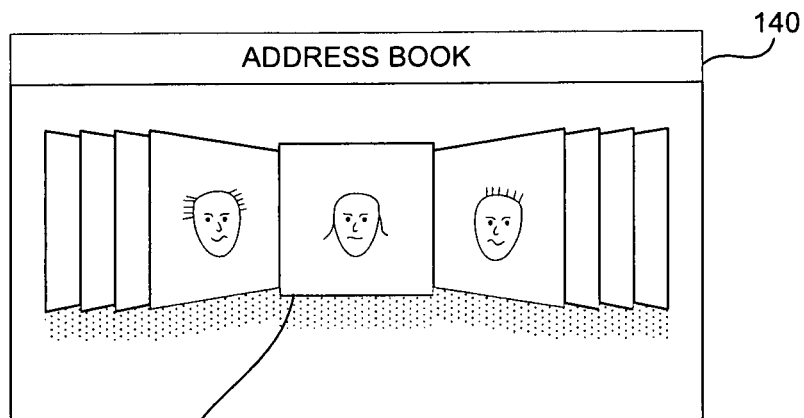
FIGS. 12A-12B shows an image based browser when the portable electronic device is in a phone or communication mode, in accordance with one embodiment of the present invention.
Figure 12B:
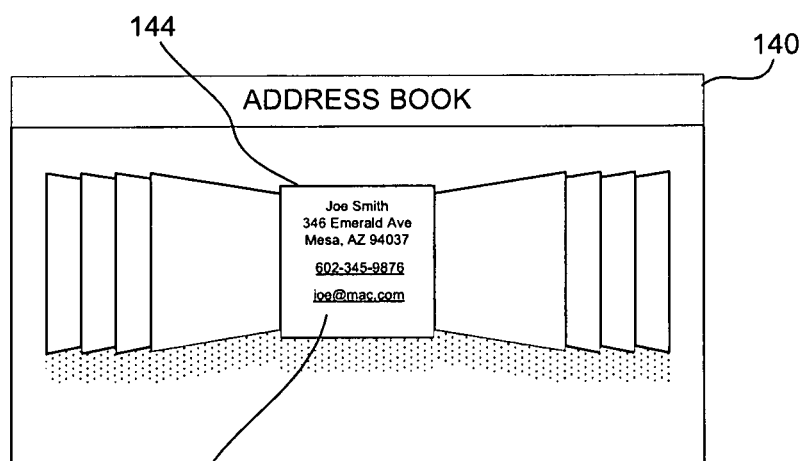

FIGS. 12A and 12B shows an image based browser 140 when the portable electronic device is in a phone or communication mode. As shown, the images 142 of the image based browser 140 are pictures that represent individuals whose contact information is stored in an address book. The user is thus able traverse through pictures rather than lists to find the desired individual who they wish to contact. If the user doesn't have a picture for the individual then they can assign some other image to the individual. Alternatively or additionally, text may be included in the image. For example, the text may be the individual's name. In one embodiment, when the user selects the image 142 at the primary position, then contact information 144 associated with the image 142 is opened. The contact information 144 may be associated with a new window, or alternatively it may be presented at the primary position as shown in FIG. 12B. The contact information 144 may include selectable data such as email and/or various phone numbers 146. The data may also include text messaging. When email is selected then a mail window is opened with the email address already entered. When a phone number is selected, then the portable electronic device initiates a call to that number. As should be appreciated, each individual may have a plurality of email addresses and phone numbers. Alternatively or additionally, when the user selects the image 142 at the primary position, a default phone number associated with the image may be used to immediately initiate a phone call. The default may depend on mode. For example, if in email mode then default can be email, if phone is opened then default can be phone.

Figure 13:
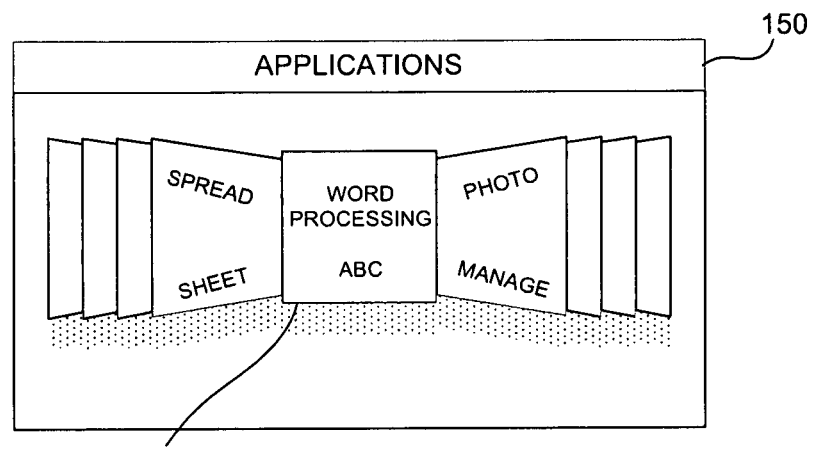
FIG. 13 shows an image based browser associated with applications, in accordance with one embodiment of the present invention.

FIG. 13 shows an image based browser 150 associated with applications. As shown, the images 152 are icons that represent applications that can be launched on the electronic device. The user is thus able traverse through icons rather than lists to find the desired application they wish to open. In one embodiment, when the user selects the icon 152 at the primary position, the application is launched. By way of example, the application may be a photo management program, a music management program, a video management program, word processing program, spreadsheet program, drawing program, and the like.

Figure 14A:
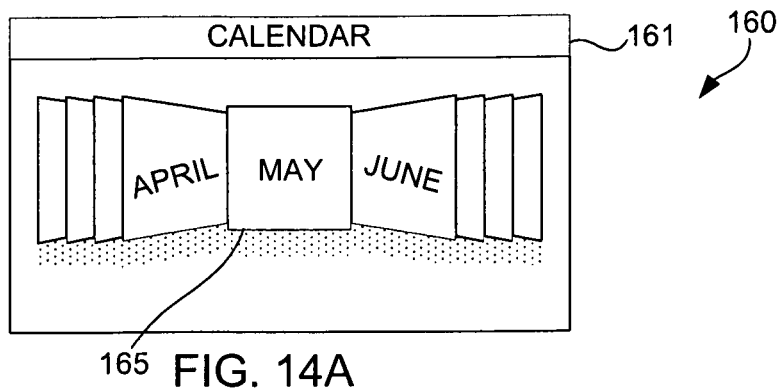
FIG. 14A-14D shows an image based browser associated with a date book or calendar, in accordance with one embodiment of the present invention.
Figure 14B:
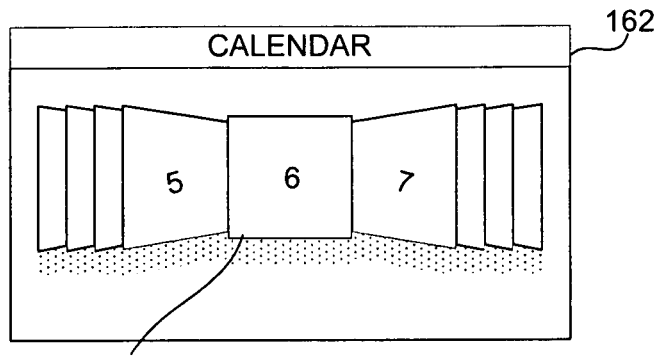
Figure 14C:
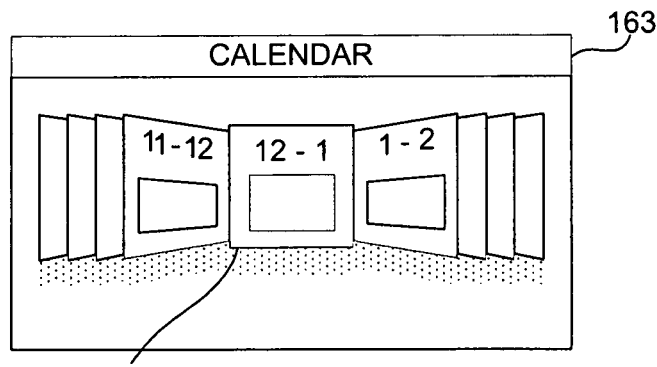
Figure 14D:
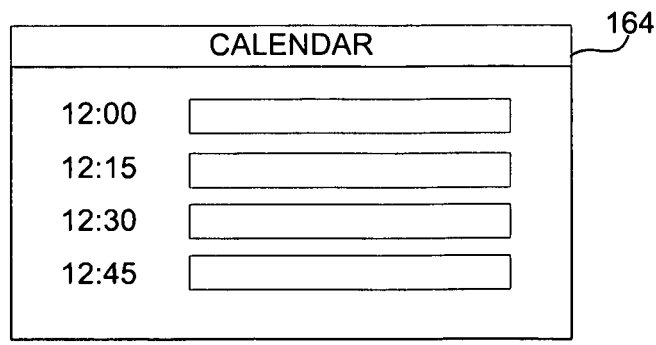

FIG. 14A-14D shows an image based browser 160 associated with a date book or calendar. In this embodiment, the image based browser 160 includes hierarchal browsers 161, 162, 163 and 164. FIG. 14A shows the first of the hierarchal browsers 161. In this first browser 161, the images 165 are associated with months of the year. The images 165 may include picture relating to the months and/or text that identifies the months. For example, the image for February may include a red heart representing Valentines Day and a "February" identifier. Alternatively or additionally, pictures of people whose birthdays are in each month may be displayed. A single picture may be assigned or alternatively the multiple pictures of people with birthdays in the month may be sequentially displayed (cycled through). This data may be pulled from an address book that includes birthdays and pictures. As shown in FIG. 14B, when the user selects a particular month, the second of the hierarchal browsers 162 is opened. In the second browser 162, the images 166 are associated with days of the month. The images 166 may include picture relating to the days and/or text that identifies the days. For example, a red heart representing Valentines Day and a "February" identifier may be used for the 14$^{th}$ of February. Alternatively or additionally, pictures of people whose birthdays are on a particular day may be displayed. As shown in FIG. 14C, when the user selects a particular day, the third of the hierarchal browsers 163 is opened. In the third browser 163, the images 167 are associated with hours in the day. As shown in FIG. 14D, when the user selects a particular hour, a data entry window 164 is opened that allows the user to enter text associated with the selected hour/day/month. For example, the window 164 may include one or more data entry boxes 168. The user can therefore schedule events. Once entered, the data is retained for future processing.

Figure 15:
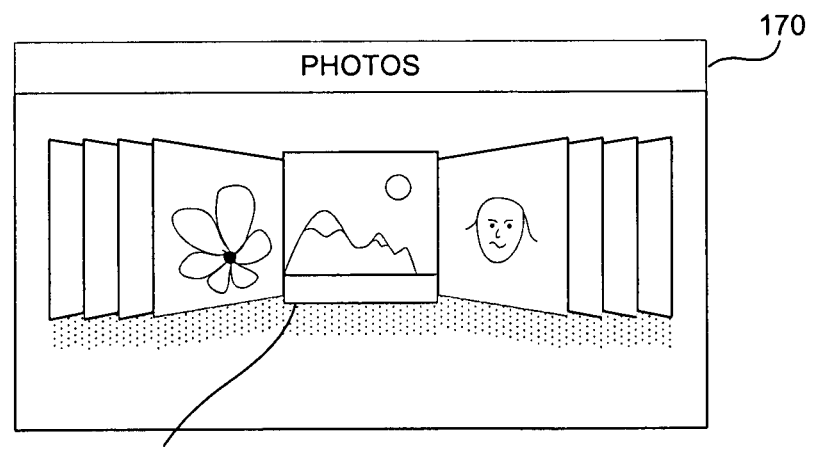
FIG. 15 shows an image based browser associated with a photo viewing application, in accordance with one embodiment of the present invention.

FIG. 15 shows an image based browser 170 associated with a photo viewing application. As shown, the images 172 are photos that are managed by a photo management application. The photos 172 may be photos that have been downloaded to a portable electronic device and/or photos that have been taken with the portable electronic device. When selected, the photo 172 may be presented in a full view within the display rather than a small thumbnail.

Figure 16:
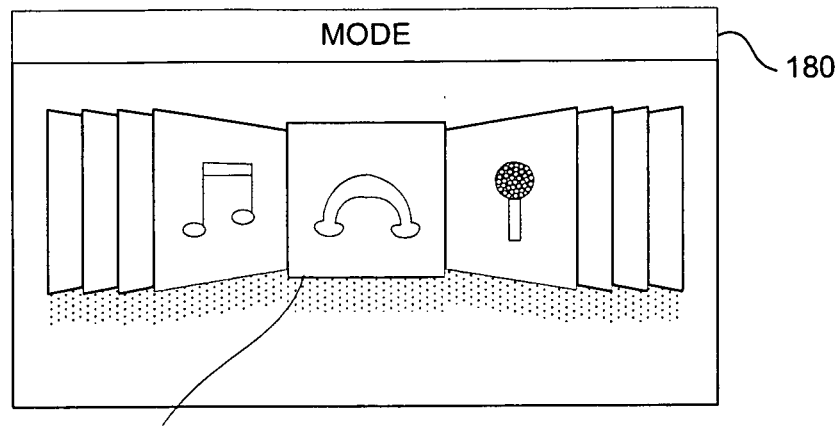
FIG. 16 shows an image based browser associated with modes of the portable electronic device, in accordance with one embodiment of the present invention.

FIG. 16 shows an image based browser 180 associated with modes of the portable electronic device. As shown, images 182 are icons that represent different modes of the portable electronic device. The user is thus able traverse through icons to change modes of the device. When the user selects the icon, the mode of the portable electronic device is changed to that mode. By way of example, moving left to right, the modes may include email, video player, music player, game, phone, microphone, camera, game player and/or the like. It should be appreciated that this browser may be hierarchal with other browsers. For example, if the phone mode is selected then the browser shown in FIGS. 12A and 12B may be displayed. Alternatively, if the music player mode is selected, then the browser shown in FIG. 10 may be displayed.

Figure 17A:
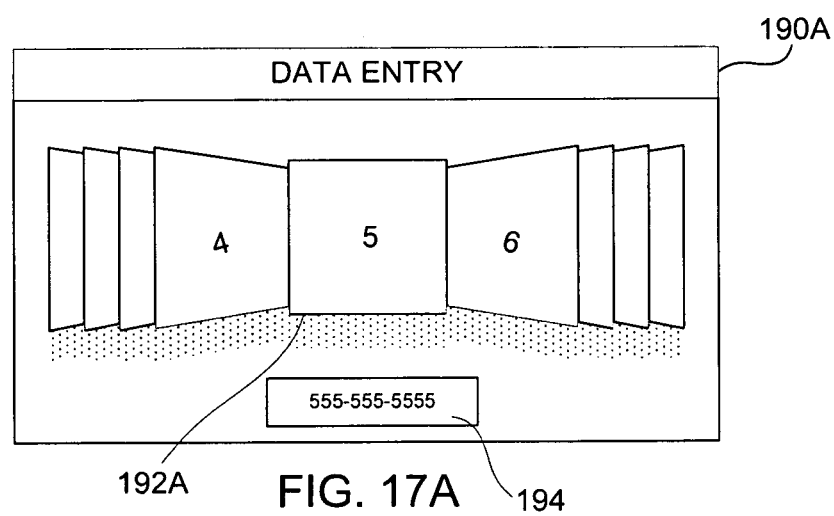
FIG. 17A-17B show an image based browser associated with entering data into the portable electronic device, in accordance with one embodiment of the present invention.
Figure 17B:
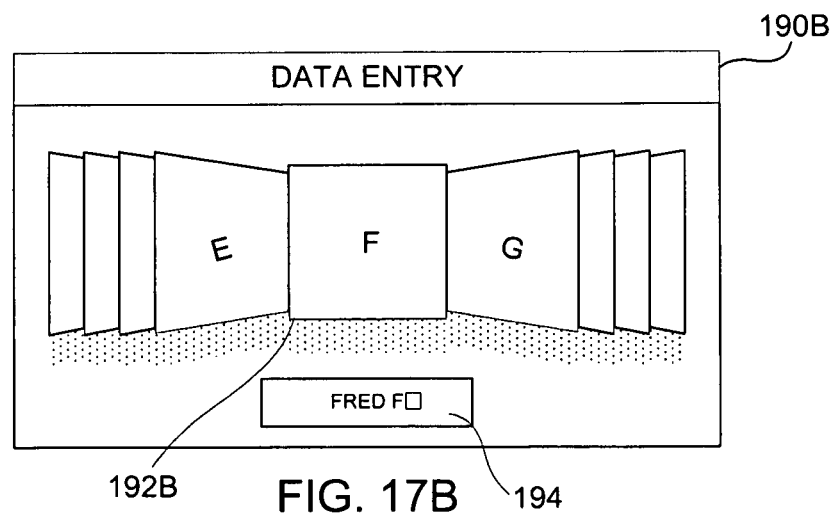

FIG. 17A-17B show an image based browser 190 associated with entering data into the portable electronic device. In both of these figures images 192 are assigned various characters. As shown in FIG. 17A, the images 192A are assigned numbers. When a number is selected, it is entered into a data entry box 194. As shown in FIG. 17B, the images 192B are assigned letters. When a letter is selected, it is entered into a data entry box 194. Of course, numbers and letters may be included in the same image based browser. Furthermore, other symbols may be used depending on the needs of the portable electronic device. For example, the images 192 may be assigned symbols associated with a standard phone, i.e., 1, 2, 3, 4, 5, 6, 7, 8, 9, 0, 8, # so that calls and caller functions can be performed.

Figure 18:
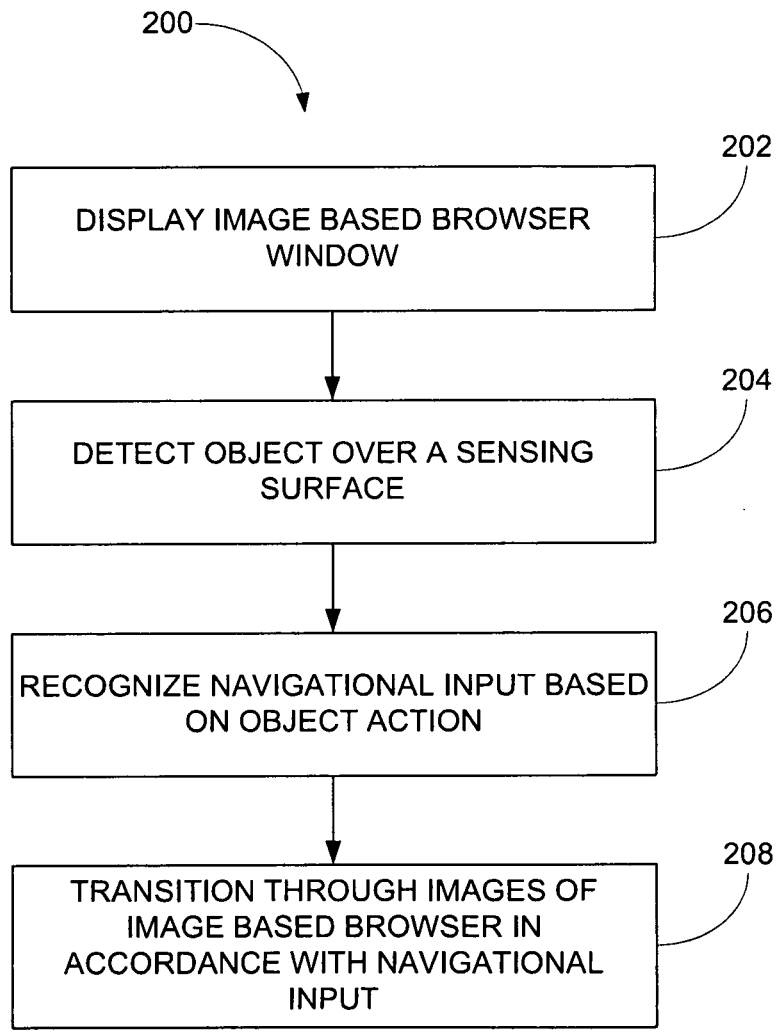
FIG. 18 is a browsing method, in accordance with one embodiment of the present invention.

FIG. 18 is a browsing method 200, in accordance with one embodiment of the present invention. The method 200 may for example be implemented on a portable electronic device such as any of those described herein. The portable electronic device generally includes a user interface, which can be located at any number of locations about the portable electronic device. In most cases, however, the front surface provides the main surface for implementing the user interface. The user interface generally includes a display device and one or more input devices. The input devices may be widely varied. In one embodiment, the input devices include at least a proximity or touch sensing device for sensing objects above a sensing surface. Proximity sensing and touch sensing has many advantages over other types of input means.

The method 200 generally begins at block 202 where an image based browser window is displayed within the display region. The image based browser is configured to present at least a portion of images from a group of images. The images may be presented in a primary or highlighted position as well as one or more secondary positions at locations proximate to the primary position (e.g., left, right, top, bottom, etc.). The primary position generally means that the image is capable of being selected. By way of example, the image based browser may be any of those described herein.

Following block 202, the method 200 proceeds to block 204 where an object is detected over a sensing surface. The object may for example be the user's finger, and the sensing surface may be associated with a touch sensing device such as a touch pad, touch screen or touch sensitive housing.

Following block 204, the method 200 proceeds to block 206 where a navigation input is recognized based on an object action. The object action may be associated with a linear user input such as for example when a user translates their finger across the sensing surface (e.g., vertical, horizontal, diagonal). The object action may be associated with a rotational user input such as for example when a user swirls their finger about the sensing surface using a circular motion. Of course other object actions may be used.

In some cases, the object action can be recognized at any location over the sensing surface. In other cases, the object action can only be recognized at predetermined areas, i.e., at specific locations of the sensing surface such as directly over image or next to image or both. Many aspects of the object action may be utilized to create the navigation input including but not limited to number of objects, location, speed, direction, length of action, etc.

Following block 106, the method proceeds to block 108 where the images of the image based browser are transitioned through in accordance with the navigation input. The transitioning may for example be based on the number of objects, location, speed, direction, and length of the object action. Generally speaking, transitioning includes sequentially advancing images in and out of viewing area and through secondary and primary positions. The advancing may be proportional to the speed of the user's swirling, sliding or swiping action relative to the sensing surface.

Several examples of object actions used to create navigation inputs 210 for an image based browser 212 are shown in FIGS. 19A-19G. The navigation inputs 210 are designed to move images along a predetermined path. In the illustrated examples, the path is a horizontal axis. Thus, the navigation inputs 210 are designed to move the images linearly along the horizontal axis. The images may be sequentially advanced along the path from one group to a second group (e.g., primary, secondary).

Figure 19A:
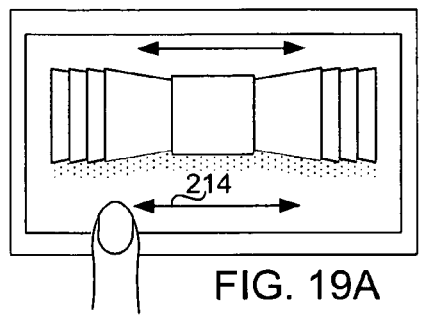
FIGS. 19A-19H show several examples of object actions used to create navigation inputs for an image based browser, in accordance with one embodiment of the present invention.
Figure 19B:
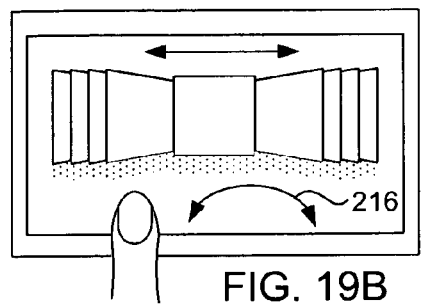
Figure 19C:
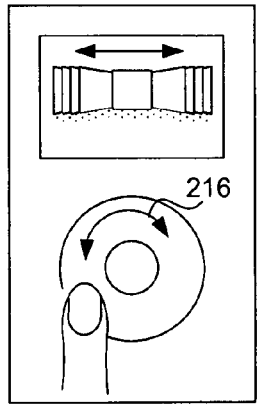

FIGS. 19A-19C illustrate an electronic device with a touch screen display. In one embodiment, as shown in FIG. 19A, a substantially horizontal swipe 214 across the touch screen display or a substantially horizontal slide 214 along the surface of the touch screen display creates the navigational input. In one implementation of this embodiment, the substantially horizontal swipe/slide 214 can be made anywhere within the touch sensing area of the touch screen. In another implementation of this embodiment, the substantially horizontal swipe/slide 214 has to be made in a particular area of the touch sensing area of the touch screen as for example, in the area below an image based browser 212 or alternatively over the images of the image based browser 212.

In another embodiment, as shown in FIG. 19B, an arc or rotational slide 216 creates the navigational input. Like the substantially horizontal swipe/slide 214, the arc or rotation 216 may be required to made in a specific area or at any location within the touch sensing area of the touch screen.

In most cases, the speed of the slide determines the speed of traversal. Furthermore, the direction of the slide determines the direction of traversal. Moreover, the length of the slide can determine the number of images being traversed. In addition, the number of fingers used can be used for speed of traversal (one finger=normal, two finger=accelerated), or number of images being traversed (one finger=normal, two finger=2×).

In yet another embodiment, as shown in FIG. 19C, a press and hold 218 creates the navigational input. In most cases, the length of the hold determines the speed at which images are transition through (the longer the hold, the greater the speed) while the location of the press determines the direction of the transition. For example, pressing on the left side of the primary image causes the images to transition to the left while pressing on the right side of the primary image cause the images to transition to the right (or vice versa). Alternatively or additionally, a single or multiple taps may be used to create navigational inputs. By way of example, a single tap may initiate a single image transition where images move one position to right or left depending on where the tap takes place. Multiple taps can be used to transition through images one by one. For example, two taps causes the images to move over two spots, three taps causes the images to move over three spots, and so on.

Figure 19D:
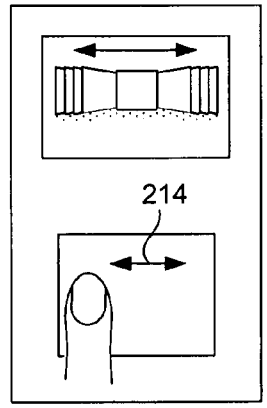
Figure 19E:
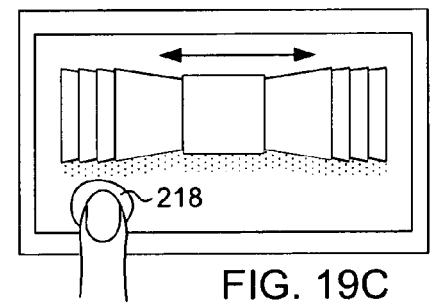

FIGS. 19D and 19E illustrate a portable electronic device with a touch pad. FIG. 19D includes a circular touch pad while FIG. 19E includes square or rectangular touch pad. In one embodiment, a substantially horizontal swipe/slide 214 across the touch pad creates the navigational input (or vertical). In another embodiment, an arc or rotational slide 216 about the touch pad creates the navigational input.

Figure 19F:
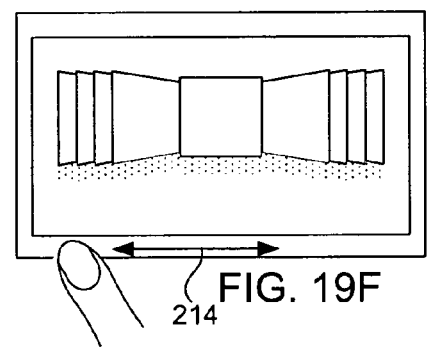

FIG. 19F illustrates a portable electronic device with a touch sensitive housing. The touch sensitive housing is located in the bezel region that surrounds the edges of the display. As such, the bezel region may include a horizontal and vertical sensing component below or on the sides of the display. In the illustrated embodiment, a substantially horizontal swipe/slide 214 on the lower bezel underneath the image based browser 212 creates the navigational input 210. In addition, in cases where the housing is more of an extended surface rather than an edge, navigation inputs 210 can be created similarly to that described in context of the touch screen and touch pads shown in FIGS. 19A-19E.

Figure 19G:
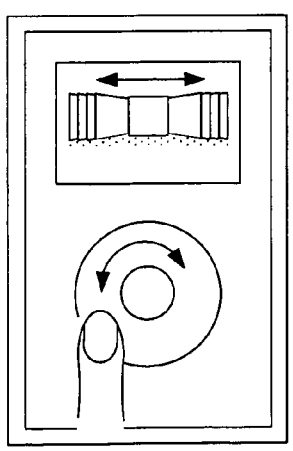
Figure 19H:
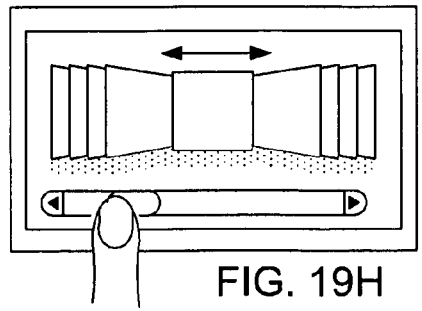

FIGS. 19G and 19H illustrate a portable electronic device with a touch screen. In this embodiment, the display is configured to display virtual navigation elements or user interface elements including for example a virtual touch region similar to FIG. 19D or 19E (as shown in FIG. 19G) and/or a virtual mechanism such as a dial or slider or scroll bar (as shown in FIG. 19H). In one embodiment, a substantially horizontal swipe/slide 214 across the virtual mechanism creates the navigational input. In another embodiment, an arc or rotational slide 216 about the virtual mechanism creates the navigational input.

With regards to FIG. 19A-19H, it should be noted that horizontal linear slides are not limitation and that vertical slides may also be used. In most cases, however, the direction of the slide is configured to coincide with the layout of the browser. In the instant case, the browser has a horizontal layout and thus a horizontal linear slide is preferred. In other cases, a vertical slide can be used to create horizontal movement.

Also in regards to FIGS. 19A-19H, it should also be noted that utilizing touch devices is not limitation and that mechanical means may also be used. For example, dials, scroll wheels and mechanical sliders may be used. Although it should be appreciated that these solutions are typically not as elegant as touch devices and can create more complexity in how the portable electronic device is assembled.

Figure 20:
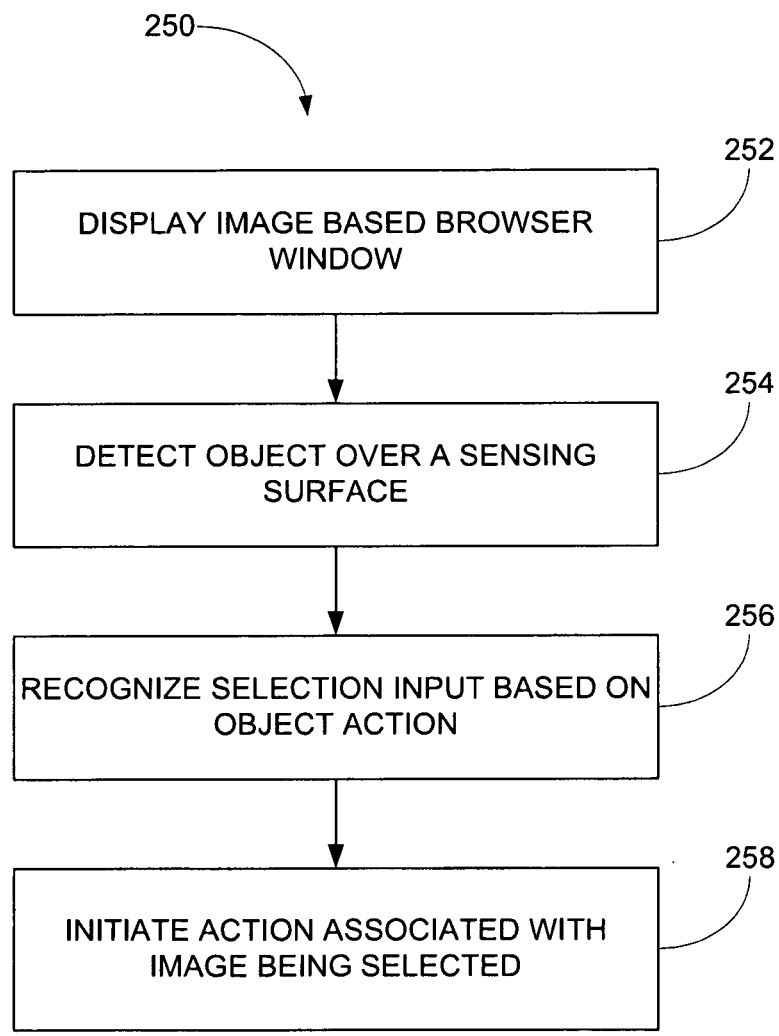
FIG. 20 is a browsing selection method, in accordance with one embodiment of the present invention.

FIG. 20 is a browsing selection method 250, in accordance with one embodiment of the present invention. The method 250 may for example be implemented on a portable electronic device such as any of those described herein. The portable electronic device generally includes a user interface, which can be located at any number of locations about the portable electronic device. In most cases, however, the front surface provides the main surface for implementing the user interface. The user interface generally includes a display device and one or more input devices. The input devices may be widely varied. In one embodiment, the input devices include at least a proximity or touch sensing device for sensing objects above a sensing surface. Proximity sensing and touch sensing has many advantages over other types of input means.

The method 250 generally begins at block 252 where an image based browser window is displayed within a display region of the display device. The image based browser is configured to present at least a portion of images from a group of images. The images may be presented in a primary or highlighted position as well as one or more secondary positions at locations proximate to the primary position (e.g., left, right, top, bottom, etc.). The primary position generally means that the image is capable of being selected. By way of example, the image based browser may be any of those described herein.

Following block 252, the method 250 proceeds to block 254 where an object is detected over a sensing surface. The object may for example be the user's finger, and the sensing surface may be associated with a touch sensing device such as a touch pad, touch screen or touch sensitive housing.

Following block 254, the method 250 proceeds to block 256 where a selection input is recognized based on an object action. The object action may be a tap, a linear input, a rotational input, and/or the like. Of course other object actions may be used. In some cases, the object action can be recognized at any location over the sensing surface. In other cases, the object action can only be recognized at predetermined areas, i.e., at specific locations of the sensing surface. Many aspects of the object action may be utilized to create the navigation input including but not limited to number of objects, location, speed, direction, length of action, etc.

Following block 256, the method proceeds to block 258 where an action associated with the selected image is initiated. As should be appreciated, there is an action assigned to the image so that when the image is selected the assigned action takes place. The action may be widely varied. By way of example, the action may be related to launching an application, changing modes, opening a new window, playing media, initiating a communication, etc.

The action generally depends on the type of browser (or browsing). For example, if the browser is an album based browser, then the action may generally correspond to presenting a menu list of songs associated with the album. If the browser is an address based browser, then the action may generally correspond to presenting contact information and/ or possibly automatically performing a contact action such as making a phone call or initiating an email. If the browser is a date book browser, then the action may generally correspond to presenting a date window capable of text entries. If the browser is a mode based browser, then the action may initiate a modal change, i.e., the mode in the primary position can be initiated. If the browser is a photo based browser, then a large window with the selected image may be opened. If the browser is an application based browser, then the selected application can be launched. If the browser is configured for data entry, then the data associated with the image can be entered. If the document is configured to present documents, the document associated with the image and possibly the application associated with the document may be opened.

Several examples of object actions used to create selection inputs for an image based browser are shown in FIGS. 21A-21F. The selection inputs 270 are designed to select highlighted images at a primary position. In the illustrated examples, the image 272 for selection is located at a primary position of the image based browser 274.

Figure 21B:
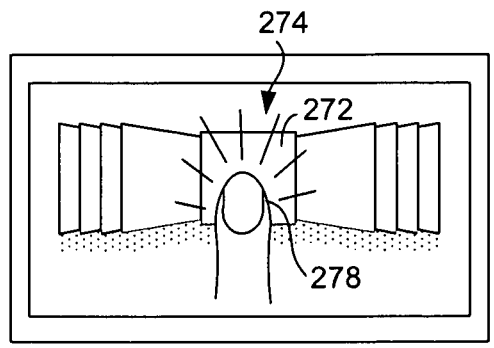
FIGS. 21A-21F show several examples of object actions used to create selection inputs for an image based browser, in accordance with one embodiment of the present invention.
Figure 21A:
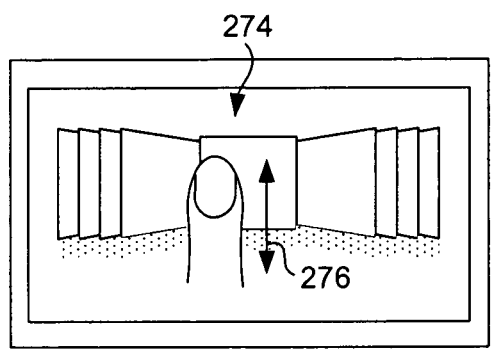

FIGS. 21A-21B illustrates a portable electronic device with a touch screen display. In one embodiment, as shown in FIG. 21A, a press, tap or multiple taps 278 creates the section input. In another embodiment, as shown in FIG. 21B, a substantially vertical swipe 276 across the touch screen or a substantially vertical slide 276 along the touch screen creates the selection input. In one implementation, the substantially vertical swipe/slide 276, press or tap 278 can be made anywhere within the touch sensing area of the touch screen. In another implementation, the substantially vertical swipe/slide 276, press or tap 278 has to be made in a particular area of the touch sensing area of the touch screen as for example, in an area next to the image based browser 274 or alternatively over the image browser 274 itself. In one case, the vertical slide or tap 276 or 278 must be made over the image in the primary position.

Figure 21C:
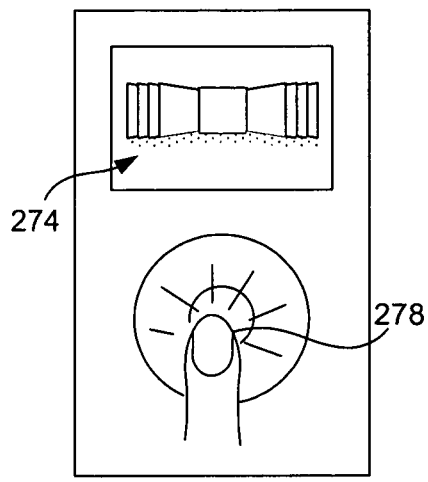
Figure 21D:
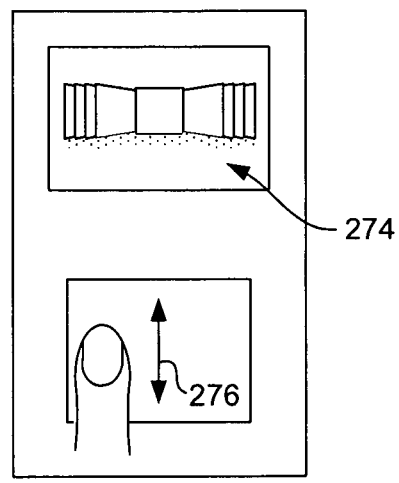

FIGS. 21C and 21D illustrate a portable electronic device with a touch pad. FIG. 21C includes a circular touch pad with a central button region, which can be a mechanical button or a touch sensitive button while FIG. 21D includes square or rectangular touch pad. In one embodiment, a button press 278 at the button region creates the selection input (FIG. 21C). In another embodiment, a press, tap or the substantially vertical swipe/slide 276 creates the selection input (FIG. 21D).

Figure 21E:
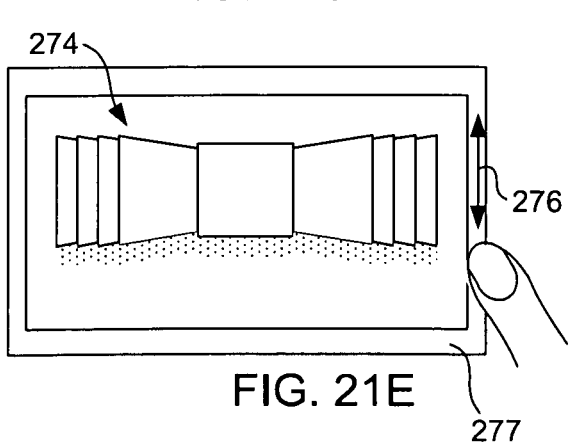

FIG. 21E illustrates a portable electronic device with a touch sensitive housing. The touch sensitive housing is located in a bezel region 277 that surrounds the display. As such, the bezel region 277 may include a horizontal and vertical sensing component below or on the sides of the display. In the illustrated embodiment, the substantially vertical swipe/slide 276 on the side bezel next to the image based browser 274 creates the selection input. In addition, in cases where the housing is more of an extended surface, selection inputs can be created similarly to that described in context of the touch screen and touch pads shown in FIGS. 21A-21D.

Figure 21F:
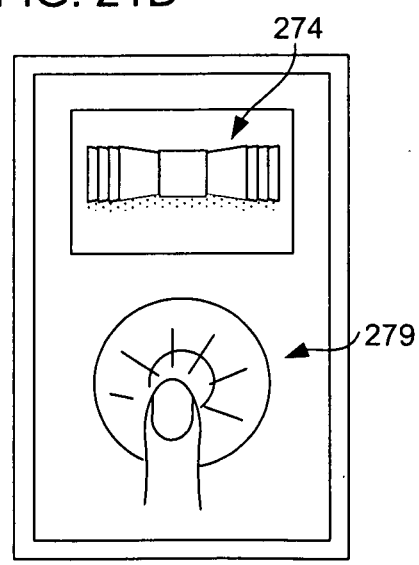

FIG. 21F illustrates a portable electronic device with a touch screen. In this embodiment, the display is configured to present virtual mechanisms or user interface elements that receive touch inputs. In one example, as shown in FIG. 21F, the virtual mechanism is a virtual touch region 279 and button region similar to FIG. 21C. In this example, a selection input is created when the button region is tapped.

Figure 22:
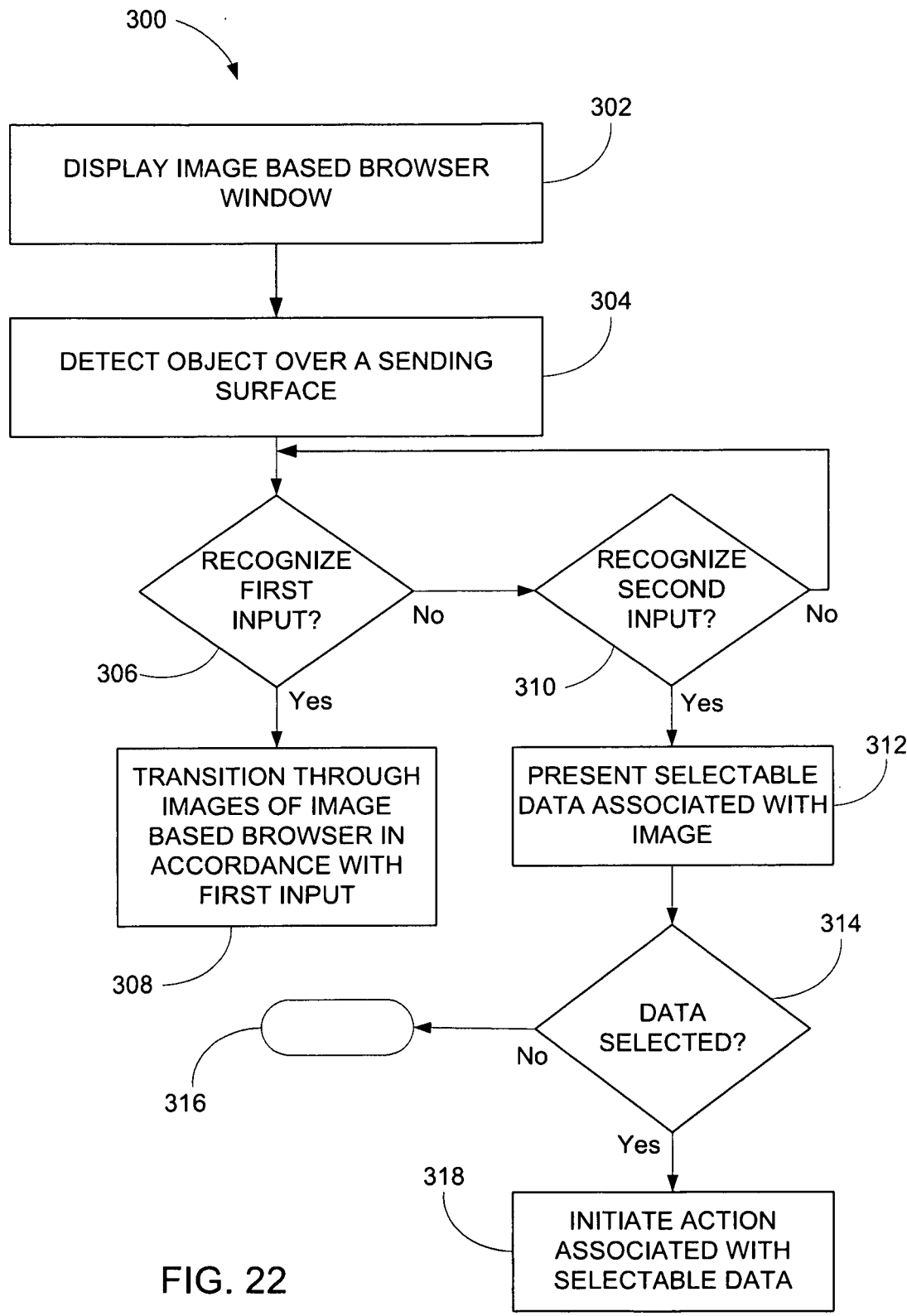
FIG. 22 is a browser method, in accordance with one embodiment of the present invention.

FIG. 22 is a browser method 300, in accordance with one embodiment of the present invention. The browser method may for example be a combination of the previous two methods.

The method 300 generally begins at block 302 where an image based browser window is displayed within the display region. The image based browser is configured to present at least a portion of images from a group of images. The images may be presented in a primary or highlighted position as well as one or more secondary positions at locations proximate to the primary position (e.g., left, right, top, bottom, etc.). The primary position generally means that the image is capable of being selected. By way of example, the image based browser may be any of those described herein.

Following block 302, the method 300 proceeds to block 304 where an object is detected over a sensing surface. The object may for example be the user's finger. By way of example, the sensing surface may be embodied as touch pads, touch screens, and/or touch sensitive housings. Alternatively or additionally, the sensing surface may be embodied as proximity regions above a surface such as proximity sensing pads, proximity sensing screens and/or proximity sensing housings.

Following block 304, the method 300 proceeds to block 306 where a determination is made as to whether or not a navigation input is received.

If navigation input is received, the method 300 proceeds to block 308 where the images of the image based browser are transitioned through in accordance with the navigation input. The transitioning may for example be based on the number of objects, location, speed, direction, and length of the object action. Generally speaking, transitioning includes sequentially advancing images in and out of viewing area and through secondary and primary positions. The advancing may be proportional to the speed of the users swirling, sliding or swiping action relative to the sensing surface.

If no navigation input is recognized, the method 300 proceeds to block 310 where a determination is made as to whether or not a selection input is received. If no selection input is received, then the method 300 proceeds back to block 306. If a selection input is received, the method 300 proceeds to block 312 where selectable data associated with the primary or highlighted image is presented. The selectable data may for example be presented in a vertical menu list format.

Thereafter, the method 300 proceeds to block 314 where a determination is made as to whether or not any of the selectable data items are selected. If not, then the method proceeds to block 316, which may be a standby block, or time out block. If standby, then the method 300 waits for a selection to be made, i.e., the menu list is presented until a selection is made. If time out, then the method 300 proceeds back to displaying the image browser (block 302). Generally, the display reverts back to last browser setting before a selection input was made.

If it is determined at block 314 that a selectable data item is selected, then the method 300 proceeds to block 318 where an action associated with the selectable item is initiated.

In one embodiment, the size of the area designated to receive swipes is divided in increments with each increment representing an image. Thus, the user is able to gauge where they would like to browse. In most cases, the area is incremented according to the number of images.

Depending on the number of images in the browser, one or multiple swipes may be necessary to browse the entire set of images.

FIGS. 23A-23H illustrate an exemplary browsing sequence using the methods described above. The browsing sequence is performed on a portable electronic device having a touch screen disposed over a display region of the portable electronic device.

Figure 23A:
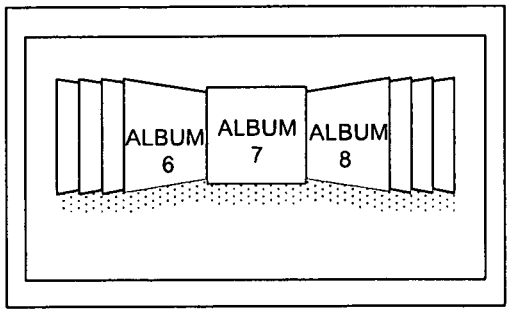
FIGS. 23A-23H illustrate an exemplary browsing sequence using the methods described in FIG. 22, in accordance with one embodiment of the present invention.

As shown in FIG. 23A, the portable electronic device displays an imaged based browser in a display region of the portable electronic device. In this example, the imaged based browser is configured to present album images associated with audio tracks or songs stored on the portable electronic device (each song has an album image assigned thereto).

Figure 23E:
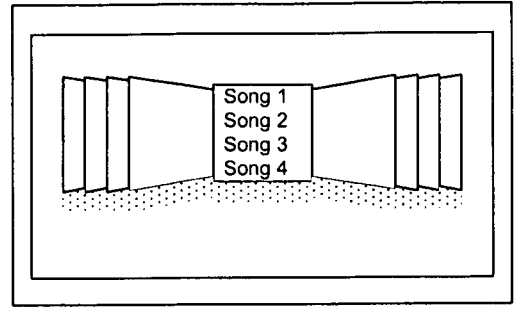
Figure 23B:
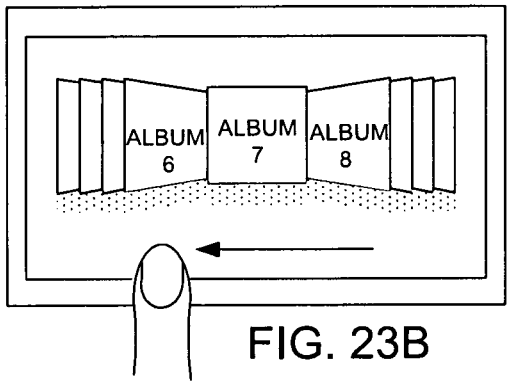

As shown in FIG. 23B, the user swipes their finger over the display region. In some cases, the swipe may be dependent on location within the display region while in other cases the swipe may be made at any location within the display region. In the illustrated embodiment, the swipe is performed in the area underneath the displayed image browser. This allows a user to view the image browser while making a swipe. Of course other areas are possible as for example swiping over the browser. This has the advantage of simulating flipping through an actual bin of albums.

Figure 23F:
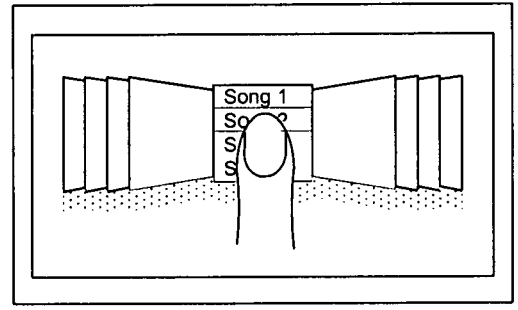
Figure 23C:
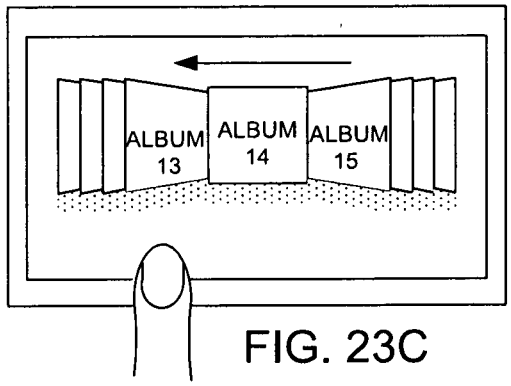

As shown in FIG. 23C, the portable electronic device recognizes the swipe and moves the images accordingly. By way of example, the length of the swipe, the speed of the swipe and the direction of the swipe are a few factors from many possible factors controlling the number of images that are cycled through for a given swipe. In the illustrated embodiment, the user is swiping left which causes the images to move left (this is similar to flipping through a bin of albums). Of course, the images may also be moved opposite the direction of the finger swipe. In most cases, the movement of the images happens simultaneously with the swipe of the finger.

Figure 23G:
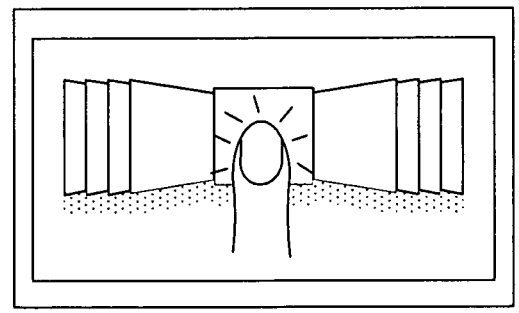
Figure 23D:
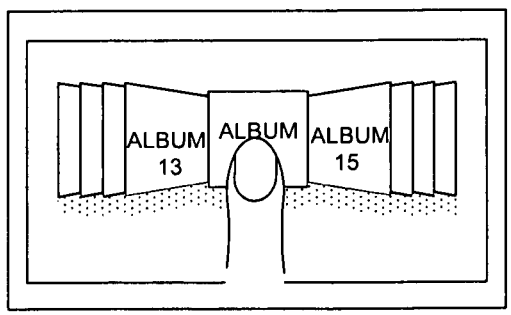

As shown in FIG. 23D, the user taps or presses their finger over the image at the primary position. Alternatively, the user may vertically swipe at the image at the primary position.

As shown in FIG. 23E, the portable electronic device recognizes the tap or press or vertical swipe and presents a list of songs associated with the album at the primary position. Each of the songs in the list of songs is selectable. In some cases, this is an entirely new window (e.g., menu window). In other cases, the list is part of or related to the image. For example, the list may be overlaid on top of the image or over a new image related to the album art (e.g., back of the album). In one embodiment, the image is configured to rotate about a horizontal axis thereby making it appear as if you are seeing the back of the image which contains the list. The direction of rotation may be related to the direction of the vertical swipe if a vertical swipe is used thereby making it appear as if the user is flipping the image around. In addition, the list of songs as well as the image may be enlarged as compared to the original image size to make viewing and selections easier. By way of example, a transition effect that makes the image and list appear to grow may be used. At the same time, the secondary images may be made smaller or shrunk as the image list grows in size (or they may simply disappear). In some cases, every song in the list may be shown while in other cases only a portion of the list may be shown.

In FIG. 23F, the user can navigate through the list of songs. This may for example be accomplished with a vertical swipe that initiates vertical scrolling. This may also be accomplished with a highlight bar that moves with the finger as it moves up and down through the list, e.g., the highlight bar highlights the song proximate the finger (as shown).

As shown in FIG. 23F, a vertical slide can move a highlight bar through the list.

As shown in FIG. 23G, the user performs a selection event by pressing or tapping their finger as for example over the desired song.

Figure 23H:
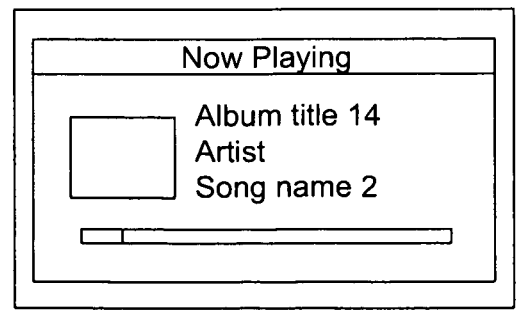

As shown in FIG. 23H, the portable electronic device recognizes the selection event and starts playing the song. The portable electronic device may also open a play window (as shown).

FIGS. 24A-24H illustrate an exemplary browsing sequence using the methods described above. The browsing sequence is performed on a portable electronic device having a display region and a separate touch pad region and button region. This can be implemented physically or virtually.

As shown in FIG. 24A, the portable electronic device displays an imaged based browser in a display region of the portable electronic device. The imaged based browser is configured to present contact images associated with an address book stored on the portable electronic device (each contact has an image assigned thereto). By way of example, the contact images may be photos of individuals in the address book.

As shown in FIG. 24B, the user swipes their finger over the touch pad region.

As shown in FIG. 24C, the portable electronic device recognizes the swipe and moves the images accordingly. By way of example, the length of the swipe, the speed of the swipe and the direction of the swipe are a few factors from many possible factors controlling the number of images that are cycled through for a given swipe. In the illustrated embodiment, the user is swiping counter clockwise which causes the images to move left. Of course, the images may also be moved opposite the direction of the finger swipe. In most cases, the movement of the images happens simultaneously with the swipe of the finger.

As shown in FIG. 24D, once a desired image is placed at the primary position, the user taps or presses their finger over the button region. Alternatively, the user may press or tap the touch pad region (single tap, double taps, etc.).

As shown in FIG. 24E, the portable electronic device recognizes the tap or press and presents contact information associated with the contact image. The contact information may include address, family members, phone numbers, email addresses. In some cases, this data may be selectable data as for example phone numbers and email addresses. In some cases, this is an entirely new window (e.g., menu window). In other cases, the contact information is part of or related to the contact image. In one embodiment, the contact image is configured to rotate about a horizontal axis thereby making it appear as if you are seeing the back of the contact image which contains the list. The direction of rotation may be related to the direction of the vertical swipe if a vertical swipe is used thereby making it appear as if the user is flipping the image around. In addition, the contact information may be enlarged as compared to the original image size to make viewing and selections easier. By way of example, a transition effect that makes the contact information appear to grow may be used. At the same time, the secondary images may be made smaller or shrunk as the image list grows in size (or they may simply disappear). In some cases, all the contact information is shown while in other cases only a portion of the contact information is shown.

As shown in FIG. 24F, the user navigates through the contact information. This may for example be accomplished with a vertical swipe that initiates vertical scrolling when the amount of data is larger than what is being displayed.

As shown in FIG. 24G, the user performs a selection event by pressing or tapping their finger as for example over a selectable data item such as a phone number.

As shown in FIG. 24H, the portable electronic device recognizes the selection event and can initiate a phone call. The portable electronic device may also revert back to the contact image so that the user knows who they are calling.

Figure 25:
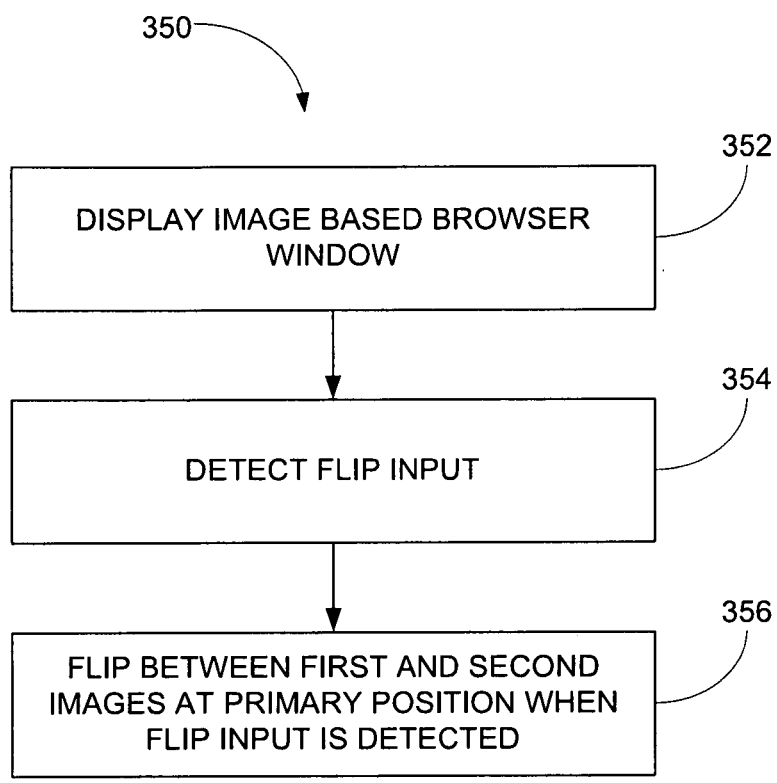
FIG. 25 is a selection method, in accordance with one embodiment of the present invention.

FIG. 25 is a selection method 350, in accordance with one embodiment of the present invention. The method 350 generally begins at block 352 where an image based browser window is displayed within the display region. The image based browser is configured to present at least a portion of images from a group of images. The images may be presented in a primary or highlighted position as well as one or more secondary positions at locations proximate to the primary position (e.g., left, right, top, bottom, etc.). The primary position generally means that the image is capable of being selected. By way of example, the image based browser may be any of those described herein.

In this embodiment, there is a rear image that is associated with the front image. The front image is presented when the browser is transitioning through elements. The rear image is presented when the front image is selected. The rear image may for example include selectable data associated with the front image.

Following block 352, the method proceeds to block 354 where a selection input event is detected. In one embodiment, the selection input event is a tap or press. In another embodiment, the selection input event is a vertical swipe event. Although not a requirement, in most cases, for the selection event to be recognized, the selection event must occur over the image in the primary position.

Following block 354, the method proceeds to block 356 where the front and rear images are flipped when the selection input event is detected. For example, if the front image is being displayed, and a selection input event is detected, then the front image is removed from view while the rear image is presented for view. Conversely, if the rear image is being displayed, and a selection event is detected, then the rear image is removed from view while the front image is presented for view. In one embodiment, the flip is as simple as inserting or replacing images at the same location. In another embodiment, the image is configured to appear as if its rotating about a horizontal axis. In this embodiment, the image rotates from front to back and back to front about the horizontal axis. In some cases, this may include skewing the images as it rotates to make it appear as if its moving between foreground and background (e.g., leading edge becomes bigger while trailing edge becomes smaller). Essentially this effect is configured to mimic spinning a 2D flat planar object so that different sides of the object can be seen.

Figure 26A:
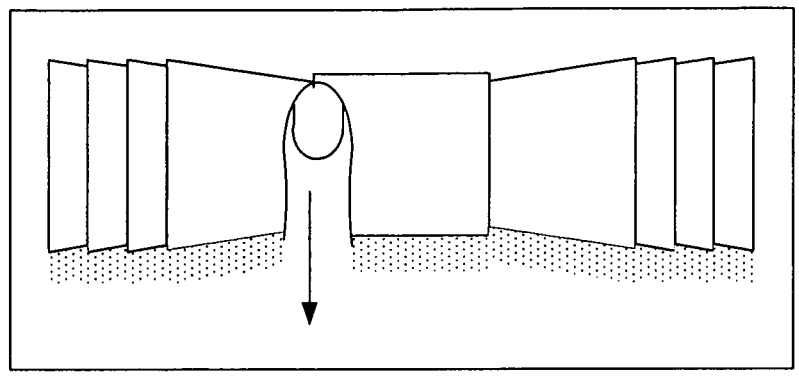
FIGS. 26A-26E illustrate a flipping sequence for use in the embodiment mentioned above.

FIGS. 26A-26E illustrate a flipping sequence for use in the embodiment mentioned above. As shown in FIG. 26A, the user places their finger over the image to be flipped (e.g., primary image). As shown in 26B-26D, the user slides their finger in a vertical direction. The slide can be either up or down.

Figure 26B:
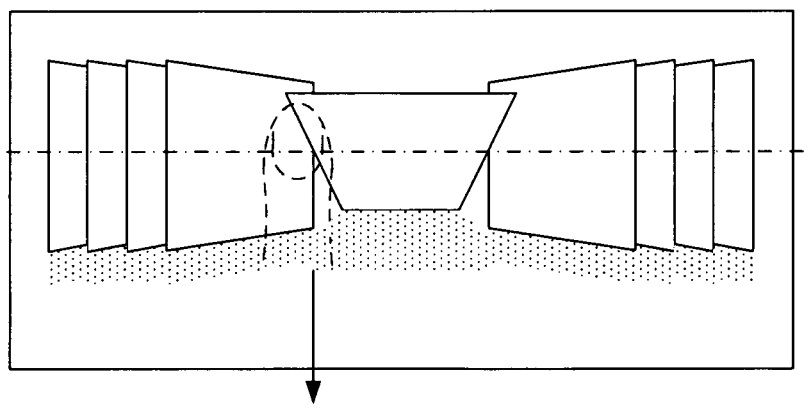

As shown in FIG. 26B, the edge of the image at the beginning of the slide follows the finger as it moves vertically. In this case, the finger is slid downward and thus the top edge of the element follows the finger. Furthermore, a first portion of the element above a horizontal axis is configured to enlarge while a second portion of the element below the horizontal axis configured to shrink. In addition, the element is configured to be skewed during motion to make it appears as if the first portion is being brought to the foreground and the second portion is being moved to the background. For example, the top edge of the first portion is skewed horizontally outward from the horizontal axis while the bottom edge of the bottom portion is skewed horizontally inward from the horizontal axis.

Figure 26C:
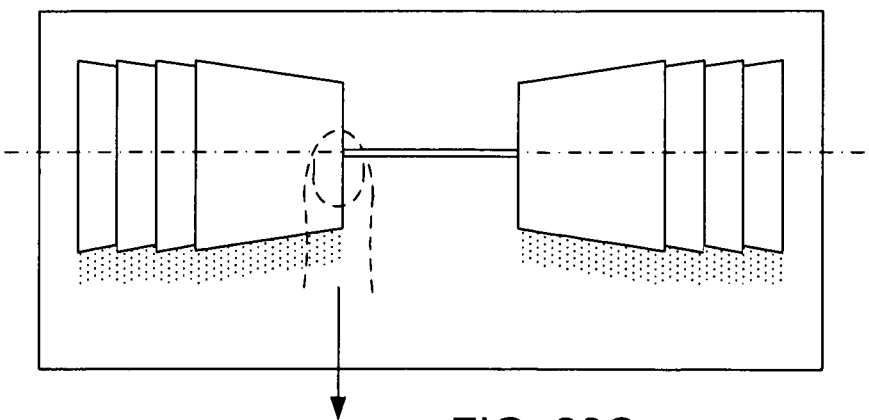

As shown in FIG. 26C, this effect continues until the top and bottom edges of the image are aligned with the horizontal axis. The image either disappears or a small line segment is displayed.

Figure 26D:
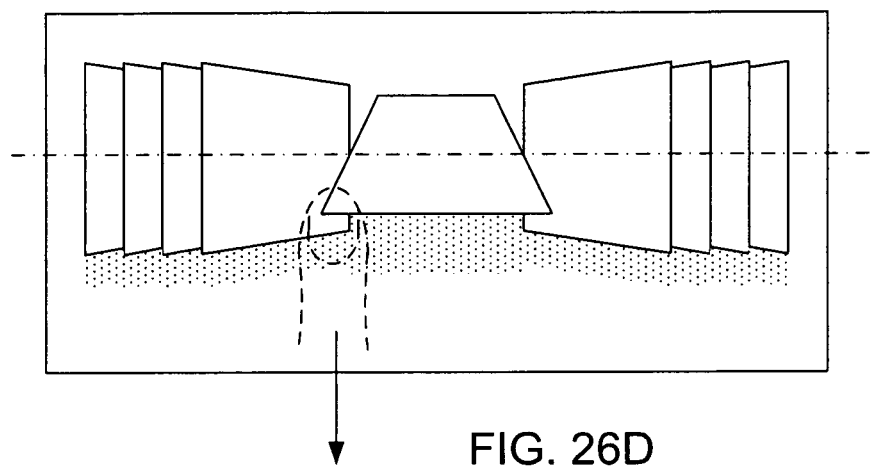

As shown in FIG. 26D, the edge of the image continues to follow the finger as it moves vertically. The first portion begins to move below the horizontal axis and the second portion moves above the horizontal axis. The first portion remains enlarged and skewed outwardly but in a reverse orientation while the second portion remains smaller and skewed inwardly but in a reverse orientation.

The contents on the image may also be skewed as for example from foreground to background.

Figure 26E:
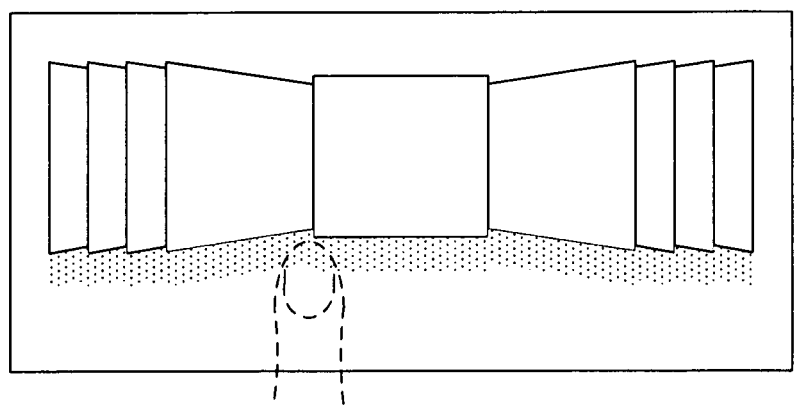

As shown in FIG. 26E, at the end of the slide, the rear image is brought into view to its original size and without any skewing (original state). In some cases, however, the rear image may be made gradually larger during the flip especially if it contains selectable data or data that is hard to see.

It should be noted that the invention is not limited to front and rear images, and that more than two images at the primary position can be flipped through.

Figure 27:
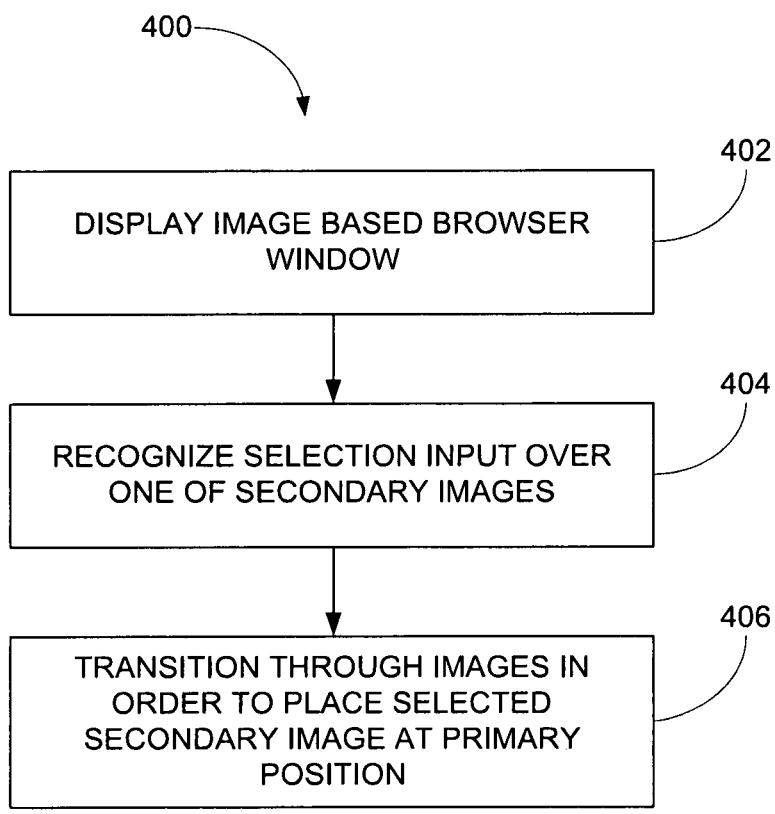
FIG. 27 is a browsing method, in accordance with one embodiment of the present invention.

FIG. 27 is a browsing method 400, in accordance with one embodiment of the present invention. The method 400 generally begins at block 402 where an image based browser window is displayed within a display region. The image based browser is configured to present at least a portion of images from a group of images. The images may be presented in a primary or highlighted position as well as one or more secondary positions at locations proximate to the primary position (e.g., left, right, top, bottom, etc.). In the illustrated embodiment, the browser includes a plurality of secondary images on both the left and right sides of the primary image. The primary position generally means that the element is capable of being selected to initiate a new task or action. By way of example, the image based browser may be any of those described herein.

Following block 402, the method proceeds to block 404 where a select input event is recognized over one of the secondary images. The select input may be a tap or press or may simply be the presence of an object over the secondary image.

Figure 28A:
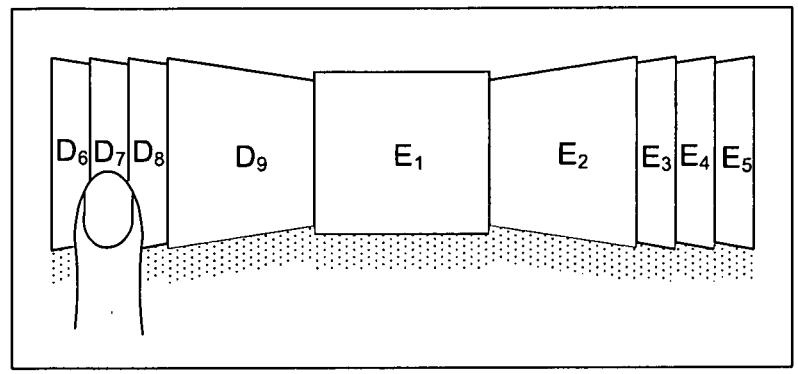
FIGS. 28A and 28B are diagrams showing the method described in FIG. 27, in accordance with one embodiment of the present invention.
Figure 28B:
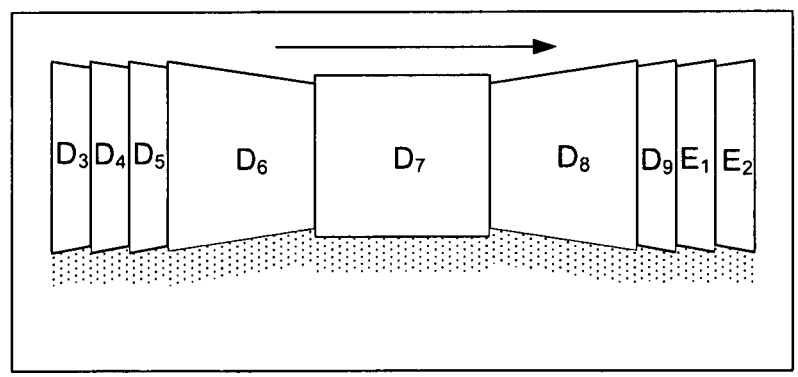

Following block 404, the method proceeds to block 406 where the images are transitioned through in order to place the selected secondary image in the primary position. For example, as shown in FIGS. 28A and 28B, when the user places their finger over a secondary image two positions to the left of the primary position, all the images are moved over two positions to the right so that the selected secondary image is placed in the primary position. The same can be done for the secondary images at the left of the primary position.

Figure 29:
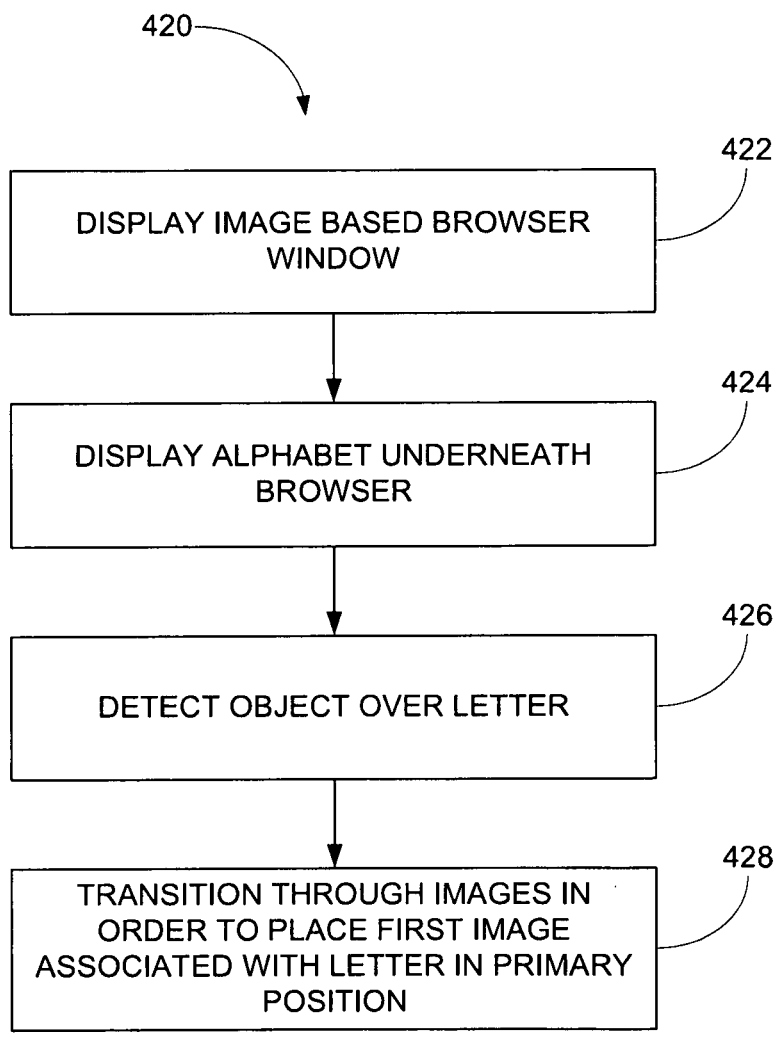
FIG. 29 is a browsing method, in accordance with one embodiment of the present invention.
Figure 30A:
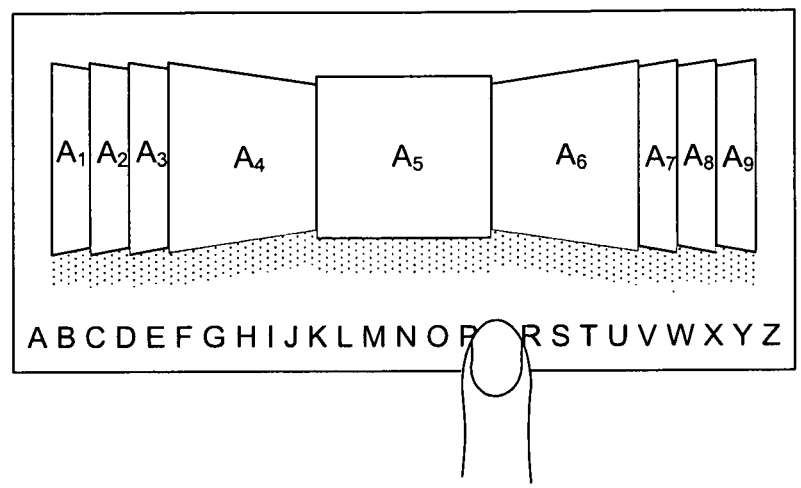
FIGS. 30A and 30B are diagrams showing the method described in FIG. 29, in accordance with one embodiment of the present invention.
Figure 30B:
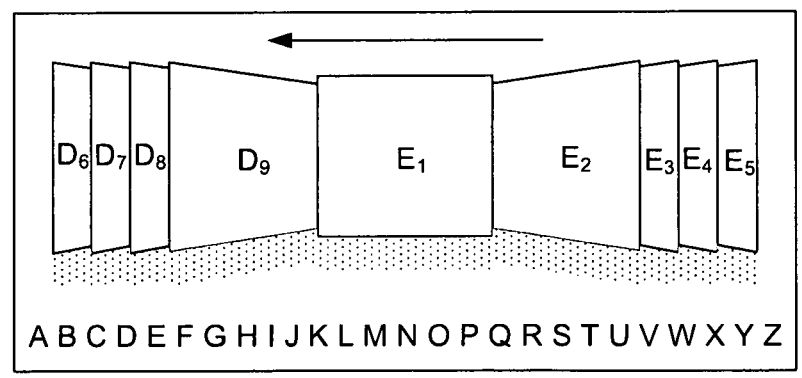

FIG. 29 is a browsing method 420, in accordance with one embodiment of the present invention. The method 420 generally begins at block 422 where an image based browser window is displayed within the display region. The image based browser is configured to present at least a portion of images from a group of images. The images may be presented in a primary or highlighted position as well as one or more secondary positions at locations proximate to the primary position (e.g., left, right, top, bottom, etc.). The primary position generally means that the image is capable of being selected to initiate a new task or action. By way of example, the image based browser may be any of those described herein. Each image has an alphabet letter tag associated therewith. The alphabet letter tag may for example be based on the spelling of a title associated with the image. For example, in the case of an album, the alphabet letter tag is the album name. Furthermore, the images are configured in alphabetical order based on the alphabet letter tags (e.g., the images start with A1 and are horizontal positioned next to one another through Z(n)).

The method 420 also includes block 424 where letters of the alphabet are displayed in alphabetical order across the bottom of the display region. The method 420 also includes block 426 where an object is detected over the a displayed letter. The method 420 also includes block 428 where the images of the image browser are transitioned through in order place the first image associated with the letter in the primary position. See for example FIGS. 30A and 30B, which show that if a user should move and place their finger over and/or press the letter E, the image subsequently transition through the images so that the first E image is placed in the primary position. In one embodiment, either the selected letter is highlighted or a new letter designator is displayed when the letter is selected.

It should be appreciated that the invention is not limited to alphabetical order and that other criteria may be used including for example genre, time, and the like.

Figure 31:
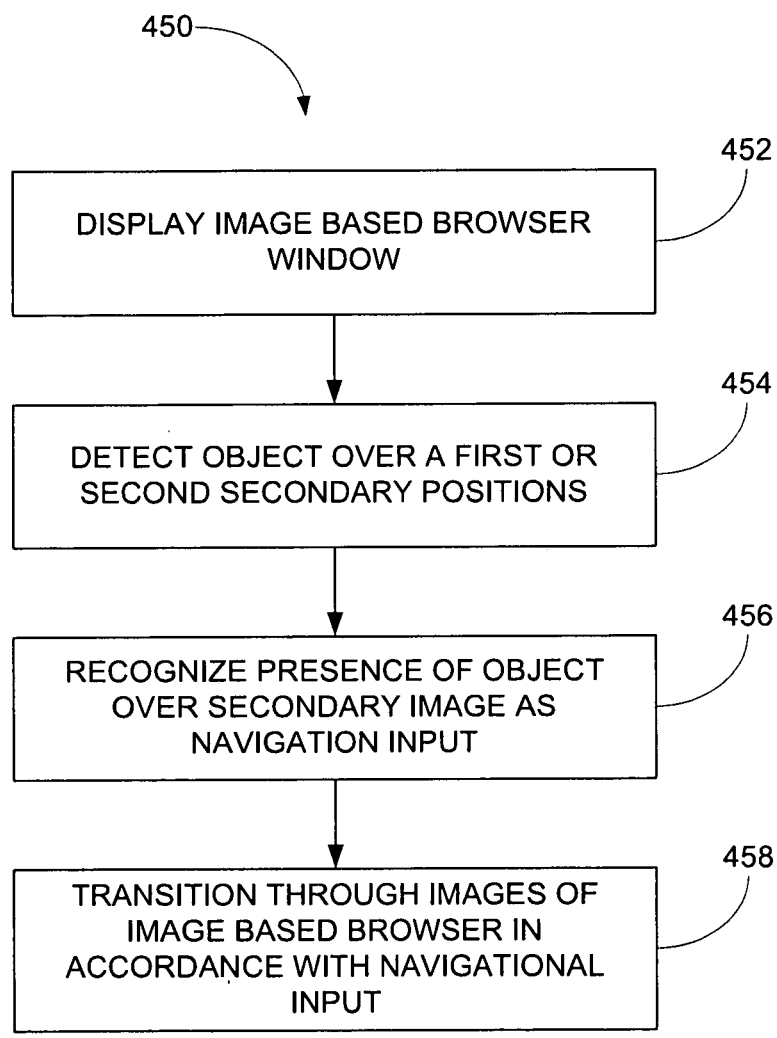
FIG. 31 is a browse method, in accordance with one embodiment of the present invention.

FIG. 31 is a browse method 450, in accordance with one embodiment of the present invention. The method 450 includes block 452 where an image based browser is displayed. The image based browser includes a primary position and first and second secondary positions on first and second sides of the primary image. The image based browser may for example correspond to any of those described herein.

The method 450 also includes block 454 where an object is detected over the images at the first or second secondary positions located at the sides of the primary position. The method 450 also includes block 456 where the presence of an object over the secondary images is recognized as a navigation input.

The method 450 further includes block 458 where the images are transitioned through in accordance with the navigation input. For example, if the object is located on a first side, the images are moved in a first direction and if the object is located on the second side the images are moved in a second direction that is opposite the first direction. By way of example, if the object is located on the left side, then the images are moved to the left and if the object is located on the right, then the images are moved to the right. The number of positions the images move is generally dependent on the length of time the object is detected. For example, one (1) second of detection may be equal to five (5) image transitions. Furthermore, quick tap may be configured to move one transition. In this manner, the user can incrementally transition through images by tapping. In cases where a multi touch sensing surface is provided, the invention may further provide accelerated browsing based on the number of fingers present during a user action. For example, adding a second finger makes the traversal 2× faster, adding a third finger makes the traversal 3× faster and so on.

Figure 32:
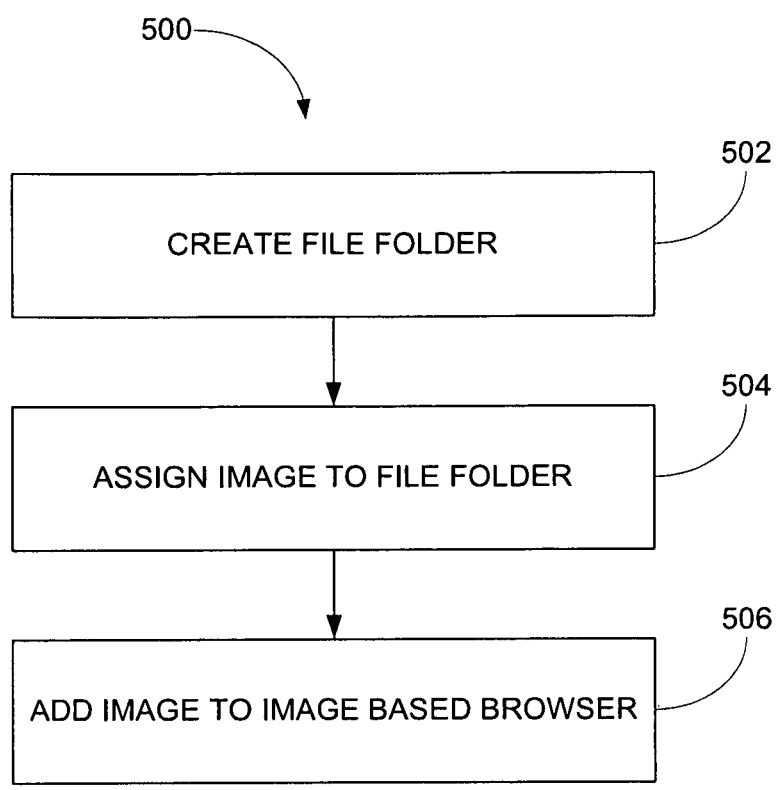
FIG. 32 is a method of assigning an image to a list, in accordance with one embodiment of the present invention.

FIG. 32 is a method 500 of assigning an image to a list, in accordance with one embodiment of the present invention. This method may be performed at a host before downloading the list to the portable electronic device, or alternatively it may be performed at the portable electronic device.

The method 500 generally begins at block 502 where a file is created. The file may be a list of data items. The list may for example be a playlist containing a portion of songs from a large song library. The playlist is somewhat of a sub menu so that a user does not have to browse through a large library. It also serves the purpose of organizing songs into categories such as Dance Music or Mood Music, etc. It should be appreciated, that the file is not limited to playlists and other data may be contained in the file. For example, the file may be an address file containing contact information. Creating the file typically includes providing a heading or title to the file.

Following block 502, the method 500 proceeds to block 504 where an image is assigned to the file. The images may for example be selected from a photo library, a pdf library, etc. This may for example be accomplished by (1) selecting a file, (2) selecting Add Image in an operations menu so that a window that contains images is opened, (3) selecting an image from the window and thereafter (4) assigning the image to the playlist.

Following block 504, the method proceeds to block 506 where the image is added to an image browser. The file including the image would be placed in the image browser so that it would be included in any subsequent browsing experiences.

Figure 33:
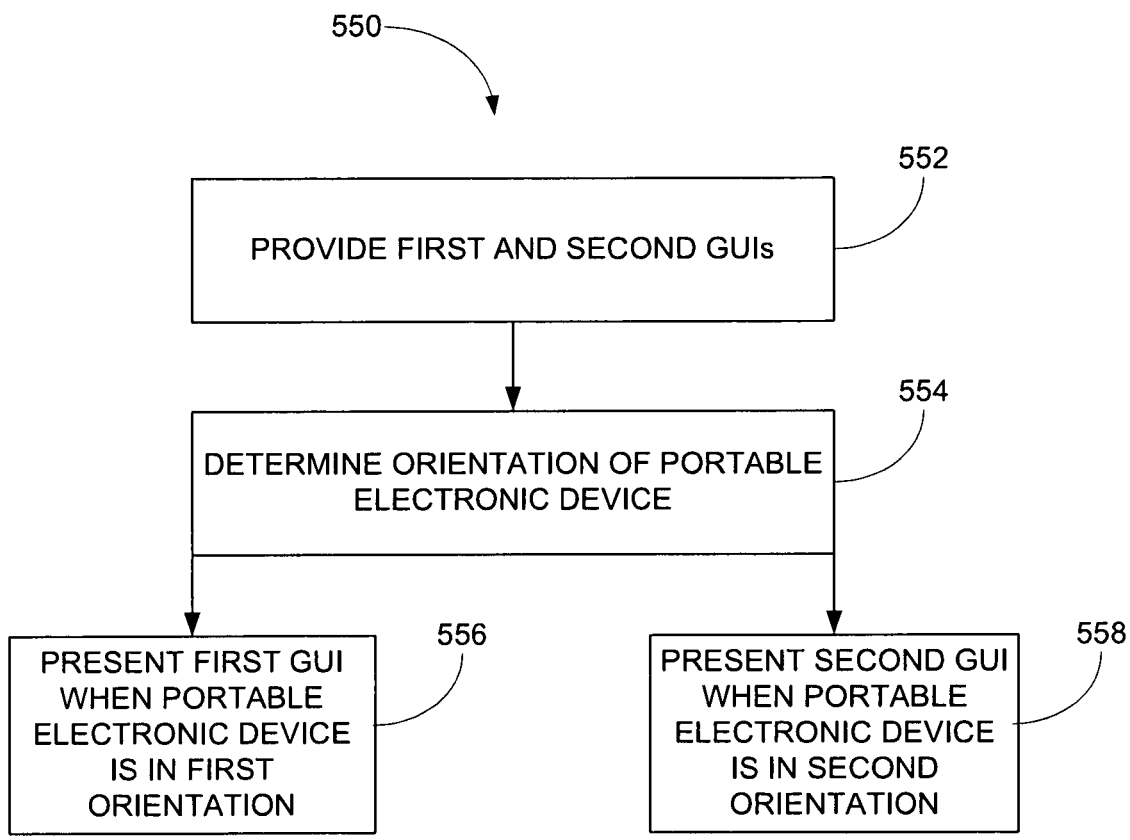
FIG. 33 is an operational method for a portable electronic device, in accordance with one embodiment of the present invention.

FIG. 33 is an operational method 550 for a portable electronic device, in accordance with one embodiment of the present invention. The portable electronic device is capable of being used in multiple orientations. By way of example, the portable electronic device may be utilized in a portrait mode or a landscape mode. In one embodiment, the portable electronic device has a rectangularly shaped display region. By way of example, the display region may have a 16:9 or 4:3 configuration that correspond with landscape and portrait modes. In addition, the display region may be configured to substantially fill the front surface of the portable electronic device.

The method 550 generally begins at block 552 where a first GUI and a second GUI are provided. The first and second GUIs are based on the same data but use different formatting schemes to show the data. In one embodiment, the first GUI is configured as a vertical menu list that is text based and the second GUI is configured as an image browser that is image based. The images in the image browser are associated with corresponding text data in the menu. By way of example, the first GUI may be a vertical list of audio tracks while the second GUI may be a horizontal arrangement of albums.

Following block 552, the method proceeds to block 554 where the orientation of the portable electronic device is determined. This may for example be accomplished with tilt sensors or accelerometers (among others). In one embodiment, the determination includes determining whether the portable electronic device is being utilized in a portrait mode or landscape mode.

If the portable electronic device is in a first orientation (portrait), the method 554 proceeds to block 556 where the first graphical user interface (GUI) is presented.

If the portable electronic device is in a second orientation (landscape), the method proceeds to block 558 where the second graphical user interface (GUI) is presented.

Figure 34:
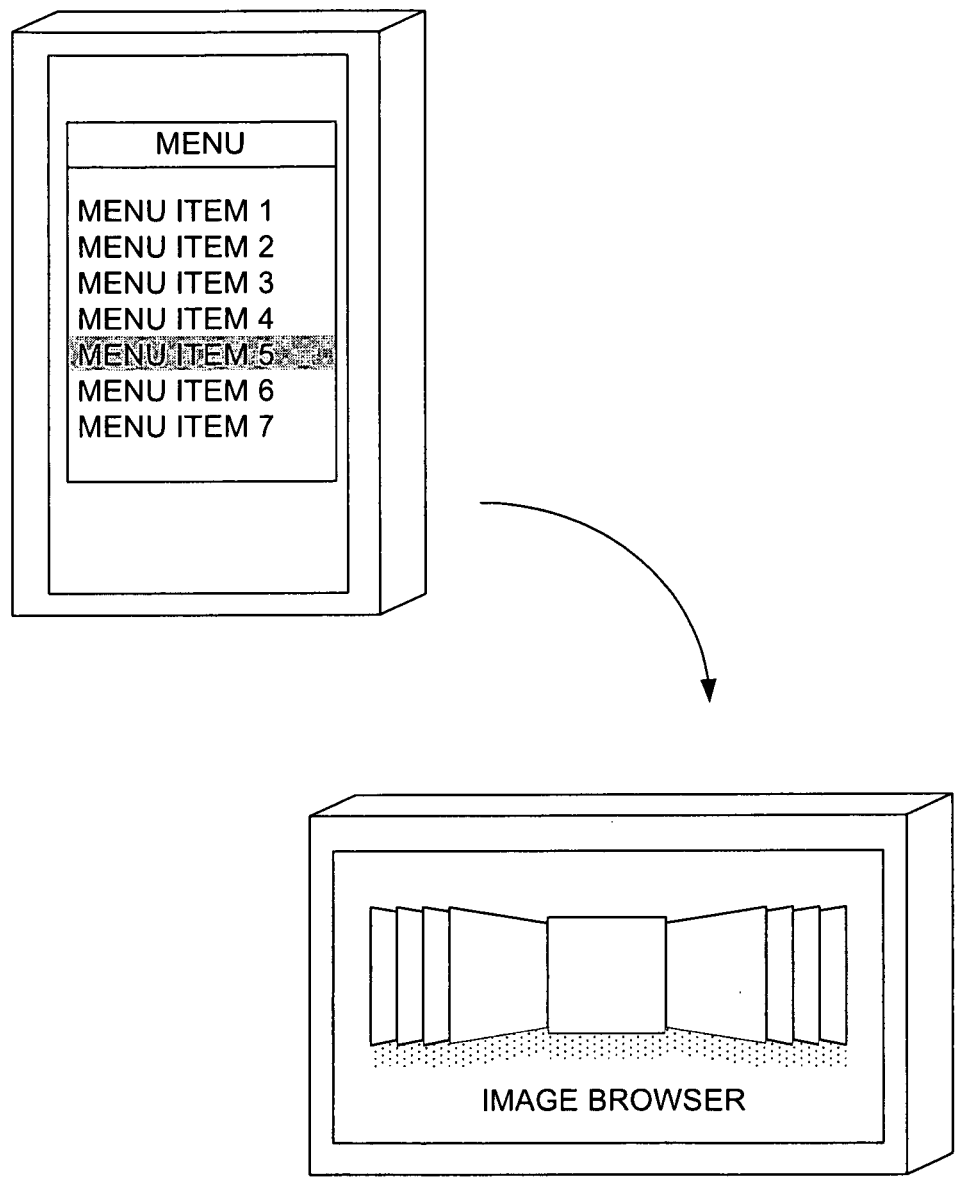
FIG. 34 is a diagram showing a device transitioning between a menu based window in portrait mode, and an image based browser is in a landscape mode, in accordance with one embodiment of the present invention.

In one embodiment, as shown in FIG. 34, a menu based window is presented when the device is in portrait mode, and an image based browser is presented when the device is in a landscape mode. As should be appreciated, portrait mode lends itself to vertical scrolling as for example through a vertical menu list while landscape lends itself to horizontal scrolling as for example through a horizontal image browser (more images can be viewed in landscape mode).

Figure 35:
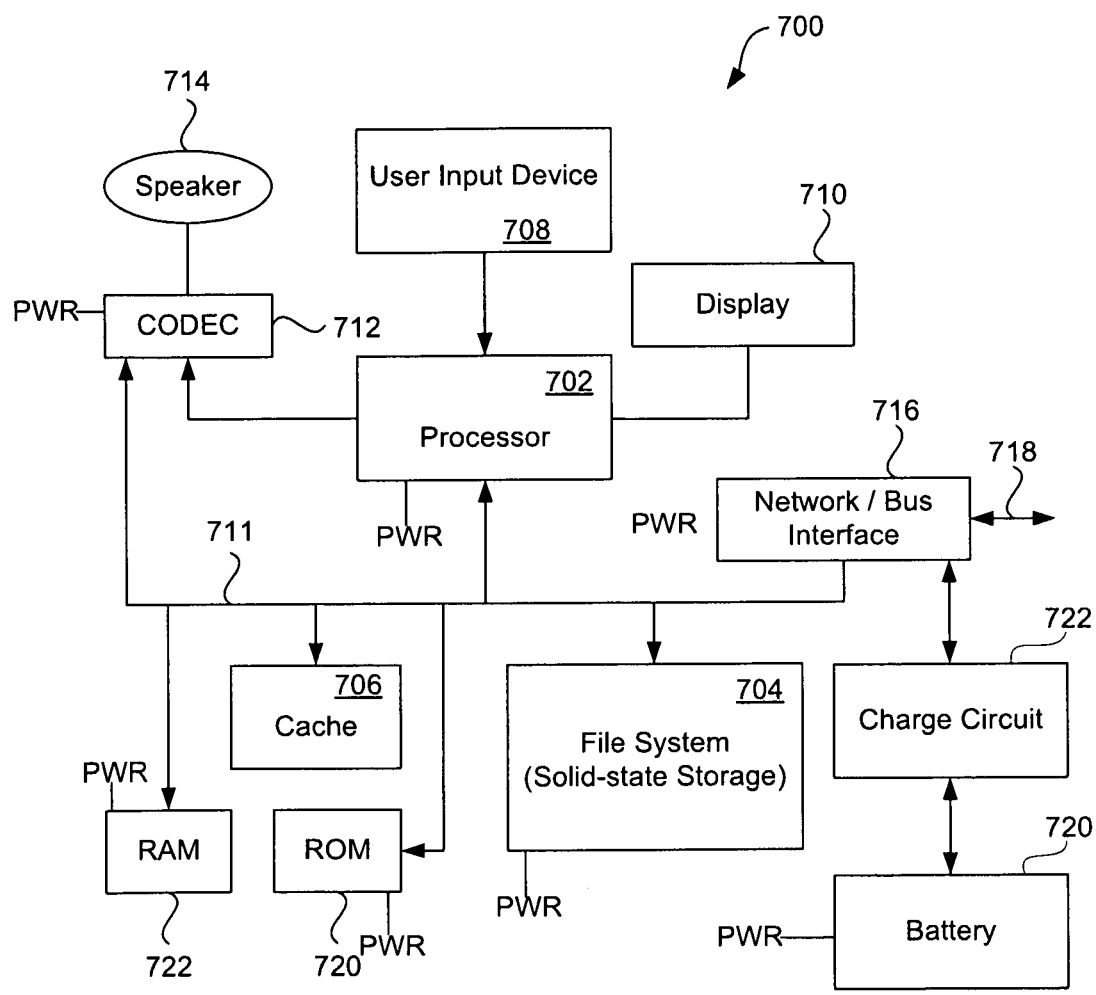
FIG. 35 is a block diagram of a media device, in accordance with one embodiment of the present invention.

FIG. 35 is a block diagram of a media player 700 according to one embodiment of the invention. The media player 700 includes a processor 702 that pertains to a microprocessor or controller for controlling the overall operation of the media player 700. The media player 700 stores media data pertaining to media items in a file system 704 and a cache 706. The file system 704 is, typically, a storage disk or a plurality of disks. The file system 704 typically provides high capacity storage capability for the media player 700. The file system 704 can store not only media data but also non-media data (e.g., when operated in a disk mode). However, since the access time to the file system 704 is relatively slow, the media player 700 can also include a cache 706. The cache 706 is, for example, Random-Access Memory (RAM) provided by semiconductor memory. The relative access time to the cache 706 is substantially shorter than for the file system 1004. However, the cache 706 does not have the large storage capacity of the file system 1004. Further, the file system 704, when active, consumes more power than does the cache 706. The power consumption is often a concern when the media player 700 is a portable media player that is powered by a battery (not shown). The media player 700 also includes a RAM 720 and a Read-Only Memory (ROM) 722. The ROM 722 can store programs, utilities or processes to be executed in a non-volatile manner. The RAM 720 provides volatile data storage, such as for the cache 1006.

The media player 700 also includes a user input device 708 that allows a user of the media player 700 to interact with the media player 700. For example, the user input device 708 can take a variety of forms, such as a button, keypad, dial, etc. Still further, the media player 700 includes a display 710 (screen display) that can be controlled by the processor 702 to display information to the user. A data bus 711 can facilitate data transfer between at least the file system 704, the cache 706, the processor 702, and the CODEC 712.

In one embodiment, the media player 700 serves to store a plurality of media items (e.g., songs) in the file system 704. When a user desires to have the media player play a particular media item, a list of available media items is displayed on the display 710. Then, using the user input device 708, a user can select one of the available media items. The processor 702, upon receiving a selection of a particular media item, supplies the media data (e.g., audio file) for the particular media item to a coder/decoder (CODEC) 712. The CODEC 712 then produces analog output signals for a speaker 714. The speaker 714 can be a speaker internal to the media player 700 or external to the media player 700. For example, headphones or earphones that connect to the media player 700 would be considered an external speaker.

The media player 700 also includes a network/bus interface 716 that couples to a data link 718. The data link 718 allows the media player 700 to couple to a host computer. The data link 718 can be provided over a wired connection or a wireless connection. In the case of a wireless connection, the network/bus interface 716 can include a wireless transceiver.

In one implementation, the host computer can utilize an application resident on the host computer to permit utilization and provide management for playlists, including a media device playlist. One such application is iTunes®, produced by Apple Inc. of Cupertino, Calif.

Figure 36:
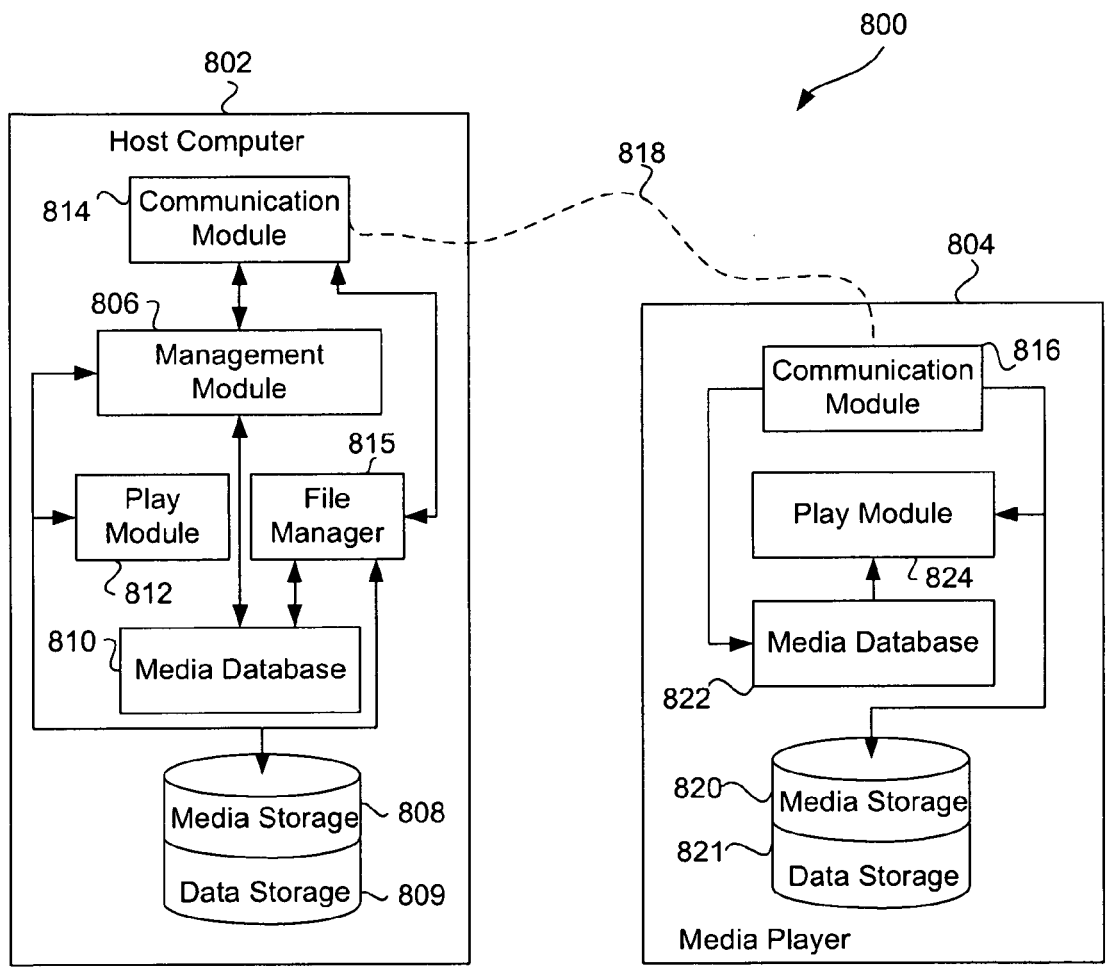
FIG. 36 is a block diagram of a media management system, in accordance with one embodiment of the present invention.

FIG. 36 is a block diagram of a media management system 800 according to one embodiment of the invention. The media management system 800 includes a host computer 802 and a media player 804. The host computer 802 is typically a personal computer. The host computer, among other conventional components, includes a management module 806 which is a software module. The management module 806 provides for centralized management of media items (and/or playlists) not only on the host computer 802 but also on the media player 804. More particularly, the management module 806 manages those media items stored in a media store 808 associated with the host computer 802. The management module 806 also interacts with a media database 810 to store media information associated with the media items stored in the media store 808.

The media information pertains to characteristics or attributes of the media items. For example, in the case of audio or audiovisual media, the media information can include one or more of: title, album, track, artist, composer and genre. These types of media information are specific to particular media items. In addition, the media information can pertain to quality characteristics of the media items. Examples of quality characteristics of media items can include one or more of: bit rate, sample rate, equalizer setting, volume adjustment, start/stop and total time.

Still further, the host computer 802 includes a play module 812. The play module 812 is a software module that can be utilized to play certain media items stored in the media store 808. The play module 812 can also display (on a display screen) or otherwise utilize media information from the media database 810. Typically, the media information of interest corresponds to the media items to be played by the play module 812.

The host computer 802 also includes a communication module 814 that couples to a corresponding communication module 816 within the media player 804. A connection or link 818 removeably couples the communication modules 814 and 816. In one embodiment, the connection or link 818 is a cable that provides a data bus, such as a FIREWIRE™ bus or USB bus, which is well known in the art. In another embodiment, the connection or link 818 is a wireless channel or connection through a wireless network. Hence, depending on implementation, the communication modules 814 and 816 may communicate in a wired or wireless manner.

The media player 804 also includes a media store 820 that stores media items within the media player 804. Optionally, the media store 820 can also store data, i.e., non-media item storage. The media items being stored to the media store 820 are typically received over the connection or link 818 from the host computer 702. More particularly, the management module 806 sends all or certain of those media items residing on the media store 808 over the connection or link 818 to the media store 820 within the media player 804. Additionally, the corresponding media information for the media items that is also delivered to the media player 804 from the host computer 802 can be stored in a media database 822. In this regard, certain media information from the media database 810 within the host computer 802 can be sent to the media database 822 within the media player 804 over the connection or link 818. Still further, playlists identifying certain of the media items can also be sent by the management module 806 over the connection or link 818 to the media store 820 or the media database 822 within the media player 804.

Furthermore, the media player 804 includes a play module 824 that couples to the media store 820 and the media database 822. The play module 824 is a software module that can be utilized to play certain media items stored in the media store 820. The play module 824 can also display (on a display screen) or otherwise utilize media information from the media database 822. Typically, the media information of interest corresponds to the media items to be played by the play module 824.

Hence, in one embodiment, the media player 804 has limited or no capability to manage media items on the media player 804. However, the management module 806 within the host computer 802 can indirectly manage the media items residing on the media player 804. For example, to "add" a media item to the media player 804, the management module 806 serves to identify the media item to be added to the media player 804 from the media store 808 and then causes the identified media item to be delivered to the media player 804. As another example, to "delete" a media item from the media player 804, the management module 806 serves to identify the media item to be deleted from the media store 808 and then causes the identified media item to be deleted from the media player 804. As still another example, if changes (i.e., alterations) to characteristics of a media item were made at the host computer 802 using the management module 806, then such characteristics can also be carried over to the corresponding media item on the media player 804. In one implementation, the additions, deletions and/or changes occur in a batch-like process during synchronization of the media items on the media player 804 with the media items on the host computer 802.

In another embodiment, the media player 804 has limited or no capability to manage playlists on the media player 804. However, the management module 806 within the host computer 802 through management of the playlists residing on the host computer can indirectly manage the playlists residing on the media player 804. In this regard, additions, deletions or changes to playlists can be performed on the host computer 802 and then by carried over to the media player 804 when delivered thereto.

As previously noted, synchronization is a form of media management. The ability to automatically initiate synchronization was also previously discussed above and in the related application noted above. Still further, however, the synchronization between devices can be restricted so as to prevent automatic synchronization when the host computer and media player do not recognize one another.

According to one embodiment, when a media player is first connected to a host computer (or even more generally when matching identifiers are not present), the user of the media player is queried as to whether the user desires to affiliate, assign or lock the media player to the host computer. When the user of the media player elects to affiliate, assign or lock the media player with the host computer, then a pseudo-random identifier is obtained and stored in either the media database or a file within both the host computer and the media player. In one implementation, the identifier is an identifier associated with (e.g., known or generated by) the host computer or its management module and such identifier is sent to and stored in the media player. In another implementation, the identifier is associated with (e.g., known or generated by) the media player and is sent to and stored in a file or media database of the host computer.

Image based browsers with image functionality typically require several different image formats to support the various display modes of the browser. For example, the browser may require a full image for the primary position as well as various thumbnail images for the secondary positions, which may help a user browse through a group of images. This may include partial versions, skewed versions, versions that included reflection, and the like.

One method for creating the various images of the image browser window is to download the original image to the portable media device and then to transcode the original image into the required formats on the portable media device when they need to be displayed. This is sometimes referred to as processing data on-the-fly. While this may work, it is generally believed that this methodology has several drawbacks that make it less appealing to the user. For example, because formatting images is a process intensive task (especially on portable media devices that lack the horsepower of their larger hosts), portable media devices tend to operate slowly and consume more power. Hence, formatting images on portable media devices can result in an unsatisfactory user experience. For one, the user has to wait while the image is being formatted. For another, the battery of the portable media device tends to run out more regularly.

In order to reduce or overcome these drawbacks, images can be preformatted on the host before or during the download thereto. When an image is identified for download various preformatted images derived from the original image (and possibly the original images) are sent to the portable media device. The processing is performed on the host, which can handle these tasks more easily than the portable media player. The tasks may, for example, include scaling, cropping, rotation, color correction, skewing, reflection, and the like. Once received by the portable media device, the preformatted images are stored for later use. By storing these images, the media device is relieved from having to perform any of the labor intensive tasks associated with image formatting. That is, the preformatted images relieve the media device of much of the work required to display them. As a result, the device operates faster and without repeated needs for recharging. In one embodiment, at least some of the preformatted images are thumbnail images.

During media device use, the image based browser may request that an image to be displayed. Instead of processing the original image as in the method described above, the device simply obtains the appropriate preformatted image from media database and presents it to the user on a display. The preformatted images may include a full image for the primary position and several different thumbnail sized images for the secondary positions. However, in some cases, the media device can still be used to perform some processing when image are to be presented (e.g., transitions, animations, skew, reflections, etc.).

In some cases, the media device when connected to a host that expresses or informs the host as to which image formats are desired when an image is downloaded to the media device. The media device may, for example, send various image profiles corresponding to the different formats to the host device. The image profile generally contains the attributes or keys for each image format. By way of example, the image profiles may describe size, orientation, pixel format, color depth, etc. for each image format. This particular methodology helps with compatibility issues that typically come up when different media devices having different versions of software and hardware are used, i.e., the version of the software/hardware is made irrelevant since the media device expresses what information it wants from the host device.

Figure 37:
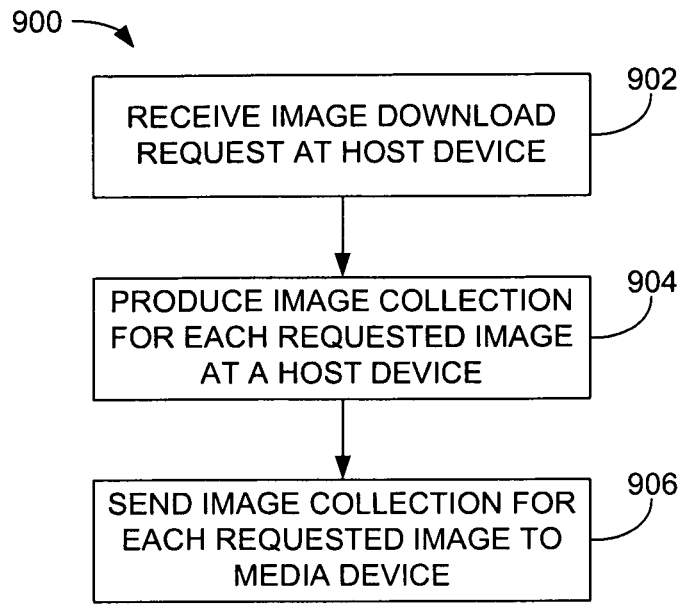
FIG. 37 is a method of transferring image data between a host device and a portable media device, in accordance with one embodiment of the present invention.

FIG. 37 is a method 900 of transferring image data between a host device and a portable media device, in accordance with one embodiment of the present invention. The method 900 may, for example, be performed by media management software. The method includes blocks 902, 904 and 906. In block 902, an image download request is received at the host device. The image download request designates images stored on the host device for downloading to the portable media device. The request can be made at the host device or the media device through a user interface. For example, the user may select a group of images and then select a download button. Alternatively, the request can be made by the media device without user input.

In block 904, an image collection for each requested image is produced at the host device. Each image collection contains the new versions or different formats of the original image. In some cases, the image collection may also contain the original image. For example, the new versions may include a primary image and various secondary images, each of which are typically smaller versions of the primary image (and may be reconfigured, skew, reflect, etc.). It should be noted that the file sizes of the new versions are typically much smaller than the file size of the original image. They therefore take up less space in storage than would the corresponding original image.

Each new version has a different image profile based on the display needs of the portable media device. The image profiles for particular media devices may be stored in the host device or the image profiles may be given to the host device by the media device. In the first case, the media device may provide the host device with an Identifier (ID), which can be used by the host to determine the image profiles for the requesting media device. For example, after obtaining the ID, the host may refer to a previously stored table or list that includes all the capabilities of the identified media device. In the later case, the media device may automatically upload this information as part of synchronization or handshaking procedure with the host device.

In block 906, the image collection for each requested image is sent to the portable media device as part of the downloading process. Once received by the portable media device, the image collection is stored in the portable media device for later use. The image collection may be stored in the memory of the portable media device. In order to efficiently store the images in memory, each of the different image sets may be stored in their own file.

Once downloaded and during operation of the media device, a display request may be made on the media device. Thereafter, one or more images are retrieved from memory based on the display request. The display request indicates the images to be shown on the media player. Once retrieved, the images can be displayed. In a browse mode, the images are displayed as determined by the browser.

Figure 38:
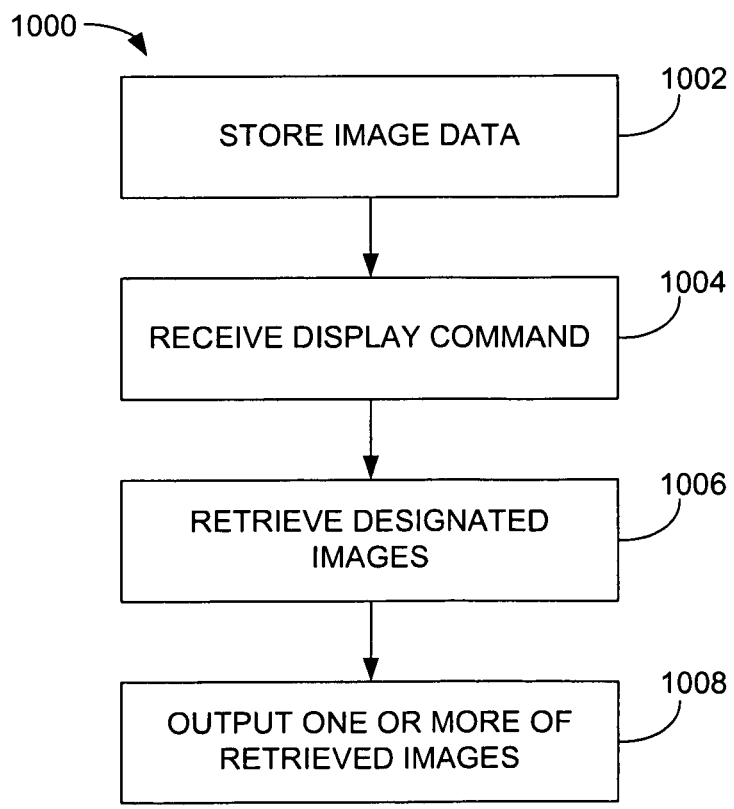
FIG. 38 is an operational method for a portable media device, in accordance with one embodiment of the present invention.

FIG. 38 is an operational method for a portable media device 1000, in accordance with one embodiment of the present invention. The method includes blocks 1002, 1004, 1006 and 1008. In block 1002, image data is stored. The image data includes at least a plurality of image collections. The image collections contain a plurality of differently formatted images based on an original image and may also include the original image. The image collections are not formed on the portable media device; instead, they are separately generated on a device other than the portable media device. The image collections may for example be generated on a host device that downloads them to the portable media device for storage. By way of example, the image collections may be provided by the method described in FIG. 37. Alternatively or additionally, the image collections may be downloaded from another portable media device that has already downloaded them from a host.

In block 1004, a display command is received. The display command designates one or more images of the image data to be displayed. The display command may be generated via a user making a selection on the user interface of the media player.

In block 1006, at least the designated images are retrieved. In some cases, only the designated images are retrieved. In other case, more than the designated images are retrieved. For example, although the display command may only designate a single image, other images associated or linked to that image may be additionally retrieved.

In block 1008, the one or more retrieved images are outputted. The retrieved images may be outputted to a display. Upon receiving the retrieved images, the retrieved images are displayed. In some cases, all of the images are displayed, and in other case only a portion of the images are displayed. The later case may be implemented when the size and number of images is greater than the screen size and/or the number of positions in the image based browser.

Examples of transferring images between a host and a portable device as well as displaying images at a portable device can be found in U.S. patent application Ser. No. 10/973,657, which is herein incorporated by reference.

Although the media items (or media assets) of emphasis in several of the above embodiments were audio items (e.g., audio files or songs), the media items are not limited to audio items. For example, the media items can alternatively pertain to videos (e.g., movies) or images (e.g., photos).

Although the invention was described in several embodiments above with respect to portable electronic devices, the invention is not limited to use on portable electronic devices. Other embodiments of the invention can be used on other electronic devices, which may or may not be portable, such as computers (e.g., personal computer), media players (e.g., music, videos, games, images), or media storage devices.

The various aspects, embodiments, implementations or features of the invention can be used separately or in any combination.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

While this invention has been described in terms of several preferred embodiments, there are alterations, permutations, and equivalents, which fall within the scope of this invention.

It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method, comprising:
at an electronic device with a display and one or more input devices:
displaying, on the display, representations of a plurality of contacts, including a first contact, a second contact, and a third contact, wherein:
the first contact is currently selected;
a plurality of other contacts are currently unselected; and
a representation of the currently selected contact is larger, in at least one dimension, than representations of the currently unselected contacts;
while displaying the representations of the plurality of contacts with the first contact being currently selected, detecting, with the one or more input devices, a contact selection input;
in response to detecting the contact selection input:
transitioning the first contact from being selected to being unselected; and
transitioning a respective other contact from being unselected to being selected, wherein a representation of the currently selected contact is larger, in at least one dimension, than representations of the currently unselected contacts;
receiving an activation input;
in response to receiving an activation input, displaying one or more options for initiating a communication operation with the currently selected contact, wherein the one or more options include a first option and a second option;
while displaying the one or more options for initiating a communication operation with the currently selected contact, detecting selection of a respective option; and
in response to detecting selection of the respective option:
in accordance with a determination that the respective option is the first option, initiating a communication with the currently selected contact using a first communication mode; and
in accordance with a determination that the respective option is the second option, initiating a communication with the currently selected contact using a second communication mode that is different from the first communication mode.

2. The method of claim 1, wherein:
the representations of the other contacts are arranged in sequence relative to a representation of the first contact;
the other contacts include a second contact and a third contact; and
a representation of the second contact is to the right of a representation of the third contact; and
transitioning a respective other contact from being unselected to being selected includes:
in accordance with a determination that the contact selection input is in a first direction, transitioning the second contact from being unselected to being selected; and
in accordance with a determination that the contact selection input is in a second direction that is opposite to the first direction, transitioning the third contact from being unselected to being selected.

3. The method of claim 1, wherein:
a primary location is designated for displaying the representation of the currently selected contact;

transitioning the first contact from being selected to being unselected includes ceasing to display the representation of the first contact at the primary location; and transitioning a respective other contact from being unselected to being selected includes displaying the representation of the respective other contact at the primary location.

4. The method of claim 3, wherein:

the contacts are arranged in an order;

there are a two or more other contacts between the first contact and the respective other contact in the order; and transitioning a respective other contact from being unselected to being selected, includes sequentially transitioning representations of the two or more other contacts through the primary location before the representation of the respective other contact is displayed in the primary location.

5. The method of claim 1, wherein the contact selection input is a rotational input.

6. The method of claim 5, wherein the one or more input devices include a mechanically rotating input device, and the contact selection input includes rotation of the mechanically rotating input device.

7. The method of claim 5, wherein the one or more input devices include a touch-sensitive surface, and the contact selection input includes movement in an arc around the touch-sensitive surface.

8. An electronic device, comprising:

a display;

one or more input devices;

one or more processors;

memory; and one or more programs, wherein the one or more programs are stored in the memory and configured to be executed by the one or more processors, the one or more programs including instructions for:

displaying, on the display, representations of a plurality of contacts, including a first contact, a second contact, and a third contact, wherein:

the first contact is currently selected;

a plurality of other contacts are currently unselected; and a representation of the currently selected contact is larger, in at least one dimension, than representations of the currently unselected contacts;

while displaying the representations of the plurality of contacts with the first contact being currently selected, detecting, with the one or more input devices, a contact selection input; and in response to detecting the contact selection input:

transitioning the first contact from being selected to being unselected; and transitioning a respective other contact from being unselected to being selected, wherein a representation of the currently selected contact is larger, in at least one dimension, than representations of the currently unselected contacts;

receiving an activation input;

in response to receiving an activation input, displaying one or more options for initiating a communication operation with the currently selected contact, wherein the one or more options include a first option and a second option;

while displaying the one or more options for initiating a communication operation with the currently selected contact, detecting selection of a respective option; and in response to detecting selection of the respective option:

in accordance with a determination that the respective option is the first option, initiating a communication with the currently selected contact using a first communication mode; and in accordance with a determination that the respective option is the second option, initiating a communication with the currently selected contact using a second communication mode that is different from the first communication mode.

9. The electronic device of claim 8, wherein:

the representations of the other contacts are arranged in sequence relative to a representation of the first contact;

the other contacts include a second contact and a third contact; and a representation of the second contact is to the right of a representation of the third contact; and transitioning a respective other contact from being unselected to being selected includes:

in accordance with a determination that the contact selection input is in a first direction, transitioning the second contact from being unselected to being selected; and in accordance with a determination that the contact selection input is in a second direction that is opposite to the first direction, transitioning the third contact from being unselected to being selected.

10. The electronic device of claim 8, wherein:

a primary location is designated for displaying the representation of the currently selected contact;

transitioning the first contact from being selected to being unselected includes ceasing to display the representation of the first contact at the primary location; and transitioning a respective other contact from being unselected to being selected includes displaying the representation of the respective other contact at the primary location.

11. The electronic device of claim 10, wherein:

the contacts are arranged in an order;

there are a two or more other contacts between the first contact and the respective other contact in the order; and transitioning a respective other contact from being unselected to being selected, includes sequentially transitioning representations of the two or more other contacts through the primary location before the representation of the respective other contact is displayed in the primary location.

12. The electronic device of claim 8, wherein the contact selection input is a rotational input.

13. The electronic device of claim 12, wherein the one or more input devices include a mechanically rotating input device, and the contact selection input includes rotation of the mechanically rotating input device.

14. The electronic device of claim 12, wherein the one or more input devices include a touch-sensitive surface, and the contact selection input includes movement in an arc around the touch-sensitive surface.

15. A non-transitory computer readable storage medium storing one or more programs, the one or more programs comprising instructions, which when executed by an electronic device with a display and one or more input devices, cause the device to:
- display, on the display, representations of a plurality of contacts, including a first contact, a second contact, and a third contact, wherein:
  - the first contact is currently selected;
  - a plurality of other contacts are currently unselected; and
  - a representation of the currently selected contact is larger, in at least one dimension, than representations of the currently unselected contacts;
- while displaying the representations of the plurality of contacts with the first contact being currently selected, detect, with the one or more input devices, a contact selection input; and
- in response to detecting the contact selection input:
  - transition the first contact from being selected to being unselected; and
  - transition a respective other contact from being unselected to being selected, wherein a representation of the currently selected contact is larger, in at least one dimension, than representations of the currently unselected contacts;
- receive an activation input;
- in response to receiving an activation input, display one or more options for initiating a communication operation with the currently selected contact, wherein the one or more options include a first option and a second option;
- while displaying the one or more options for initiating a communication operation with the currently selected contact, detect selection of a respective option; and
- in response to detecting selection of the respective option:
  - in accordance with a determination that the respective option is the first option, initiate a communication with the currently selected contact using a first communication mode; and
  - in accordance with a determination that the respective option is the second option, initiate a communication with the currently selected contact using a second communication mode that is different from the first communication mode.

16. The non-transitory computer readable storage medium of claim 15, wherein:
- the representations of the other contacts are arranged in sequence relative to a representation of the first contact;
- the other contacts include a second contact and a third contact; and
- a representation of the second contact is to the right of a representation of the third contact; and
- transitioning a respective other contact from being unselected to being selected includes:
  - in accordance with a determination that the contact selection input is in a first direction, transition the second contact from being unselected to being selected; and
  - in accordance with a determination that the contact selection input is in a second direction that is opposite to the first direction, transition the third contact from being unselected to being selected.

17. The non-transitory computer readable storage medium of claim 15, wherein:
- a primary location is designated for displaying the representation of the currently selected contact;
- transitioning the first contact from being selected to being unselected includes ceasing to display the representation of the first contact at the primary location; and
- transitioning a respective other contact from being unselected to being selected includes displaying the representation of the respective other contact at the primary location.

18. The non-transitory computer readable storage medium of claim 17, wherein:
- the contacts are arranged in an order;
- there are a two or more other contacts between the first contact and the respective other contact in the order; and
- transitioning a respective other contact from being unselected to being selected, includes sequentially transitioning representations of the two or more other contacts through the primary location before the representation of the respective other contact is displayed in the primary location.

19. The non-transitory computer readable storage medium of claim 15, wherein the contact selection input is a rotational input.

20. The non-transitory computer readable storage medium of claim 19, wherein the one or more input devices include a mechanically rotating input device, and the contact selection input includes rotation of the mechanically rotating input device.

21. The non-transitory computer readable storage medium of claim 19, wherein the one or more input devices include a touch-sensitive surface, and the contact selection input includes movement in an arc around the touch-sensitive surface.

* * * * *